(12) United States Patent
Abe

(10) Patent No.: US 8,289,531 B2
(45) Date of Patent: Oct. 16, 2012

(54) PERIPHERAL DEVICE CONTROL SYSTEM AND METHOD

(75) Inventor: Koichi Abe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 10/901,505

(22) Filed: Jul. 28, 2004

(65) Prior Publication Data
US 2005/0024671 A1 Feb. 3, 2005

(30) Foreign Application Priority Data

Jul. 31, 2003 (JP) .................................. 2003-205054
Jul. 12, 2004 (JP) .................................. 2004-205132

(51) Int. Cl.
*G06F 3/12* (2006.01)
(52) U.S. Cl. .......................... 358/1.13; 358/1.1; 358/1.15
(58) Field of Classification Search .......................... None
See application file for complete search history.

(56) References Cited

U.S. PATENT DOCUMENTS

| 5,611,046 | A |  | 3/1997 | Russell et al. |
| 6,003,078 | A |  | 12/1999 | Kodimer et al. |
| 6,959,437 | B2 | * | 10/2005 | Schacht et al. ................ 719/321 |
| 7,120,910 | B2 | * | 10/2006 | Matsuda et al. .............. 718/102 |
| 7,154,617 | B2 | * | 12/2006 | Ikeno .......................... 358/1.13 |
| 2003/0011816 | A1 | * | 1/2003 | Ikeno .......................... 358/1.15 |
| 2003/0137691 | A1 | * | 7/2003 | Tanaka ......................... 358/1.15 |

FOREIGN PATENT DOCUMENTS

| JP | 10-269039 | 10/1998 |
| JP | 2002-133305 | 5/2002 |
| JP | 2002-278727 A | 9/2002 |
| JP | 2003-076525 A | 3/2003 |
| JP | 2003-195694 | 7/2003 |

OTHER PUBLICATIONS

Printer:1 Device Template Version 1.01 for UPnP™ Version 1.0, Aug. 8, 2002, United States.

* cited by examiner

*Primary Examiner* — Twyler Haskins
*Assistant Examiner* — Marcus T Riley
(74) *Attorney, Agent, or Firm* — Canon USA Inc IP Division

(57) ABSTRACT

A method used in first and second information processing apparatuses in communication with an image forming apparatus. The method includes a transfer step of transferring print setting information for controlling the image forming apparatus from the image forming apparatus to the second information processing apparatus, an acquisition step of acquiring the print setting information transferred in the transfer step from the second information processing apparatus, an input step of inputting the print setting information acquired in the acquisition step into a printer driver in a form that can be identified by the printer driver; and a print control step of controlling a printing operation by using the print setting information inputted in the input step.

4 Claims, 49 Drawing Sheets

FIG. 9

1: M-SEARCH * HTTP/1.1
2: HOST:239.255.255.250:1900
3: ST:upnp:rootdevice
4: MAN:"ssdp:discover"
5: MX:3

FIG. 10

1: NOTIFY * HTTP/1.1
2: HOST:239.255.255.250:1900
3: CHACHE-CONTROL:max-age=120
4: LOCATION:http://192.168.0.100:3678/DDD/Printer.PrintMdl-K000888.xml
5: CONTENT-LENGTH:0
6: NT:urn:schemas-upnp-org:device:Printer:1
7: NTS:ssdp:alive
8: SERVER:OS/0.1,UPnP/1.0,xyz/0.0
9: USN:uuid:Printer:PrintMdl-K000888::urn:schemas-upnp-org:device:Printer:1

FIG. 11

```
 1: <?xml version="1.0" ?>
 2: <root xmlns="urn:schemas-upnp-org:device-1-0">
 3:   <specVersion>
 4:     <major>1</major>
 5:     <minor>0</minor>
 6:   </specVersion>
 7:   <device>
 8:     <deviceType>urn:schemas-upnp-org:device:Printer:1</deviceType>
 9:     <friendlyName>ABC PrintMdl-K 000888</friendlyName>
10:     <manufacturer>ABC</manufacturer>
11:     <manufacturerURL>http://abc.jp</manufacturerURL>
12:     <modelDescription>ABC PrintMdl-K</modelDescription>
13:     <modelName>PrintMdl-K</modelName>
14:     <serialNumber>000888</serialNumber>
15:     <UDN>uuid:Printer:PrintMdl-K000888</UDN>
16:     <serviceList>
17:       <service>
18:         <serviceType>urn:schemas-upnp-org:service:PrintBasic:1</serviceType>
19:         <serviceId>urn:upnp-org:serviceId:1</serviceId>
20:         <SCPDURL>http://192.168.0.100:3678/SCPD/BasicPrint_Printer.PrintMdl-K000888.xml</SCPDURL>
21:         <controlURL>http://192.168.0.100:1228/control.asp?uuid=Printer:
              PrintMdl-K000888;serviceType=PrintBasic;serviceID=1</controlURL>
22:         <eventSubURL>http://192.168.0.100:3680/subscribe.asp?uuid=Printer:
              PrintMdl-K000888;serviceType=PrintBasic;serviceID=1</eventSubURL>
25:       </service>
26:     </serviceList>
27:     <presentationURL>http://192.168.0.100/PrinterPresentation.asp?uuid=
          Printer:PrintMdl-K000888</presentationURL>
29:   </device>
30: </root>
```

FIG. 32

```
1: <?xml version="1.0"?>
2: <root xmlns="urn:schemas-upnp-org:device-1-0">
3:   <specVersion>
4:     <major>1</major>
5:     <minor>0</minor>
6:   </specVersion>
7:   <device>
8:     <deviceType>urn:schemas-upnp-org:device:Printer:1</deviceType>
9:     <friendlyName>ABC PrintMdl-K 000888</friendlyName>
10:    <manufacturer>ABC</manufacturer>
11:    <manufacturerURL>http://abc.jp</manufacturerURL>
12:    <modelDescription>ABC PrintMdl-K</modelDescription>
13:    <modelName>PrintMdl-K</modelName>
14:    <serialNumber>000888</serialNumber>
15:    <UDN>uuid:Printer:PrintMdl-K000888</UDN>
16:    <serviceList>
17:      <service>
18:        <serviceType>urn:schemas-upnp-org:service:PrintBasic:1</serviceType>
19:        <serviceId>urn:upnp-org:serviceId:1</serviceId>
20:        <SCPDURL>http://192.168.0.100:3678/SCPD/BasicPrint_Printer.PrintMdl-K000888.xml</SCPDURL>
21:        <controlURL>http://192.168.0.100:1228/control.asp?uuid=Printer:
                PrintMdl-K000888;serviceType=PrintBasic;serviceID=1</controlURL>
22:        <eventSubURL>http://192.168.0.100:3680/subscribe.asp?uuid=Printer:
                PrintMdl-K000888;serviceType=PrintBasic;serviceID=1</eventSubURL>
25:      </service>
```

FIG. 33

```
26: <service>
27:   <serviceType>urn:urn:urn:schemas-abc-jp:service:PrintEx:1</serviceType>
28:   <serviceId>urn:abc-jp:serviceId:1</serviceId>
29:   <SCPDURL>http://192.168.0.100:3678/SCPD/ExPrint_Printer.PrintMdl-K000888.xml</SCPDURL>
30:   <controlURL>http://192.168.0.100:1228/control.asp?uuid=Printer:
          PrintMdl-K000888;serviceType=PrintEx;serviceID=1</controlURL>
31:   <eventSubURL>http://192.168.0.100:3680/subscribe.asp?uuid=Printer
          PrintMdl-K000888;serviceType=PrintEx;serviceID=1</eventSubURL>
32: 
33: 
34: </service>
35: </serviceList>
36: <presentationURL>http://192.168.0.100/PrinterPresentation.asp?uuid=
          Printer:PrintMdl-K000888</presentationURL>
37: 
38: </device>
39: </root>
```

FIG. 34

```
 1: <?xml version="1.0"?>
 2: <scpd xmlns="urn:schemas-upnp-org:service-1-0">
 3:   <specVersion>
 4:     <major>1</major>
 5:     <minor>0</minor>
 6:   </specVersion>
 7:   <actionList>
 8:     <action>
 9:       <name>CreatePrinter</name>
10:       <argumentList>
11:         <argument>
12:           <name>PrinterName</name>
13:           <direction>in</direction>
14:           <relatedStateVariable>PrinterName</relatedStateVariable>
15:         </argument>
16:         <argument>
17:           <name>PrinterPath</name>
18:           <direction>out</direction>
19:           <relatedStateVariable>PrinterPath</relatedStateVariable>
20:         </argument>
21:         <argument>
22:           <name>PrintSettingURL</name>
23:           <direction>out</direction>
24:           <relatedStateVariable>PrintSettingURL</relatedStateVariable>
25:         </argument>
26:         <argument>
27:           <name>StatusMonitorURL</name>
28:           <direction>out</direction>
29:           <relatedStateVariable>StatusMonitorURL</relatedStateVariable>
30:         </argument>
31:       </argumentList>
```

FIG. 35

```
32:    </action>
33:    <action>
34:      <name>DeletePrinter</name>
35:      <argumentList>
36:        <argument>
37:          <name>PrinterPath</name>
38:          <direction>in</direction>
39:          <relatedStateVariable>PrinterPath</relatedStateVariable>
40:        </argument>
41:      </argumentList>
42:    </action>
43:  </actionList>
44:  <serviceStateTable>
45:    <stateVariable sendEvents="yes">
46:      <name>printerState</name>
47:      <dataType>string</dataType>
48:      <defaultValue>enable</defaultValue>
49:      <allowedValueList>
50:        <allowedValue>enable</allowedValue>
51:        <allowedValue>unable</allowedValue>
52:      </allowedValueList>
53:    </stateVariable>
54:  </serviceStateTable>
55: </scpd>
```

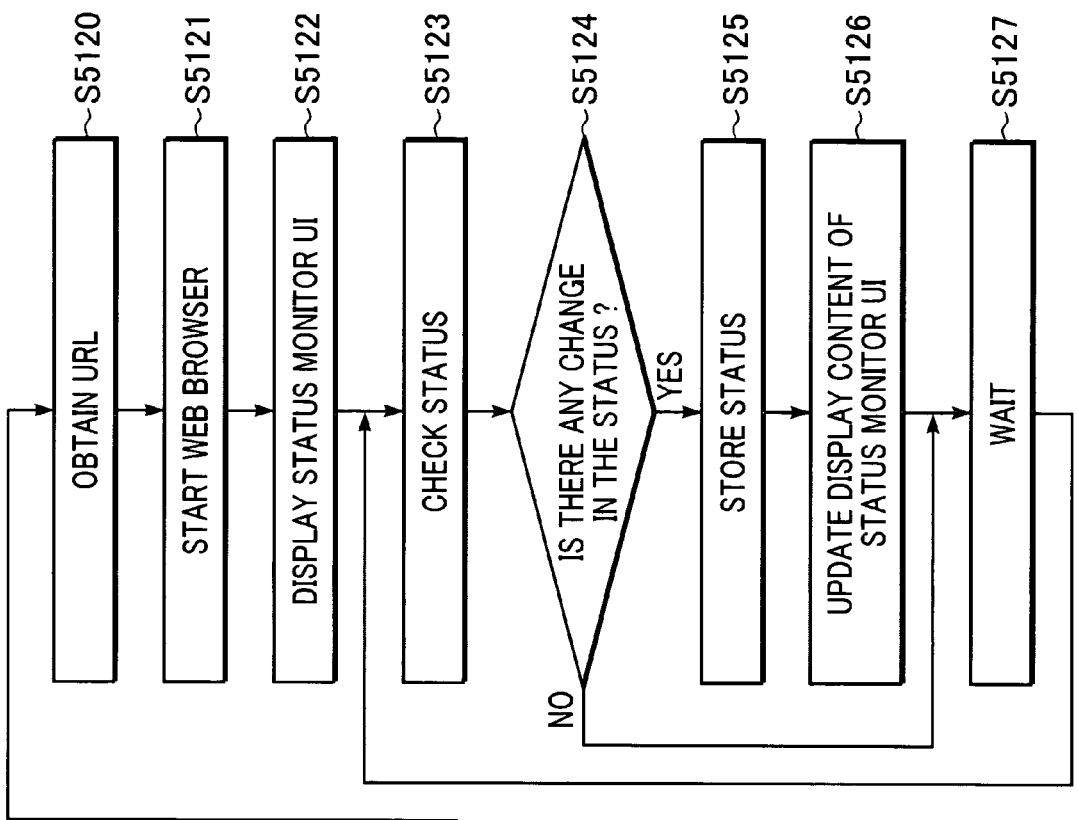
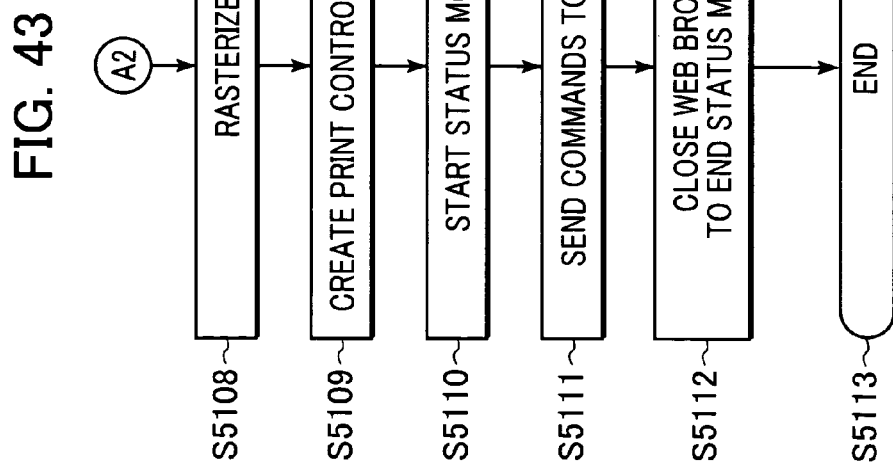
FIG. 43

PERIPHERAL DEVICE CONTROL SYSTEM AND METHOD

CROSS REFERENCE TO RELATED APPLICATIONS

This application claims priority from Japanese Patent Application No. 2003-205054 filed Jul. 31, 2003, and Japanese Patent Application No. 2004-205132 filed Jul. 12, 2004, the entire contents of which are incorporated herein by reference.

BACKGROUND OF THE INVENTION

1. Field of the Invention

The present invention relates to peripheral devices, and more particularly to peripheral device control systems.

2. Description of the Related Art

Due to recent upgrading of network infrastructure, network-compatible peripheral devices, such as printers, copying machines, facsimile machines, scanners, digital cameras, and image processing apparatuses including a composite function of such elements, are coming into widespread use.

To operate such network-compatible peripheral devices, such as network-compatible printers, the following procedure is taken. A user first manually installs driver software (printer driver) which is registered and managed on a database into an information processing apparatus (client personal computer (client PC)) by using an operating system (hereinafter referred to as an "OS") running on the client PC. Alternatively, the user installs a printer driver, provided by a printer vendor, stored on a recording medium, such as a flexible disk or a compact disc read only memory (CD-ROM). The client PC then sets information for operating the printer, such as an Internet protocol (IP) address assigned to the printer, a printer port, a print protocol, and a device driver. For setting such information, various presentation pages (user interfaces (UIs)) for inputting the information are stored in predetermined network storage locations indicated by Uniform Resource Identifiers (URIs). The client PC sets the information by accessing such various presentation pages. In this system, print commands can be given to the printer from a corresponding application running on the client PC.

To operate a local-connection dedicated printer, which is not compatible with a network, such printer is connected to a server consisting of a PC, for example, which is connected to a network. With this arrangement, when viewing the printer from the network via the server, the printer can be operated as a network-compatible printer. A printer operation is performed by this printer according to print commands given from a client PC on the network. Services for providing such a printing method include Net Crawl Service of Microsoft Windows XP (registered, hereinafter referred to as "Windows XP"). With this Net Crawl Service, in a system including a server with Windows XP, a client PC with Windows XP, and a printer connected to this server located on the same network, a printer driver can be automatically installed into the client PC. Then, the user is able to perform a printing operation by using the printer based on print commands given from the client PC without the need to manually install a printer driver or perform special settings. As in the previous system including a network-compatible printer, print commands can be given to the printer from a corresponding application running on the client PC.

Along with the widespread use of network-compatible peripheral devices, techniques for searching via a network for peripheral devices providing various services on the network and for controlling such peripheral devices by an information processing apparatus (client PC) are being developed. Such techniques include Universal Plug and Play (hereinafter sometimes referred to as "UPnP"™) provided by Microsoft Corporation, which is now standardized by the UPnP Forum (http://www.upnp.org/).

SUMMARY OF THE INVENTION

The present invention is directed to a system including information processing apparatuses and a peripheral device, a peripheral device control method, and a program which eliminates the need for the user to manually install driver software into the information processing apparatus, to collect or set information for controlling peripheral devices on a network, or to re-design or re-develop a user interface (UI) in accordance with an OS installed in the information processing apparatus while maintaining the same design and operability of the UI for all OSs.

In one aspect of the present invention, the system includes a first information processing apparatus having a printer driver, a second information processing apparatus, and an image forming apparatus coupled together, transfer means for transferring print setting information for controlling the image forming apparatus from the image forming apparatus to the second information processing apparatus, acquisition means for acquiring the print setting information transferred by the transfer means from the second information processing apparatus, input means for inputting the print setting information acquired by the acquisition means into the printer driver in a form that can be identified by the printer driver, and print control means for controlling a printing operation on the image forming apparatus by using the print setting information inputted by the input means.

In another aspect of the present invention, a method for controlling first and second information processing apparatuses and an image forming apparatus in communication with each other, the method including a transfer step of transferring print setting information for controlling the image forming apparatus from the image forming apparatus to the second information processing apparatus, an acquisition step of acquiring the print setting information transferred in the transfer step from the second information processing apparatus, an input step of inputting the print setting information acquired in the acquisition step into a printer driver in a form that can be identified by the printer driver, and a print control step of controlling a printing operation on the image forming apparatus by using the print setting information inputted in the input step.

In yet a further aspect of the present invention, a peripheral device coupled to an image processing apparatus having an operating system, the peripheral device including a communication unit coupling the peripheral device to the information processing apparatus, memory storing setting information, and a controller coupled to the communication unit and the memory, wherein responsive to the communication unit receiving a request for setting information from the information processing apparatus, the controller controls the communication unit to publish the setting information to the information processing apparatus, and wherein the information processing apparatus is capable of controlling via the operating system an operation on the peripheral device by using the setting information.

Other features and advantages of the present invention will be apparent from the following description taken in conjunc-

BRIEF DESCRIPTION OF THE DRAWINGS

FIG. 9 illustrates an example of an HTTP request issued by a client PC.

FIG. 10 illustrates an example of an HTTP response returned to a client PC.

FIG. 11 illustrates a basic example of details of the XML Device Description of a UPnP device supported by a printer.

FIGS. 32 and 33 illustrate details of the XML Device Description of a UPnP device supported by a printer in the present invention.

FIGS. 34 and 35 illustrate details of the XML Service Description of a UPnP device supported by a printer in the present invention.

FIGS. 42 and 43 are a flowchart illustrating a process from when print commands are given from an application of a client PC to when a printing operation is performed in a printer in the first part of the network print system shown in FIG. 1.

DESCRIPTION OF THE PREFERRED EMBODIMENTS

The present invention is described in detail below with reference to the accompanying drawings through illustration of embodiments.

Figure 1:
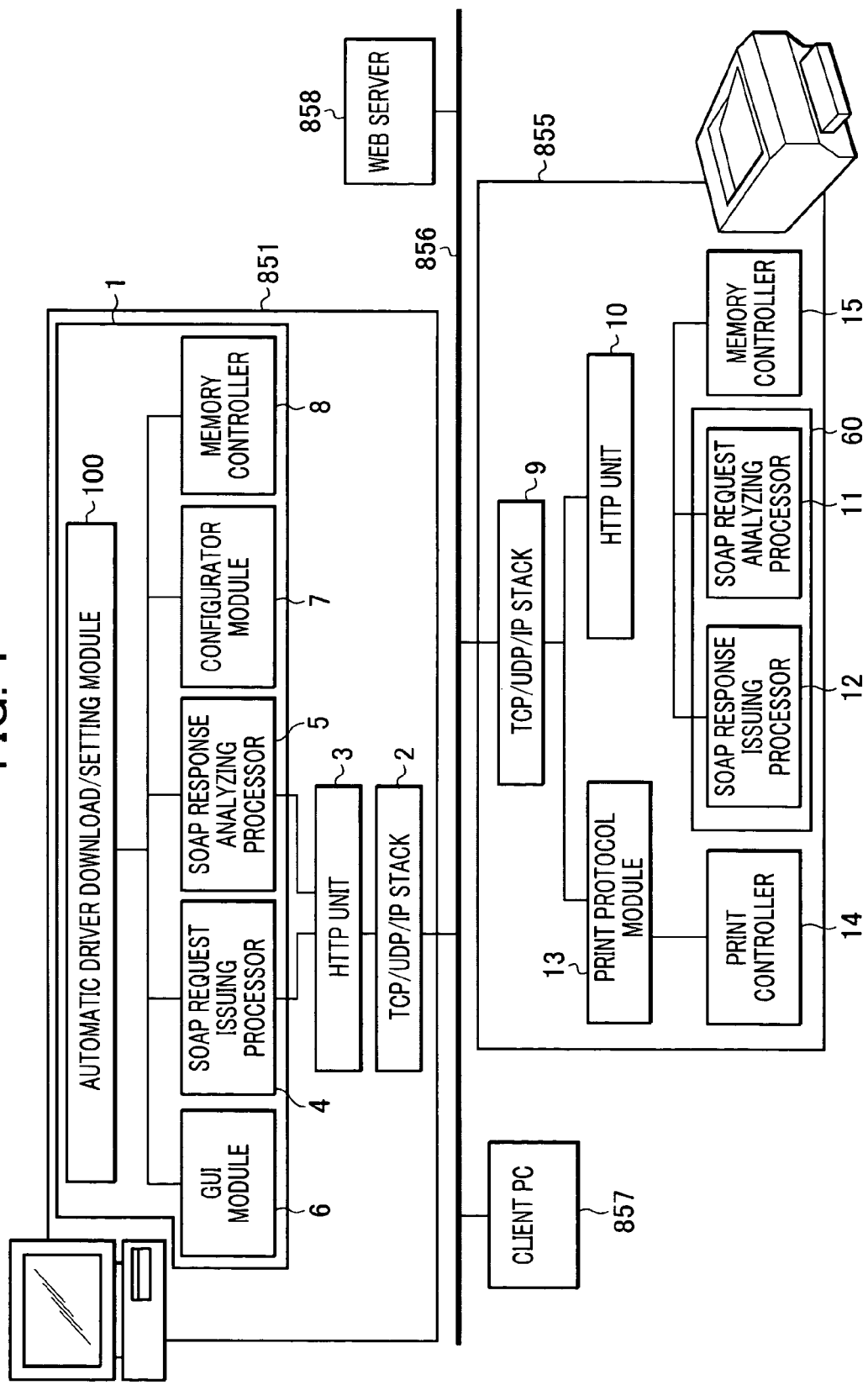
FIG. 1 is a block diagram illustrating a first part of a print network system including an information processing apparatus and a peripheral device according to an embodiment of the present invention.
Figure 5:
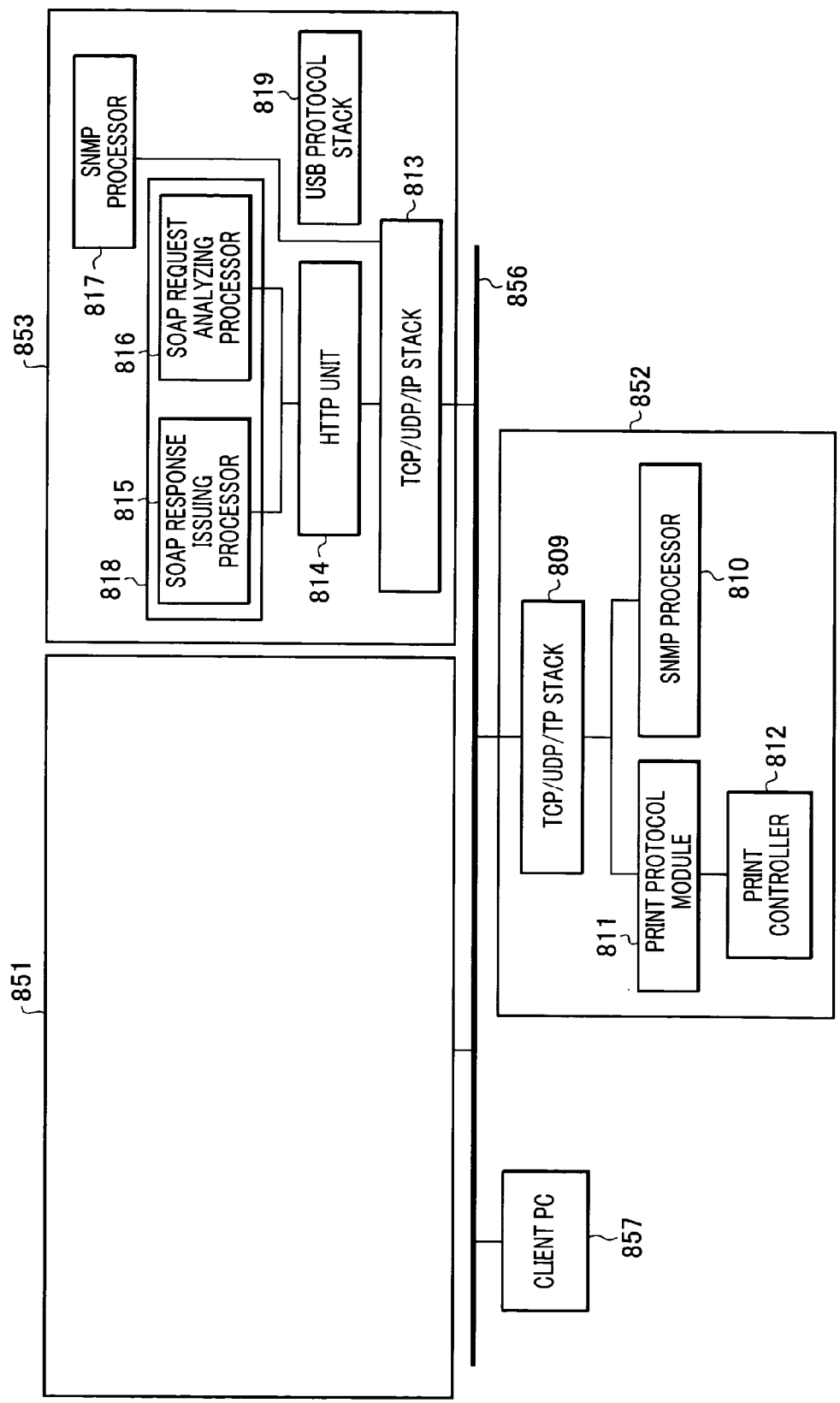
FIG. 5 is a block diagram illustrating a second part of the print network system of the same embodiment.
Figure 6:
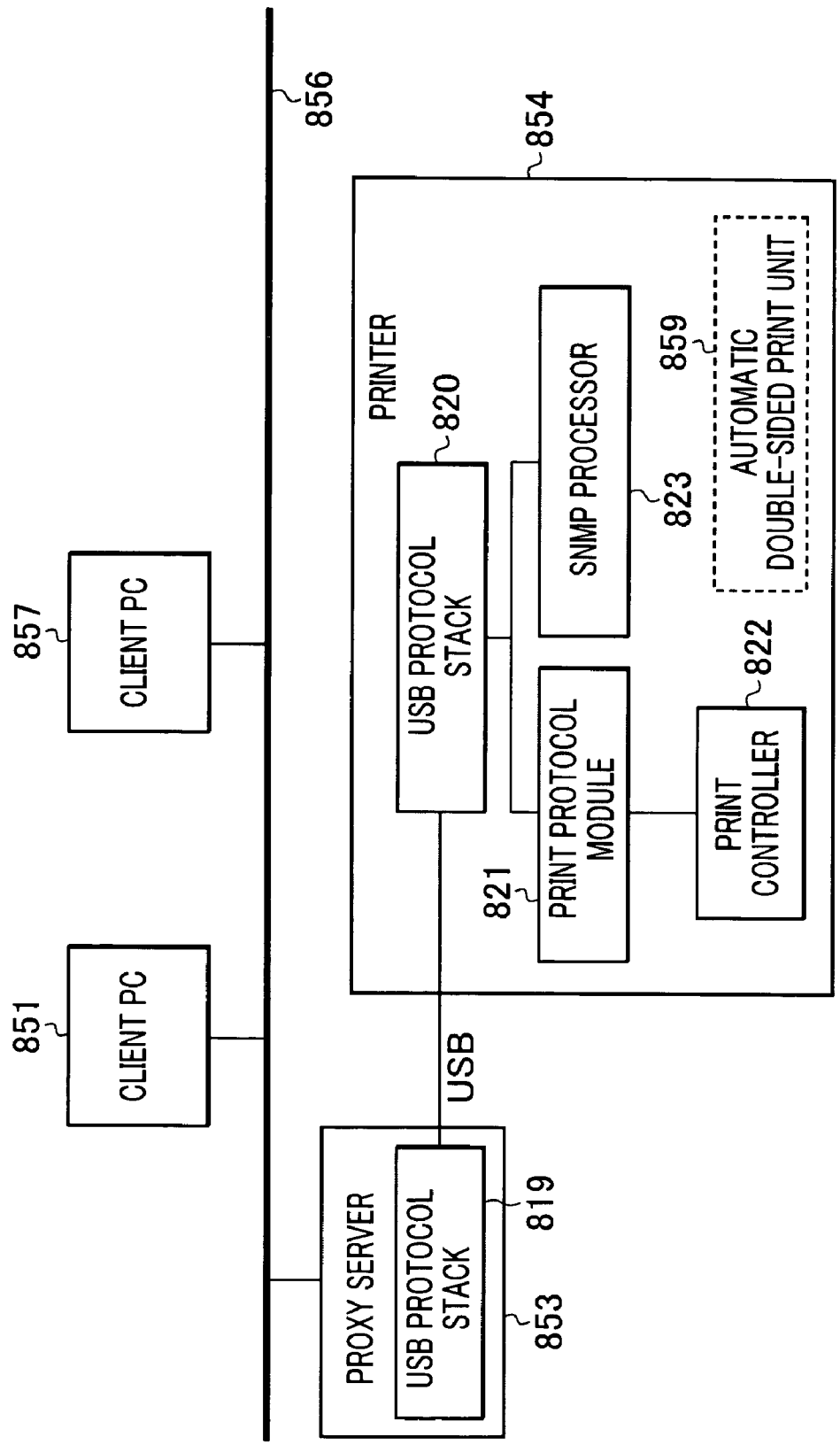
FIG. 6 is a block diagram illustrating a third part of the print network system of the same embodiment.

A print network system (peripheral device control system) constructed in accordance with an embodiment of the present invention includes an information processing apparatus and a peripheral device. First, second, and third parts of the print network system are shown in FIGS. 1, 5, and 6, respectively.

In the first part, the information processing apparatus can be client PCs 851 and 857, and the peripheral device can be a printer 855. The client PCs 851 and 857 and the printer 855 can communicate with each other via a network 856, such as an Ethernet (registered) network. Although the peripheral device is shown as the printer 855 by way of example in FIG. 1, another printer, a copying machine, a facsimile machine, an image forming device having a composite function of such elements, a scanner, or a digital camera may be used as the peripheral device.

The present invention is implemented by an application (software) run by the client PCs 851 and 857 and an application (software) running in the printer 855. Such applications are formed of functional modules, which are represented by the blocks of the client PC 851 and the printer 855.

Figure 2:
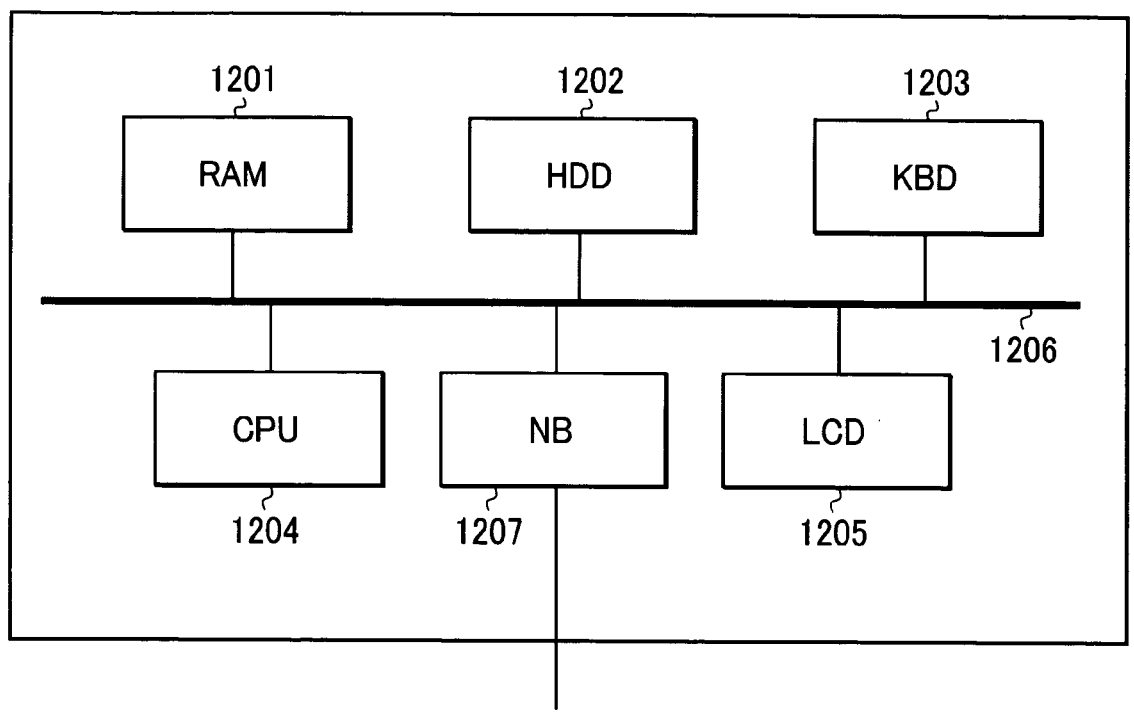
FIG. 2 is a block diagram illustrating an example of the hardware configuration of a client PC.

The client PC 851 has a hardware configuration as shown in FIG. 2, Windows XP from Microsoft Corporation installed as the OS, and Microsoft Internet Explorer (registered) Version 6.0 (hereinafter referred to as "IE6") installed as the web browser.

In FIG. 1, the client PC 851 contains an automatic driver install application 1 running on the OS of the client application PC 851. The automatic driver install application 1 includes an automatic driver download/setting module 100, a simple object access protocol (SOAP) request issuing processor 4, a SOAP response analyzing processor 5, a configurator module 7, a memory controller 8, and a graphical user interface (GUI) module 6.

The client PC 851 also contains a Transmission Control Protocol (TCP)/User Datagram Protocol (UDP)/Internet Protocol (IP) stack 2, which serves as a communication function, and a Hypertext Transfer Protocol (HTTP) unit 3 compliant with HTTP1.1 located between the automatic driver install application 1 and the TCP/UDP/IP stack 2.

The GUI module 6 interactively accepts a request from the user and displays the processing result. The configurator module 7 installs the driver obtained from the printer 855 via the network 856, together with network information also obtained from the printer 855, into a storage unit (not shown) provided for the client PC 851, and also registers driver information in the OS. When installing the driver, the configurator module 7 checks for memory space in the storage unit via the memory controller 8 and also controls the storage unit.

The printer 855 is a network UPnP-compatible printer in which Linux is installed as the OS for controlling the printer 855. The printer 855 is provided with a TCP/UDP/IP stack 9 as the communication function. The TCP/UDP/IP stack 9 includes an HTTP unit 10 compliant with HTTP1.1, a SOAP request analyzing processor 11, and a SOAP response issuing processor 12.

The TCP/UDP/IP stack 9 has a print protocol module 13 having a function of analyzing a printer request issued from the client PC 851 and sending the request to a print controller 14.

A memory controller 15 manages directory information indicating the storage location of the driver and manages data size information. The memory controller 15 also sends the driver read from the storage unit to the HTTP unit 10.

The SOAP request analyzing processor 11 and the SOAP response issuing processor 12 form a UPnP device controller 60, which is described in detail below.

As in the client PC 851, the client PC 857 has a hardware configuration shown in FIG. 2. A Mac OS (registered) by Apple Computer Inc. and Internet Explorer (registered) 5 Macintosh Edition (hereinafter referred to as "IE5") are installed on the client PC 857. A web server 858 has a function of publishing homepages, such as presentation pages, which are described below, print-setting UI presentation pages, and status-monitor UI presentation pages.

FIG. 2 is a block diagram illustrating an example hardware configuration of the client PC 851 or 857. A description of the hardware configuration of the client PC 851 is given below as an example.

The client PC 851 includes random access memory (RAM) 1201, a hard disk drive (HDD) 1202, which serves as a storage device, a keyboard device (KBD) 1203 as an example of an input unit, a central processing unit (CPU) 1204 of a controller, a display (LCD) 1205 as an example of a display unit, a network board (NB) 1207 as an example of a communication controller, and a bus 1206 for connecting the above elements of the client PC 851 to each other. The storage device 1202 may be a portable CD-ROM or a built-in ROM.

The functional modules 1 through 8 of the client PC 851 shown in FIG. 1 are stored in the HDD 1202, and when necessary, they are read out to the RAM 1201 and are executed by the CPU 1204. Accordingly, the CPU 1204 implements the functions of the modules 1 through 8 shown in FIG. 1.

The printer 855 shown in FIG. 1 has the same configuration as the hardware configuration shown in FIG. 2, except for the print controller 14 performing a printing operation. In this case, the modules 9 through 13 and 15 of the printer 855 shown in FIG. 1 are stored in the HDD 1202, and when necessary, they are read out to the RAM 1201 and are executed by the CPU 1204.

In most cases, the memory controller 8 of the client PC 851 and the memory controller 15 of the printer 855 are formed of independent hardware.

Figure 3:
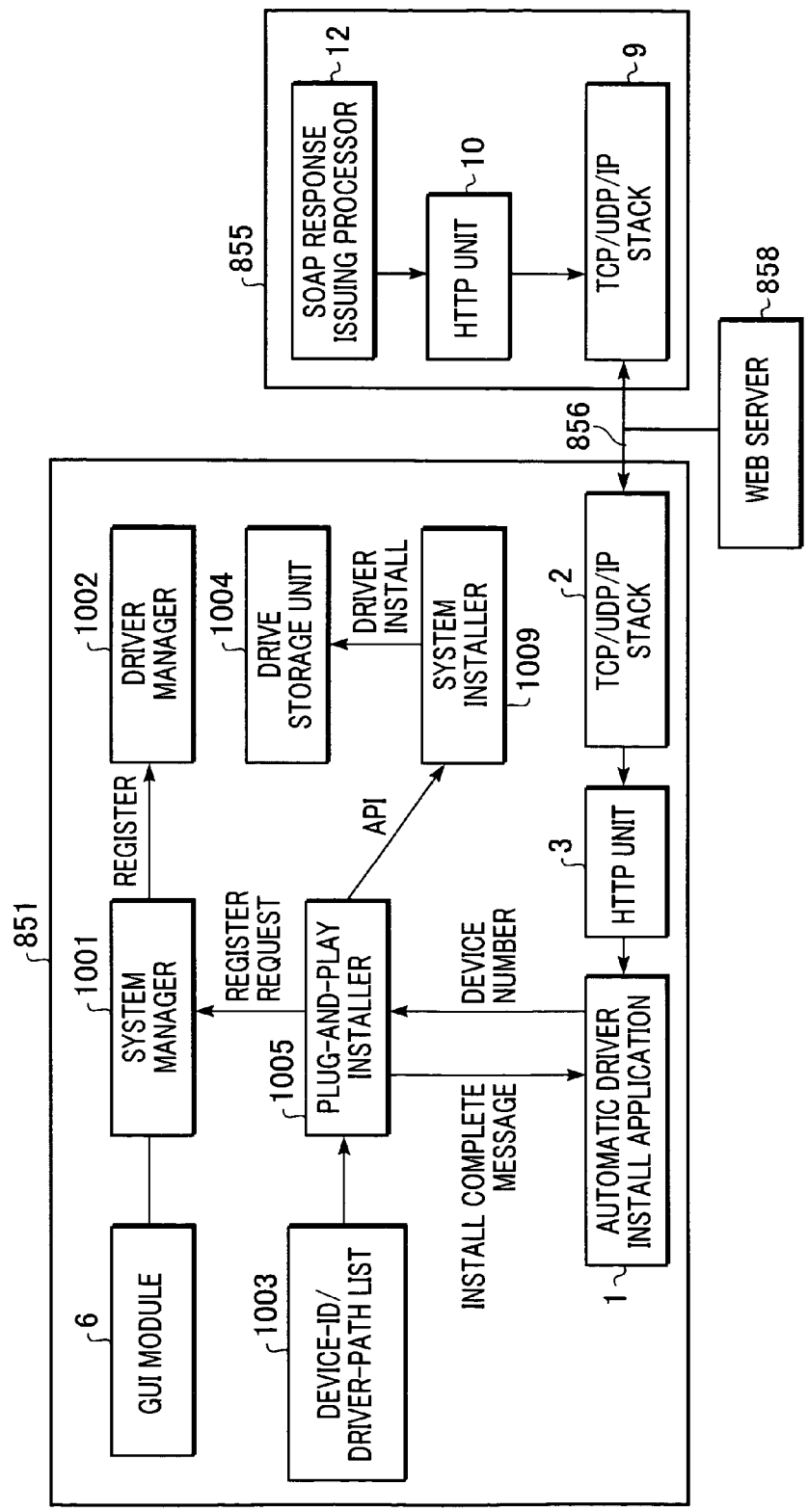
FIG. 3 is a block diagram illustrating details of a software configuration for installing a device driver into a client PC.

FIG. 3 is a block diagram illustrating a detailed software configuration for installing a device driver in the client PC 851. In FIG. 3, the same elements as those shown in FIG. 1 are indicated by like reference numerals.

The automatic driver install application 1, the TCP/UDP/IP stack 2, the HTTP unit 3, the GUI module 6, a system manager 1001, a driver manager 1002, a device-ID/driver-path list 1003, a drive storage unit 1004, a plug-and-play installer 1005, and a system installer 1009 are formed of program modules. Such program modules are stored in an external memory of the client PC 851, and when necessary, they are read out to the RAM 1201 and are executed by the CPU 1204.

The device number is information for identifying a peripheral device (for example, the printer 855).

The device-ID/driver-path list 1003 is a database consisting of a device number and a driver path list, forming a set. The driver path is, for example, an external memory, provided for a host computer for the device driver (the printer driver in this example).

The plug-and-play installer 1005 searches for the driver path by using the device number as the key so as to obtain the printer driver stored in the driver path. Then, the system installer 1009, which serves as a printer driver installer, installs the printer driver into the driver storage unit 1004.

Figure 4:
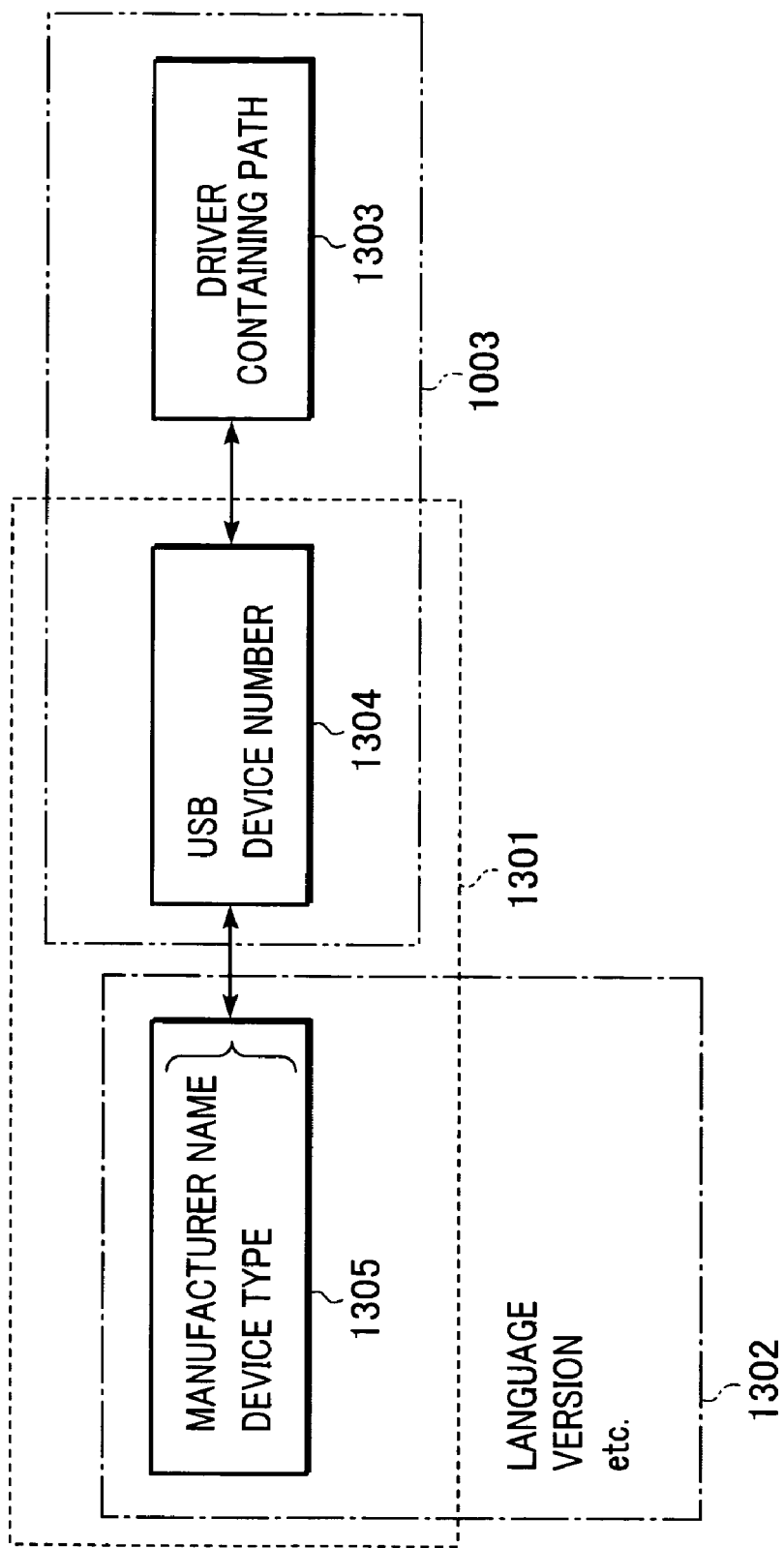
FIG. 4 illustrates a table of an automatic driver install application.

FIG. 4 illustrates a table 1301 within the automatic driver install application 1.

In this table 1301, a device ID 1305 consisting of a manufacturer name and a device type as part of device information 1302, a universal serial bus (USB) device number 1304, and a driver containing path 1303 are stored. In the table 1301, the device ID 1305 and the USB device number 1304 are associated with each other. In the device-ID/driver-path list 1003, the USB device number 1304 is associated with the driver containing path 1303.

FIG. 5 is a block diagram illustrating the second part of the print network system constructed in accordance with this embodiment of the present invention.

In the second part, the client PCs 851 and 857, a network-compatible printer 852, and a proxy server 853 are connected with each other via the network 856 so that they can communicate with each other. The client PCs 851 and 857 and the network 856 are the same as those shown in FIG. 1.

The proxy server 853 is a proxy response device and has the same hardware configuration shown in FIG. 2. With this hardware configuration, the function of modules such as a SOAP response issuing processor 815, a SOAP request analyzing processor 816, a simple network management protocol (SNMP) processor 817, an HTTP unit 814, a TCP/UDP/IP stack 813, and a USB protocol stack 819 can be implemented. The USB protocol stack 819 is formed of a USB host controller for controlling a USB bus (two-way communication interface).

The printer 852 has the same hardware configuration as shown in FIG. 2. Modules such as a TCP/UDP/IP stack 809, an SNMP processor 810, a print protocol module 811, and a print controller 812 are read out to the RAM 1201 from the HDD 1202 and are executed by the CPU 1204. The print controller 812 may be executed by a CPU different from the CPU 1204 of the printer 852.

The printer 852 is not provided with a UPnP device controller, such as the UPnP device controller 60 provided for the printer 855 shown in FIG. 1.

In the proxy server 853, the SOAP response issuing processor 815 and the SOAP request analyzing processor 816 form a UPnP device controller 818. The UPnP device controller 818 has a function similar to that of the UPnP device controller 60 of the printer 855, and also, when detecting a UPnP-incompatible printer (printer 852) on the network 856, the UPnP device controller 818 can handle the printer 852 as a pseudo-UPnP-compatible printer (proxy server function). A description of the UPnP device controller 818 and the pseudo-UPnP compatibility in the printer 852 are given in detail below.

FIG. 6 is a block diagram illustrating the third part of the print network system constructed in accordance with this embodiment of the present invention.

In the third part, the client PCs 851 and 857, the proxy server 853, and a local connection printer 854 using a USB interface are connected with each other via the network 856 so that they can communicate with each other. The client PCs 851 and 857 and the network 856 are the same as those shown in FIG. 1, and the proxy server 853 is the same as that shown in FIG. 5, though they are not shown (only the USB protocol stack 819 is shown in FIG. 6).

The third part of the print network system has the same hardware configuration shown in FIG. 2. Modules such as a USB protocol stack 820 for controlling the USB, an SNMP processor 823, a print protocol module 821, and a print controller 822 are read out to the RAM 1201 from the HDD 1202 and are executed by the CPU 1204. The print controller 822 may be executed by a CPU different from the CPU 1204 of the printer 854.

The printer 854 is not provided with a UPnP device controller, such as the UPnP device controller 60 provided for the printer 855 shown in FIG. 1. However, due to the proxy server function of the UPnP device controller 818 (FIG. 5) of the proxy server 853, when detecting an UPnP-incompatible printer (printer 854) on a local port (USB port), the UPnP device controller 818 can handle the printer 854 as a pseudo-UPnP-compatible printer. The pseudo-UPnP-compatibility in the printer 854 is described in detail below. When a detachable automatic double-sided print unit 859 is attached to the printer 854, double-sided printing is automatically performed in the printer 854. It is assumed that the automatic double-sided print unit 859 is not yet attached to the printer 854.

It is now assumed that the following conditions are set. The computer name of the proxy server 853 is PC_ABE. For the printer 854, the manufacturer name is ABC, the device type is PrintMdl-M, and the manufacture number is 000777. The printer 854 is connected to the proxy server 853 via a USB, and the driver for the printer 854 is installed in the proxy server 853 so that a printing operation is correctly performed in the printer 854 via the proxy server 853. The client PCs 851 and 857 can refer to the printer 854 as a common printer on the network 856 via the proxy server 853. The printer (display) name of the printer 854 connected to the proxy server 853 in which the driver is installed and the printer (display) name of the printer 854 considered as the common printer are the same, i.e., ABCPrintMdl-M.

Figure 7:
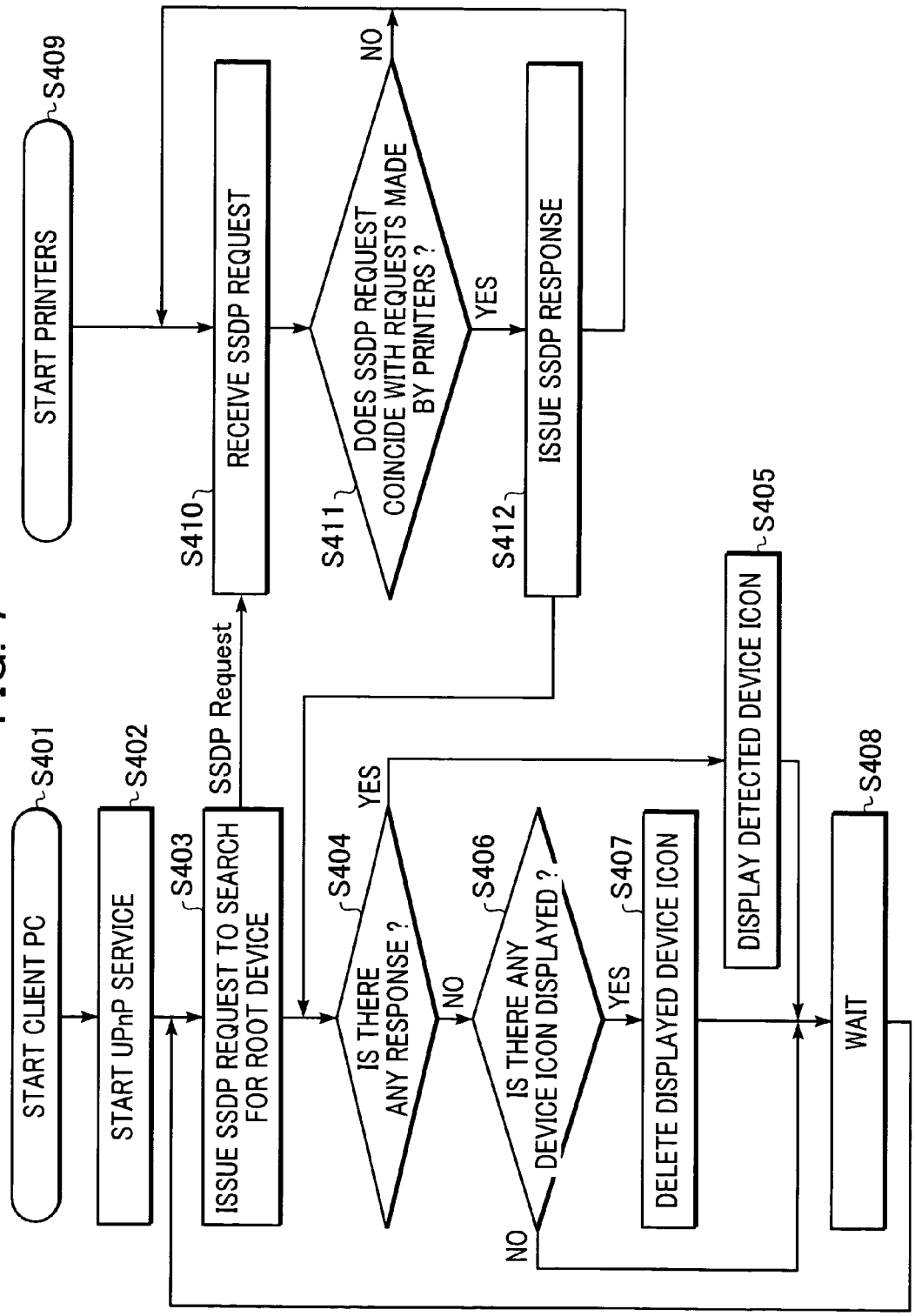
FIG. 7 is a flowchart illustrating a UPnP-compatible device detecting process executed by a client PC provided with Windows XP.

FIG. 7 is a flowchart illustrating an UPnP-compatible device detecting process executed in the client PC 851 containing Windows XP as the OS. This flowchart also includes processing for responding to a request from the client PC 851 by the corresponding printer.

In FIG. 7, the client PC 851 is started in step S401, and a UPnP service is started in step S402. Then, in step S403, the client PC 851 issues a Simple Service Discovery Protocol (SSDP) request (one type of HTTP request) to search for a UPnP root device to a peripheral device (printer).

It is then determined in step S404 whether there is a response to this SSDP request from a device (peripheral device). If the result of step S404 is YES, the client PC 851 detects the device that has responded to the SSDP request, and displays the device icon on a My Network Places folder in step S405. Then, after waiting for a predetermined time (for example, one minute), the process returns to step S403.

If it is determined in step S404 that there is no response to the SSDP request, the client PC 851 determines in step S406 whether an icon of the device that has not responded to the SSDP request is displayed in the My Network Places folder. If the outcome of step S406 is YES, the icon is deleted in step S407, and the process proceeds to step S408. If it is determined in step S406 that there is no device icon displayed, the process proceeds to step S408.

In step S409, the printer 855 shown in FIG. 1, the printer 852 and the proxy server 853 shown in FIG. 5, and the printer 854 and the proxy server 853 shown in FIG. 6 are started. Then, in step S410, they receive the SSDP request issued in step S403. The printers 855, 852, and 854 then determine in step S411 whether the SSDP request coincides with requests (SSDP requests to search for the UPnP root devices) supported by the printers 855, 852, and 854. If the result of step S411 is YES, the corresponding printer issues an SSDP response to the client PC 851 in step S412, and returns to step S410 to wait for an SSDP request. If the outcome of step S411 is NO, the process returns to step S410.

As described above, when there are UPnP-compatible devices in the print network system, the icons of such devices are displayed in the My Network Places folder of the client PC 851, thereby allowing the client PC 851 to control the devices.

Figure 8:
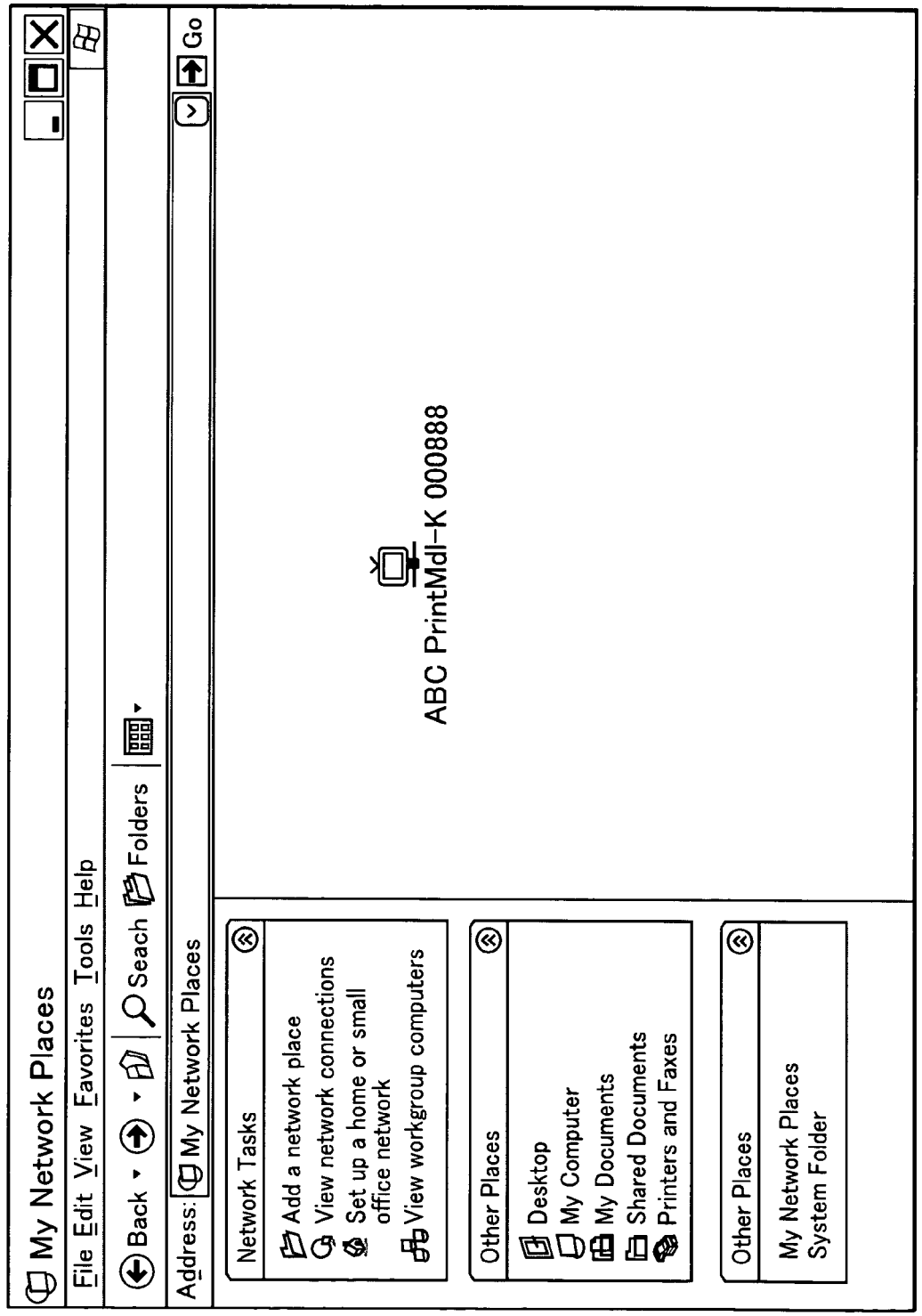
FIG. 8 illustrates an example of a My Network Places folder displayed on the display unit of a client PC.

FIG. 8 illustrates an example of the My Network Places folder displayed on the display unit of the client PC 851.

FIG. 8 shows that the icon of the printer 855 (FIG. 1) is being indicated in step S405 of FIG. 7. FIG. 8 shows that the UPnP-compatible printer 855 i.e., ABC PrintMdl-K 000888, is available in the standby mode. In this printer name, ABC is the manufacturer name, PrintMdl-K is the device type, and 000888 is the manufacture number unique to the printer.

The device name is displayed on the display unit in the form of the manufacturer name, the device type, and the manufacture number. Accordingly, even if there is a plurality of peripheral devices of the same type with different manufacture numbers on the network, the user can distinguish the individual devices from the device names without erroneously accessing unintended devices.

FIG. 9 illustrates an example of the HTTP requests issued from the client PC 851.

The HTTP request shown in FIG. 9 is an SSDP request to search for a UPnP root device issued in step S403 of FIG. 7 or step S4703 of FIG. 36, which is discussed below. The numbers indicated at the left side of FIG. 9 are line numbers. Details of the SSDP requests are indicated in Universal Plug and Play Device Architecture V1.0 standardized by the UPnP Forum, and only the parts related to the present invention are described below.

In FIG. 9, the third line shows Search Target in which upnp:rootdevice representing the UPnP root device is designated. The fourth line shows MAN in which "ssdp:discover" is designated, and in this example, Simple Service Discovery Protocol (SSDP) defined in Universal Plug and Play Architecture V1.0 is used.

In the example shown in FIG. 9, the client PC 851 issues an HTTP packet having the format shown in FIG. 9 to the multicast address "239.255.255.250" and the port number "1900". A search request made in the form of the HTTP request is not restricted to a UPnP search request.

FIG. 10 shows an example of the HTTP responses returned to the client PC 851.

The HTTP response shown in FIG. 10 indicates an SSDP response issued from the printer 855 in step S412 of FIG. 7 or step S4713 of FIG. 36, which is discussed below.

The numbers indicated at the left side of FIG. 9 are line numbers. Details of the HTTP responses are indicated in Universal Plug and Play Device Architecture V1.0 standardized by the UPnP Forum, and only the parts related to the present invention are described below.

In FIG. 10, the Uniform Resource Locator (URL) indicating the XML Device Description of the UPnP device supported by the printer 855 is specified in the fourth line. The XML Device Description is discussed below with reference to FIGS. 11, 32, and 33.

The sixth line indicates the Notification Type, and in this example, the device type, i.e., Printer:1 standardized by the UPnP Forum, is designated.

The seventh line indicates the Notification Sub Type, and in this example, ssdp:alive indicating that the device is ready is designated.

The ninth line indicates the Unique Service Name, and in this example, the Universally Unique Identifier (UUID) of the device is designated.

In the example shown in FIG. 10, since the Simple Service Discovery Protocol (SSDP) defined in Universal Plug and Play Architecture V1.0 is used, the printer 855 issues an HTTP packet in the format shown in FIG. 10 to the multicast address "239.255.255.250" and the port number "1900". A response in the form of the HTTP response is not restricted to a UPnP response.

FIG. 11 illustrates a basic example of details of the XML Device Description of the UPnP device supported by the printer 855.

The numbers indicated at the left side of FIG. 11 are line numbers. Details of this description are indicated in Universal Plug and Play Device Architecture V1.0 standardized by the UPnP Forum, and only the parts related to the present invention are described below.

In FIG. 11, the second line through the 30th line show a root element indicating that the printer 855 is compliant with a device standardized by the UPnP Forum.

The seventh line through the 29th line show a device element.

The eighth line shows a deviceType element indicating that the printer 855 is a Printer Device V1.0 device standardized by the UPnP Forum.

The ninth line shows a friendlyName element, which is used as the device name of the icon of the UPnP-compatible device displayed in the My Network Places folder shown in FIG. 8. The friendlyName element is formed of the manufacturer name (ABC), the device type (PrintMdl-K), and the manufacture number (000888). Accordingly, even if there is a plurality of peripheral devices of the same type with different manufacture numbers on the same network, the user can distinguish the individual devices from the device names without erroneously accessing unintended devices.

The tenth line shows a manufacturer element in which the manufacturer name is indicated.

The 11th line shows a manufacturer URL element in which the homepage URL of a manufacturer web site is indicated.

The 12th line shows a modelDescription element in which the end user ID is indicated.

The 13th line shows a modelName element in which the device type is indicated.

The 14th line shows a serialNumber element in which the manufacture number is indicated.

The 15th line shows a UDN element in which the Unique Device Name is indicated.

The 16th line through the 26th line show a serviceList element.

The 17th line through the 25th line show a service element in which UPnP services supported by this printer, i.e., the printer 855, are indicated.

The 18th line shows a serviceType element indicating that the printer 855 supports Printer Basic Service V1.0 standardized by the UPnP Forum.

The 19th line shows a serviceId element indicating the ID of this service.

The 20th line shows a SCPDURL element indicating the URL for the Service Description, i.e., the Service Control Protocol Definition URL.

The 21st and 22nd lines show a controlURL element indicating the URL for controlling the device.

The 23rd and 24th lines show an eventSubURL element indicating the URL for an event.

The 27th and 28th lines show a presentationURL element indicating the URL for making the device open.

Figure 12:
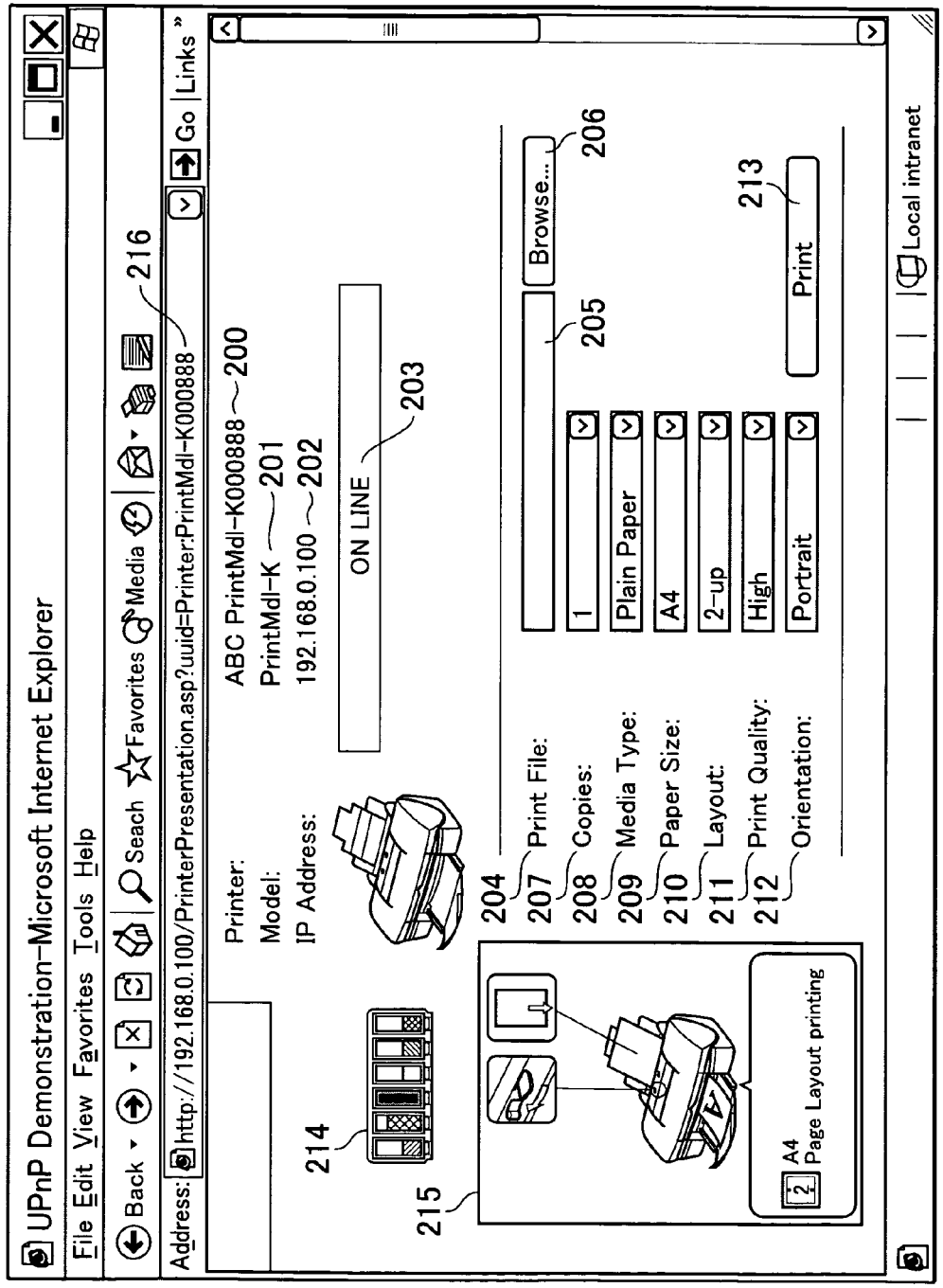
FIG. 12 illustrates a presentation page published by a printer and displayed on a client PC.

FIG. 12 illustrates the screen of the client PC 851 on which a presentation page published by the printer 855 is displayed.

In the client PC 851 shown in FIG. 8, when the icon "ABC PrintMdl-K 000888" of the printer 855, which is a UPnP-compatible device, is double-clicked, the web browser (IE6) is started by using the URL designated by the presentationURL element in the 27th and 28th lines in FIG. 11 as the argument. Then, the presentation page shown in FIG. 12 is displayed. This presentation page is formed of Active Server Pages (hereinafter referred to as "ASP") in the form of dynamically created Hypertext Markup Language (HTML) data so that the status of the printer 855 can be reflected and displayed in real time. The content of the presentation page is automatically updated at regular intervals (for example, every five seconds) by using JavaScript (registered). Accordingly, by using this function in combination with the above-described ASP function, the display content can be updated in real time about every five seconds.

In FIG. 12, in an address display portion 216, the URL of this presentation page is indicated. In a printer-name display portion (Printer:) 200, a printer name, which is a UPnP-compatible device name, such as that shown in FIG. 8, of the printer 855 is indicated. In a device-type display portion (Model:) 201, the device type of printer 855 is indicated. In an IP-address display portion (IP Address:) 202, the IP address of the printer 855 is indicated. In a printer-status display portion 203, the operating status of the printer 855 is indicated (in the example of FIG. 12, "ON LINE" is shown).

A file selection portion (Print File:) 204 consists of a file-name display portion 205 and a reference button (Browse . . . ) 206. When selecting a file to be printed by clicking the reference button 206, the file name is displayed in the file name display portion 205.

In a number-of-copy specifying portion 207, the number of copies can be designated in a range of 1 to 100.

In a paper-type selection portion (Media Type:) 208, the type of paper can be selected from Plain Paper, Photo Paper, and OHP Sheet.

In a paper-size selection portion (Paper Size:) 209, the paper size can be selected from A4, A5, B5, and Letter.

In a print-layout selection portion (Layout:) 210, the print layout can be selected from 1-up, 2-up, and 4-up.

In a print-quality selection portion (Print Quality:) 211, the print quality can be selected from High, Standard, and Draft.

In a print-orientation selection portion (Orientation:) 212, the print orientation can be selected from Portrait and Landscape.

By clicking a print button (Print) 213, the printing operation can be started.

In a remaining-ink display portion 214, the remaining amount of ink in an ink cartridge installed in the printer 855 is indicated.

In an operating guide portion 215, an operating guide for assisting the user operation is indicated.

By using this presentation page, a printing operation can be performed in the printer 855 from the client PC 851 or 857 without the need to install the driver for the printer 855 in the client PC 851 or 857 (hereinafter such a printing operation is referred to as "driver-less printing").

Figure 13:
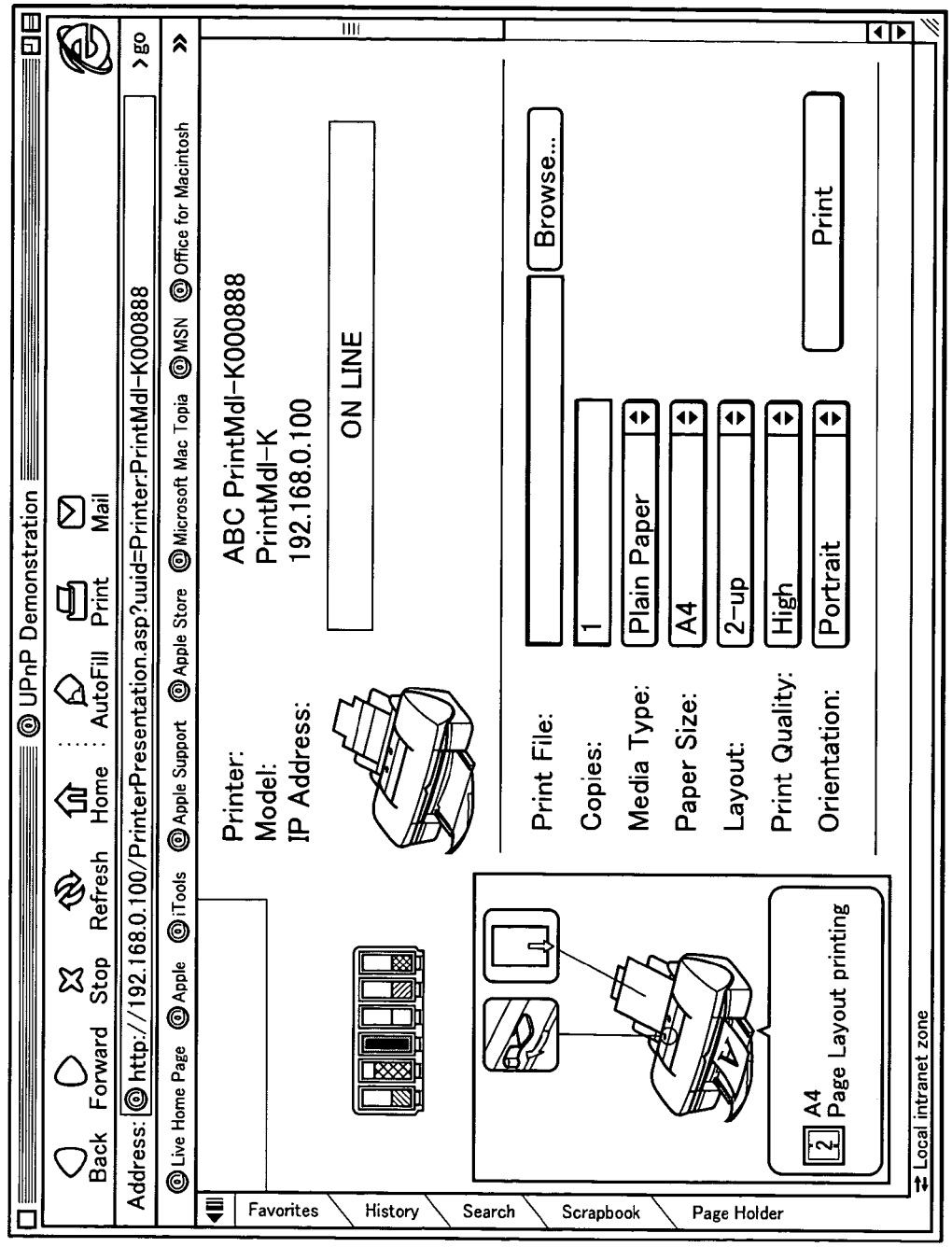
FIG. 13 illustrates a presentation page published by a printer and displayed on a client PC.

FIG. 13 illustrates the screen of the client PC 857 on which the presentation page published by the printer 855 is displayed.

The client PC 857 displays the presentation page stored in the URL designated by the presentationURL element in the 27th and 28th lines shown in FIG. 11 in the printer 855 by using the OS (Mac OS) and the web browser (IE5) different from those of the client PC 851. However, the individual parts of the presentation page of FIG. 13 are similar to those of FIG. 12, though they are slightly different.

In this manner, by storing a single UI, such as the above-described presentation page, in the printer 855, different client PCs can operate the UI to perform the driver-less printing operation. This eliminates the need to develop different UIs for different client PCs, thereby reducing the number of steps for developing the UI. Since the same UI is used for all types of client PCs, the user does not have to feel uncomfortable when using different client PCs, thereby improving the user operability.

Figure 14:
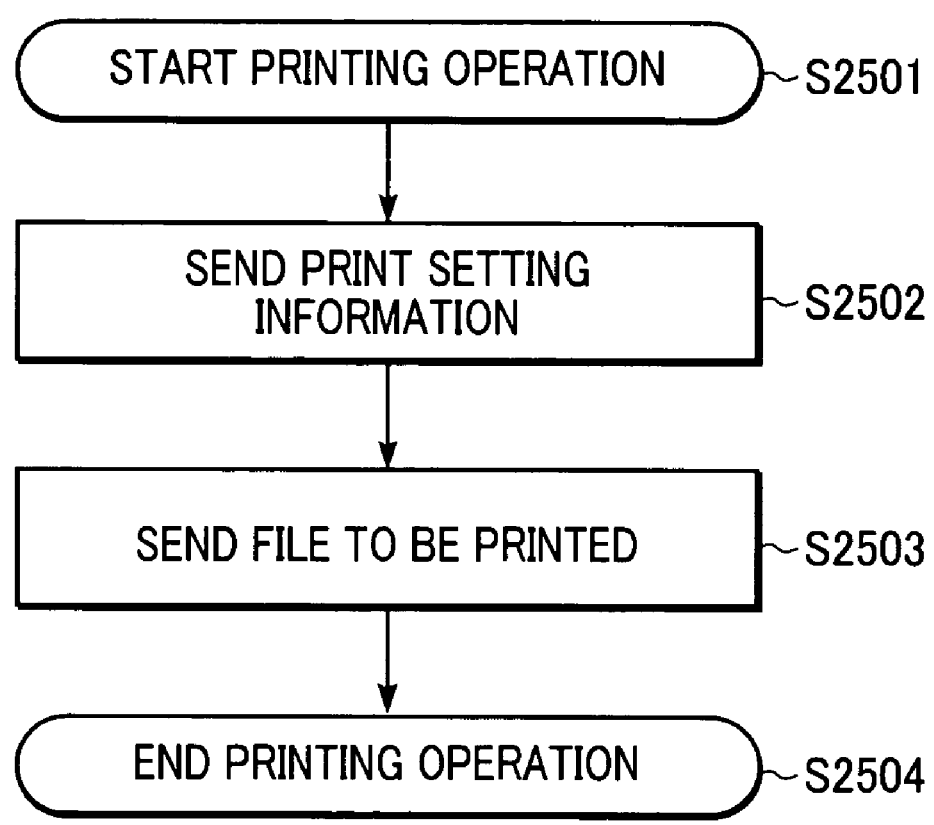
FIG. 14 is a flowchart illustrating a driver-less printing process executed by a client PC by using the presentation page shown in FIG. 12 or 13.

FIG. 14 is a flowchart illustrating a printing process when the client PC 851 or 857 performs the driver-less printing operation by using the presentation page shown in FIG. 12 or 13, respectively. In the following description, the client PC 851 performs the printing operation by using the presentation page shown in FIG. 12 by way of example.

In FIG. 14, in step S2501, the print button 213 is clicked. Then, in step S2502, print setting information set in the print setting portions 207 through 212 shown in FIG. 12 are sent to the printer 855. Also, in step S2503, the print file selected in the file selection portion 204 is sent to the printer 855. Then, in step S2504, the driver-less printing operation by the client PC 851 is completed.

The print setting information sent to the printer 855 in step S2502 is stored in the printer 855 together with the information concerning the client PC 851 in association with each other. The information concerning the client PC 851 and the print setting information are used as initial information when this presentation page is accessed from the client PC 851 for the next time. Accordingly, when the user accesses the presentation page the next time, the user's favorite print settings are initially displayed on the presentation page, thereby improving user operability.

Figure 15:
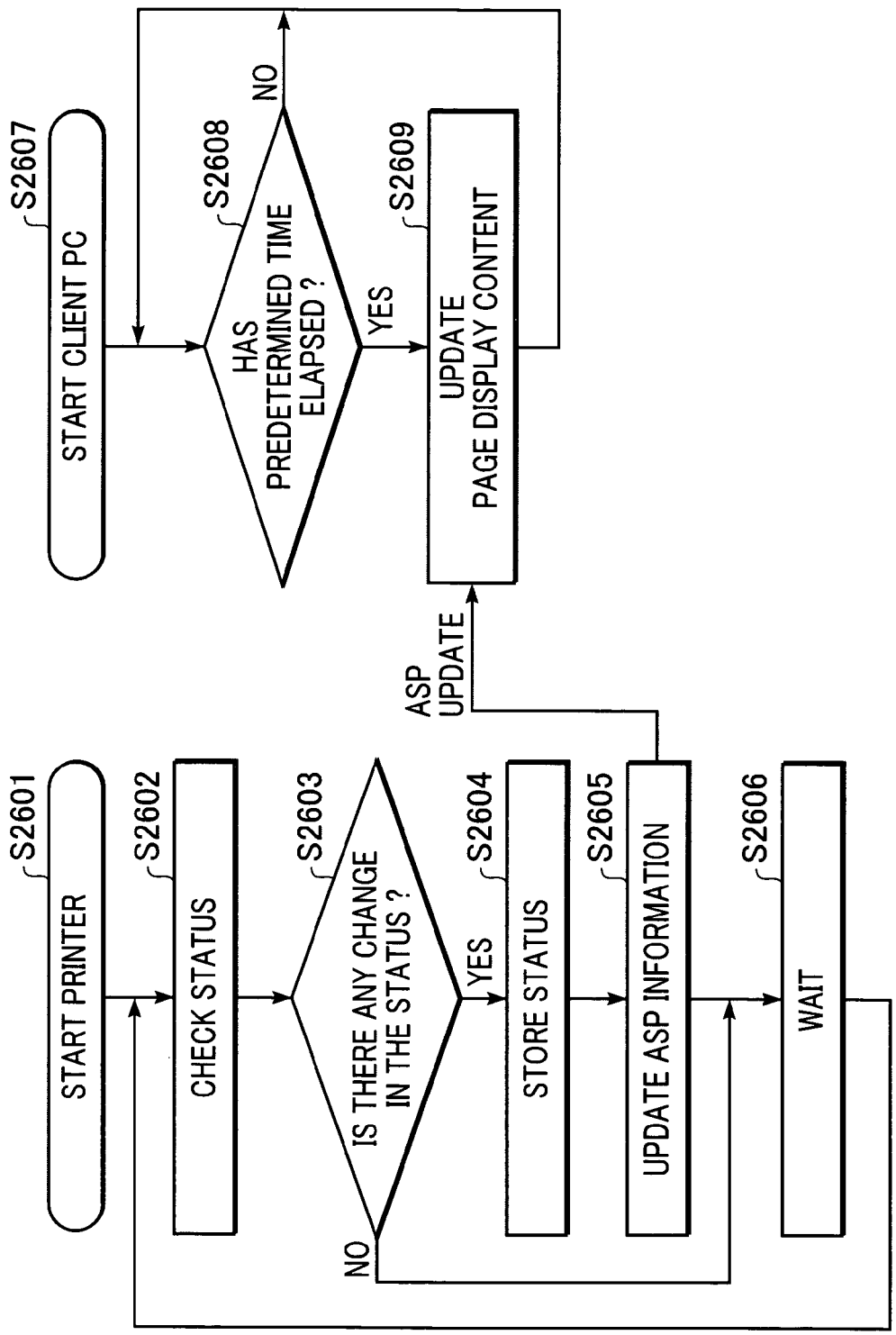
FIG. 15 is a flowchart illustrating a status detecting process performed by a printer when driver-less printing is performed by using the presentation page shown in FIG. 12 or 13, and also illustrates a printer-status display process executed by a client PC.

FIG. 15 is a flowchart illustrating a status detecting process performed by the printer 855 and a process for displaying the status of the printer 855 by the client PC 851 or 857 when the client PC 851 or 857 performs the driver-less printing operation by using the presentation page shown in FIG. 12 or 13, respectively. In the following description, the client PC 851 performs a process for displaying the status of the printer 855 by using the presentation page shown in FIG. 12 by way of example. Displaying the status of the printer 855 involves displaying the status of the printer-name display portion 200, the device-type display portion 201, the IP-address display portion 202, the printer-status display portion 203, and the remaining-ink display portion 214.

In FIG. 15, when the process for detecting the status of the printer 855 is started in step S2601, the operating status of the printer 855 is checked in step S2602. It is then determined in step S2603 whether there is a change in the status by comparing the current status with the previous status. If the outcome of step S2603 is YES, the latest status is stored in step S2604, and the ASP information concerning the presentation page stored in the printer 855 is updated in step S2605. Then, after waiting for a predetermined period (for example, five seconds) in step S2606, the process returns to step S2602. If it is determined in step S2603 that there is no change in the status, the process proceeds to step S2606.

Meanwhile, in step S2607, the process for displaying the status of the printer 855 (presentation page) by the client PC 851 is started. It is then determined in step S2608 whether a predetermined period (for example, five seconds) indicated by JavaScript has elapsed. If the result of step S2608 is YES, the display content of the presentation page shown in FIG. 12 on the web browser of the client PC 851 is updated in step S2609, and the process returns to step S2608.

As discussed above, by preparing only one simple presentation page, the status of the printer 855 can be reflected in real time in the presentation page shown in FIG. 12 or 13 of the client PC 851 or 857, respectively. Accordingly, the number of steps for developing the presentation page can be decreased, and the user operability can be increased.

Figure 16:
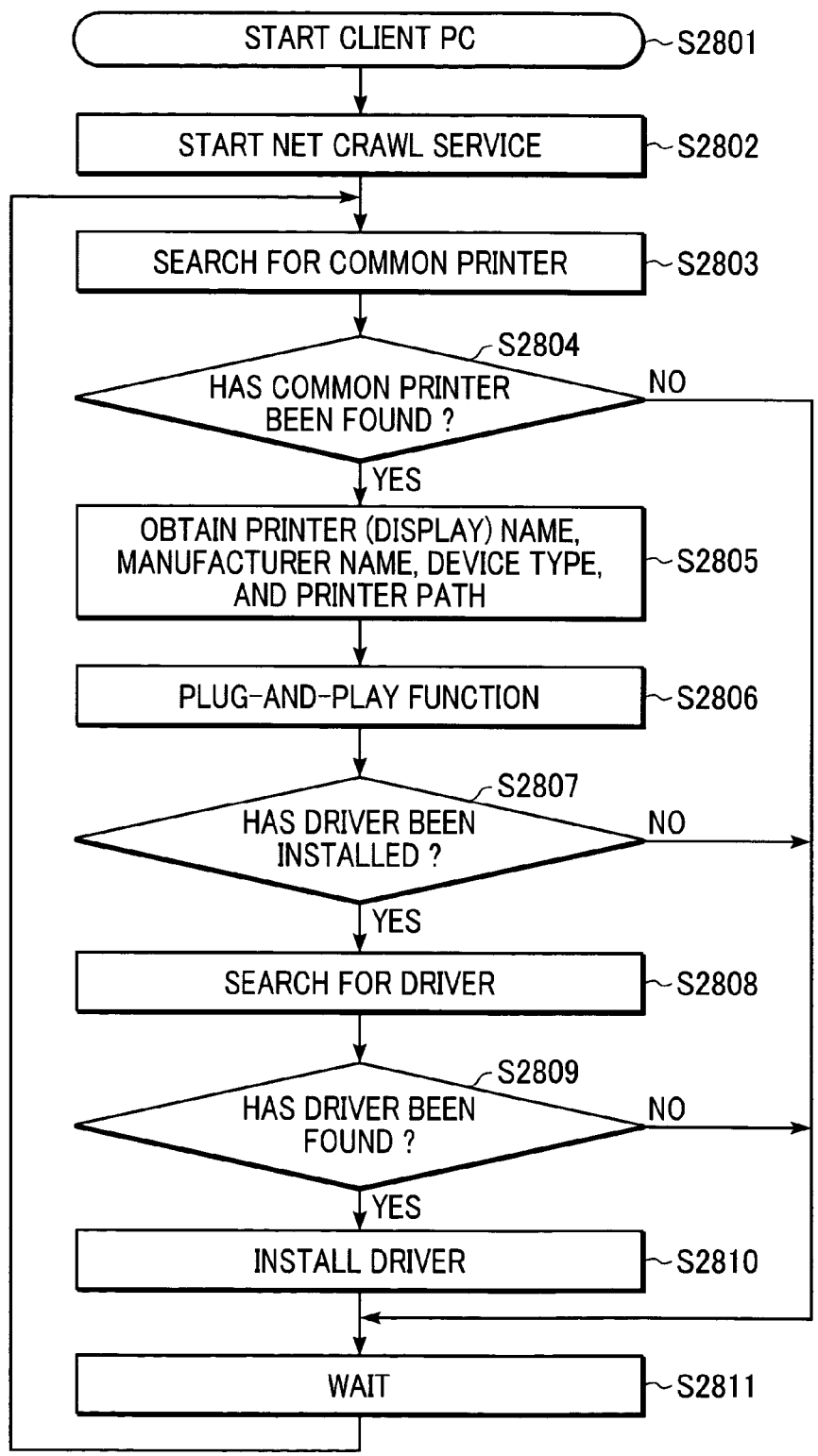
FIG. 16 is a flowchart illustrating an installing process executed by a client PC when installing a driver into the client PC by using the Net Crawl Service of Windows XP.

FIG. 16 is a flowchart illustrating an installing process when the client PC 851 installs a driver therein by using the Net Crawl Service of Windows XP. The Net Crawl Service can be used in an environment of, for example, the third part of the print network system shown in FIG. 6. Thus, the installing process is described below in the context of the third part shown in FIG. 6.

In FIG. 16, the client PC 851 is started in step S2801. The Net Crawl Service is then started in step S2802 to start searching for the common printer on the network 856 in step S2803. It is then determined in step S2804 whether the common printer (printer 854) has been found. If the result of step S2804 is YES, the client PC 851 obtains the printer (display) name, the manufacturer name, the device type, and the printer path from the proxy server 853 in step S2805. Then, in step S2806, the client PC 851 checks whether the driver for this printer 854 has been installed into the client PC 851 by the plug-and-play function of Windows XP. It is then determined in step S2807 whether the driver has been installed. If the outcome of step S2807 is NO, the client PC 851 searches for the driver for the printer 854 in another medium, for example, an HDD of the client PC 851 or a CD-ROM, in step S2808. It is then determined in step S2809 whether the driver has been found. If the driver has been found, the driver for the printer 854 is installed into the client PC 851 in step S2810.

When the driver for the printer 854 is installed (added) in (to) the client PC 851 by the Net Crawl Service as discussed above, the icon of this printer 854 is added to the Printers and Faxes folder of the client PC 851, as described below with reference to FIG. 17.

After waiting for a predetermined period (for example, one minute) in step S2811, the process returns to step S2803.

If it is determined in step S2804 that the common printer has not been found, the process proceeds to step S2811. If it is determined in step S2807 that the driver for the printer 854 has been installed in the client PC 851, the process proceeds to step S2811. Also, if it is determined in step S2809 that the driver for the printer 854 has not been found in another medium, for example, the HDD of the client PC 851 or a CD-ROM, the process proceeds to step S2811.

After installing the driver for the printer 854 into the client PC 851 by the Net Crawl Service, the printing operation can be performed in the printer 854 under the control of the client PC 851 in the same manner under the control of the proxy server 853.

Figure 17:
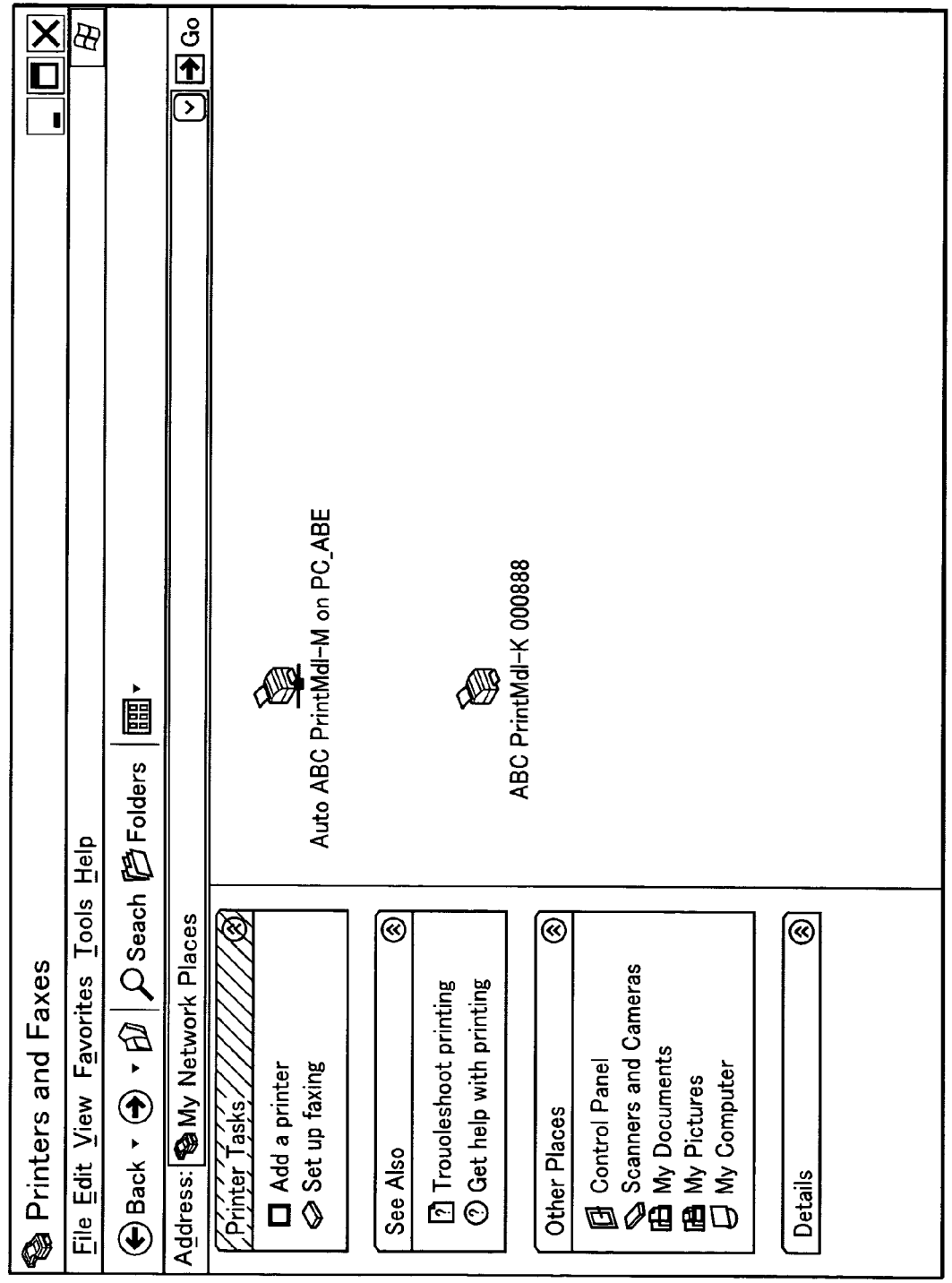
FIG. 17 illustrates a Printers and Faxes folder displayed on the display unit of a client PC.

FIG. 17 illustrates the Printers and Faxes folder displayed on the display unit of the client PC 851.

FIG. 17 shows that the icon of the printer 854 whose driver has been installed into the client PC 851 is displayed in the folder. The printer icon represented by Auto ABC PrintMDl-M on PC_ABE indicated as an example in FIG. 17 is the printer 854 whose driver has been installed into the client PC 851 in step S2810 of FIG. 16. As stated above with reference to FIG. 6, the computer name of the proxy server 853 is PC_ABE, and the printer (display) name of the printer 854, which is checked as the common printer, is ABC PrintMdl-M.

Accordingly, when the driver for the printer 854 is installed into the client PC 851 by using the Net Crawl Service, the printer (display) name referred to as Auto ABC PrintMdl-M on PC_ABE is automatically provided by the OS from the above computer name and printer (display) name.

Figure 18:
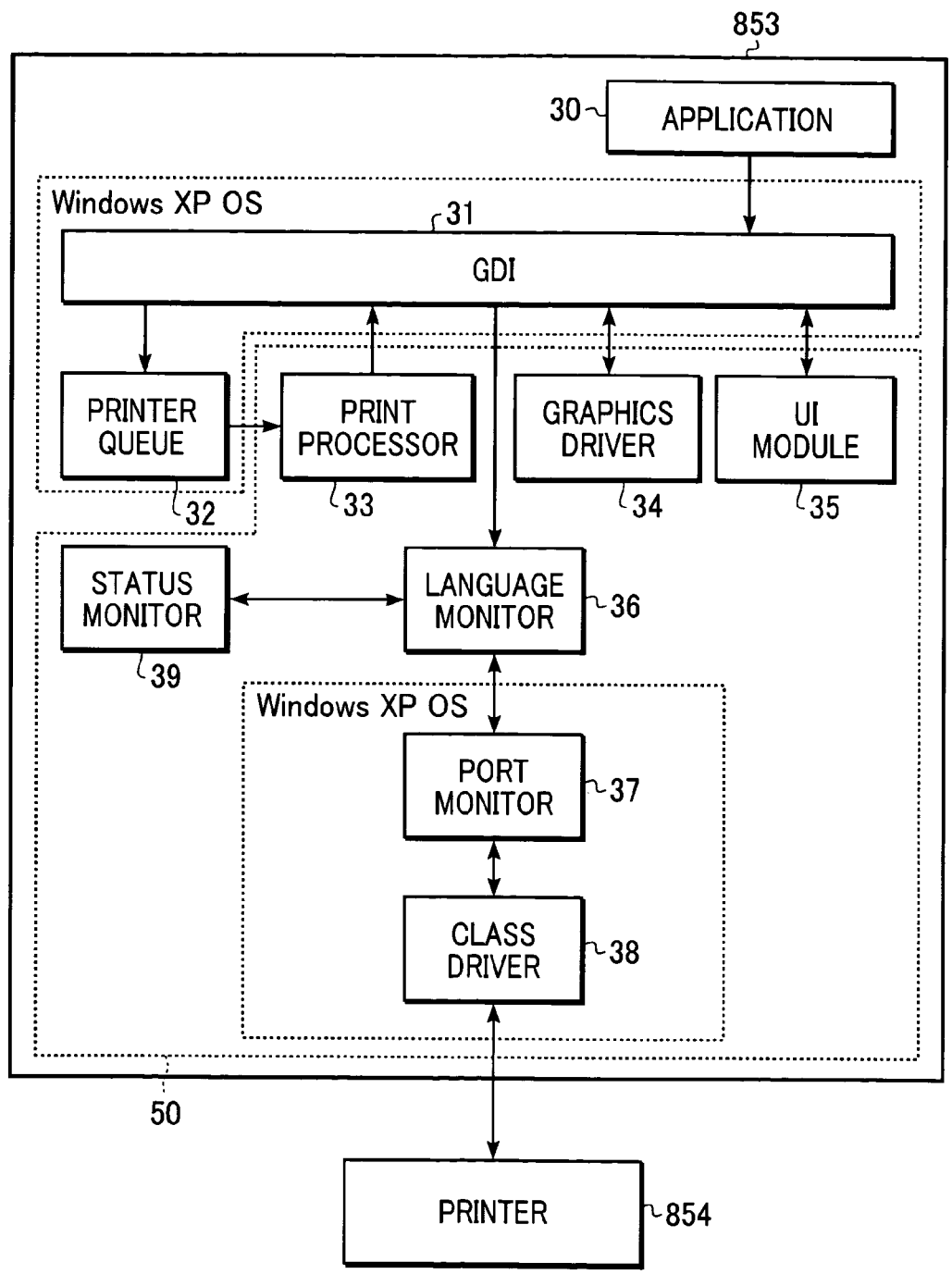
FIG. 18 is a block diagram illustrating the configuration of a printer driver in a proxy server.

FIG. 18 is a block diagram illustrating the configuration of a printer driver 50 installed in the proxy server 853. The printer driver 50 is formed of a plurality of modules 32 through 39, which are described in detail below.

An application 30 that can give print commands is, for example, Notepad (Notepad.exe), which is a text editor, included in Windows XP as a standard application.

A Graphics Device Interface (GDI) 31 is part of Windows XP.

A printer queue 32, which is part of Spooler of Windows XP, is used for queuing print jobs. The print jobs in a queue are displayed in a printer queue folder, which is described below with reference to FIG. 26.

A print processor 33 changes the print layout or performs special processing on print images.

A graphics driver 34 is operated as the core for the image processing of the printer driver 50, and performs image processing based on rendering commands sent from the GDI 31 so as to form print control commands.

A UI module 35 provides and controls a user interface for the printer driver 50.

A language monitor 36 controls the sending and receiving of data as a data communication interface I/F.

A port monitor 37 sends data supplied from the language monitor 36 to a suitable port, and receives data from the printer 854 via a class driver 38.

The class driver 38, which is the lowest module located closest to ports, controls the ports. In the example shown in FIG. 18, the class driver 38 is a USB class driver, controlling USB communication with the printer 854 through the USB port of the proxy server 853.

A status monitor 39 monitors and displays the status of the printer 854.

In FIG. 18, the printer driver 50 installed in the proxy server 853 has been described. The printer driver installed in the client PC 851 provided with Windows XP is similar to that described above. In FIG. 18, the printer driver 50 used for a local printing operation performed in the printer 854 which is USB-connected to the proxy server 853 has been discussed. Also in a network printing operation performed in the common printer 854 used by the client PC 851 via the proxy server 853, the printer driver is similar to that described above.

Figure 19:
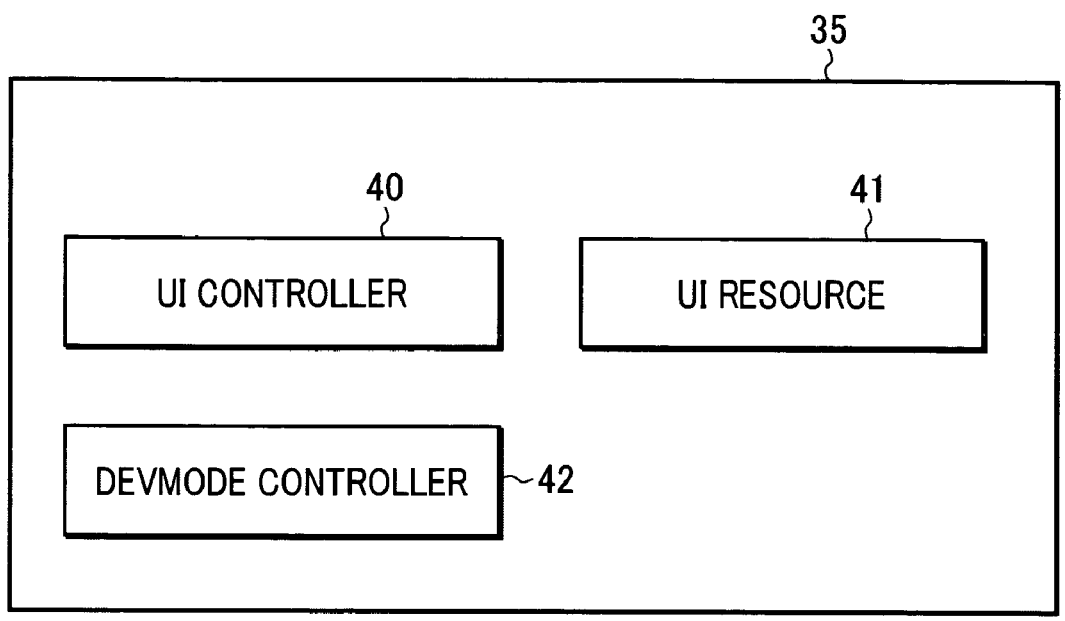
FIG. 19 is a block diagram illustrating the basic internal configuration of a UI module shown in FIG. 18.

FIG. 19 is a block diagram illustrating the basic internal configuration of the UI module 35 shown in FIG. 18.

In FIG. 19, a UI controller 40 controls a user interface, for example, a print setting dialog. A UI resource 41 stores resources, for example, icons, bitmaps, and character strings, for the print setting dialog used by the UI controller 40. A DEVMODE controller 42 controls device mode (DEVMODE) structures used between the OS, the application 30, and the printer driver 50 when performing a printing operation, and reflects the device mode structures on the UI controller 40 if necessary.

Figure 20:
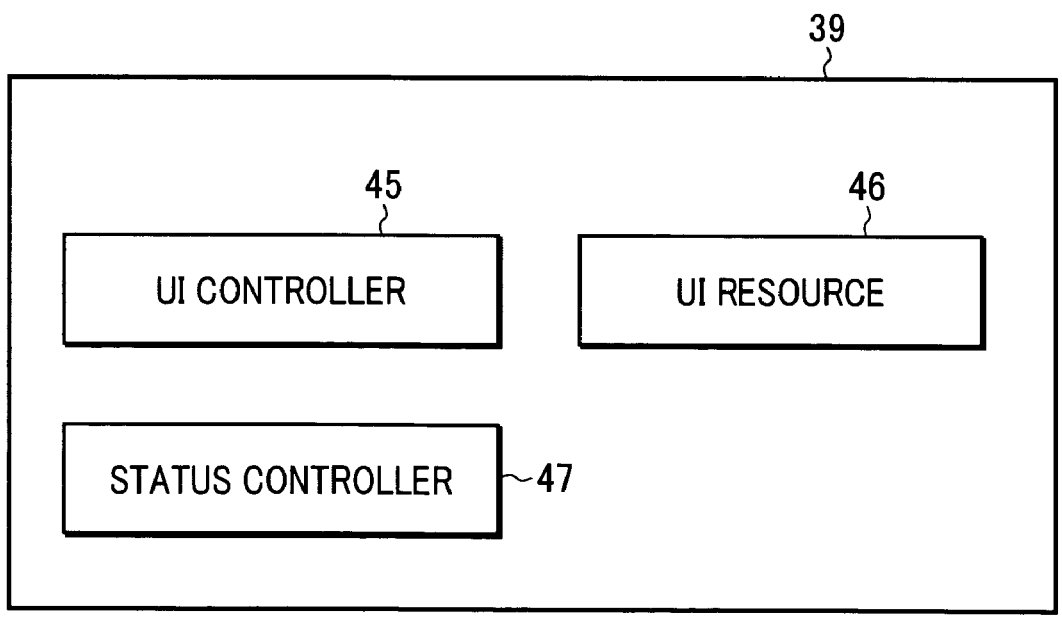
FIG. 20 is a block diagram illustrating the basic internal configuration of a status monitor shown in FIG. 18.

FIG. 20 is a block diagram illustrating the basic internal configuration of the status monitor 39 shown in FIG. 18.

In FIG. 20, a UI controller 45 controls a user interface, for example, a status monitor dialog. A UI resource 46 stores resources, for example, icons, bitmaps, and character strings, for the status monitor dialog used by the UI controller 45. A status controller 47 controls the acquisition of the status from the printer 854, and reflects the status on the UI controller 45 if necessary.

Figure 21:
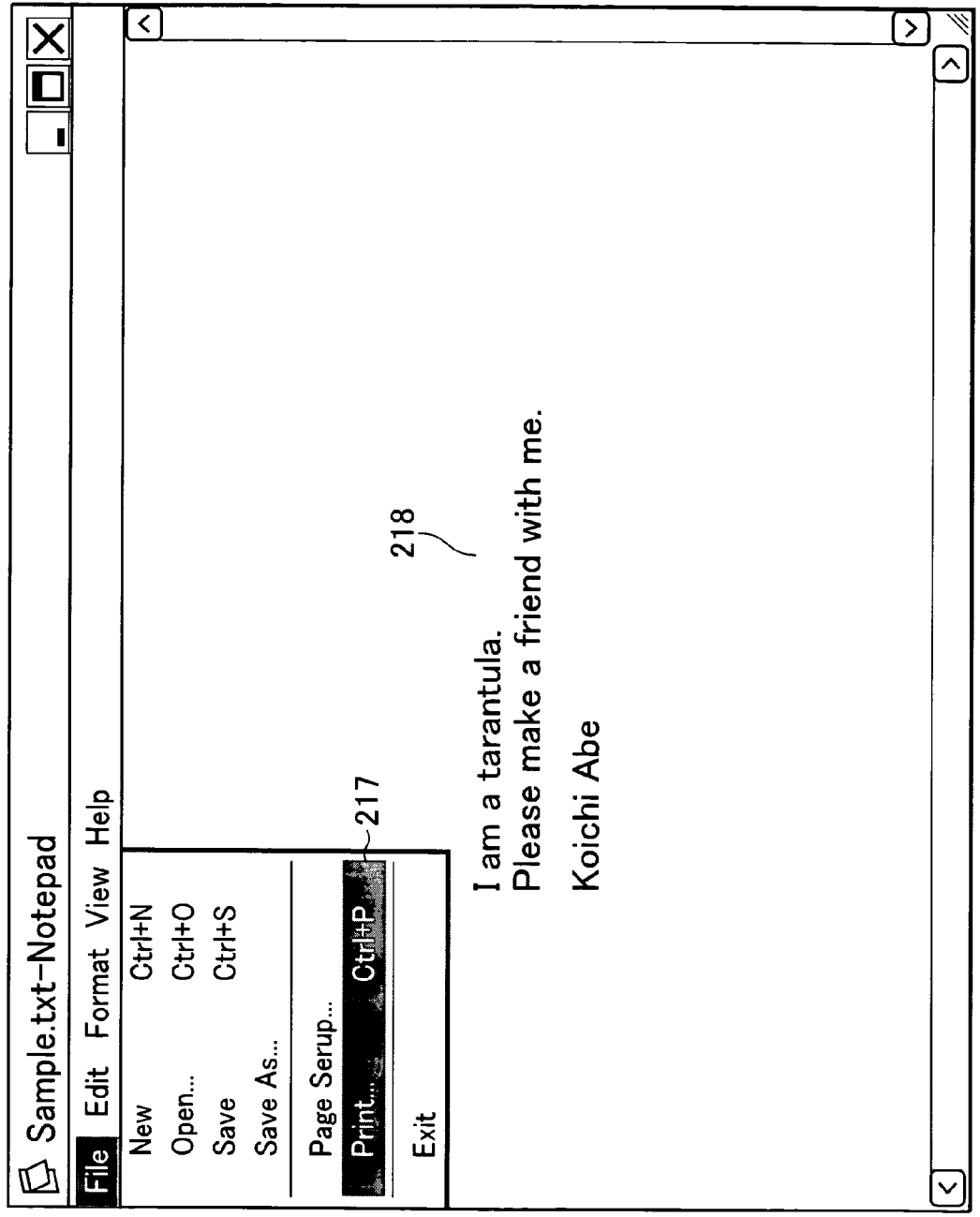
FIG. 21 illustrates an example of the screen of the display unit of a client PC by using a text editor, i.e., Notepad, integrated into Windows XP of a client PC as a standard application.

FIG. 21 illustrates an example of the screen displayed on the display unit of the client PC 851 by the text editor, i.e., Notepad (Notepad.exe), included in Windows XP as a standard application.

To provide a printing instruction on this screen, a print menu (Print . . . ) 217 is selected from a File menu. Then, a printing operation on the text displayed in a text display portion 218 is started.

Figure 22:
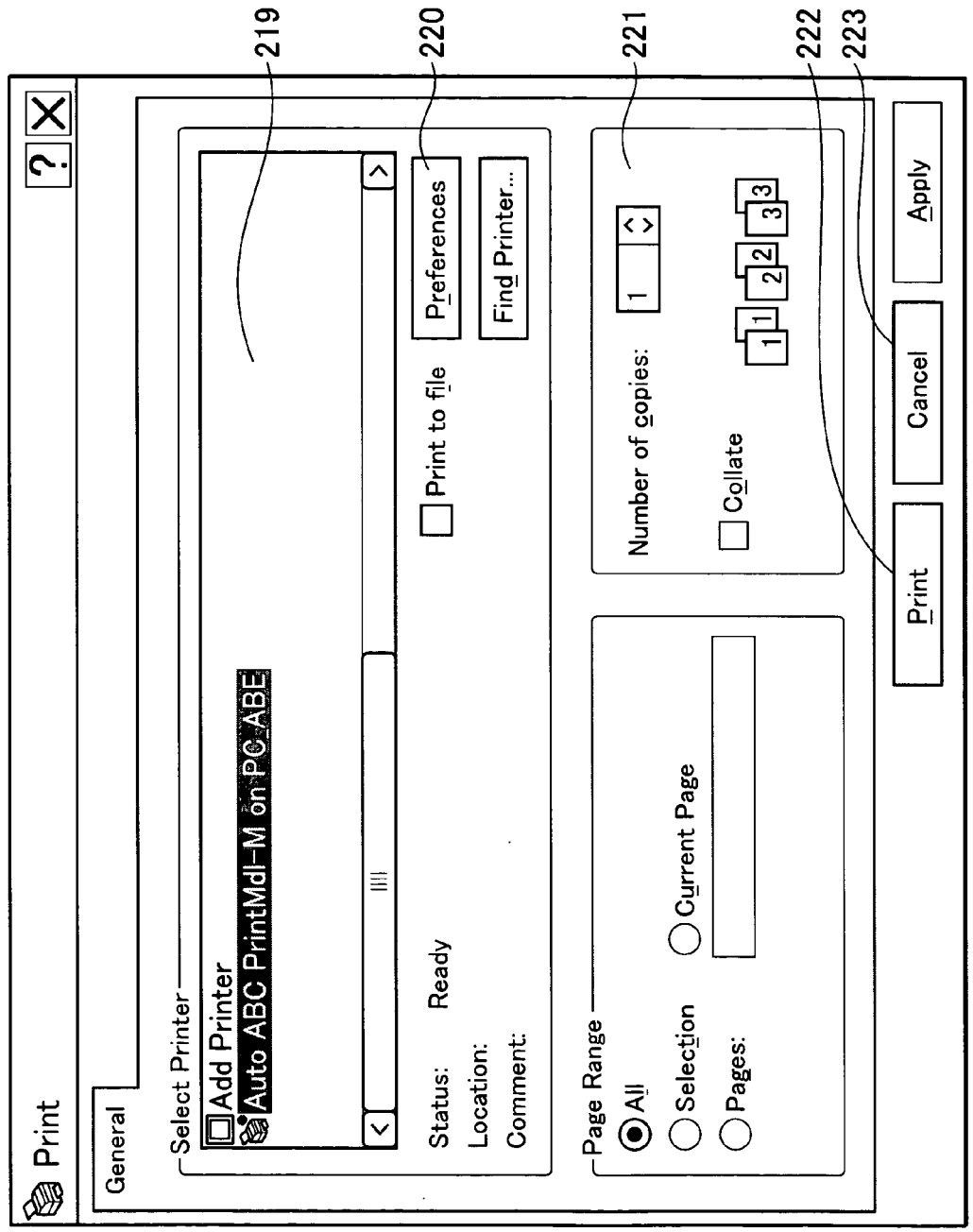
FIG. 22 illustrates a Print dialog displayed on the display unit of a client PC by selecting a print menu shown in FIG. 21.

FIG. 22 illustrates a Print dialog on the display unit of the client PC 851 displayed by selecting the print menu 217 shown in FIG. 21.

In FIG. 22, a printer selection portion 219 is used for selecting the printer to perform the printing operation. FIG. 22 shows that the printer described above with reference to FIG. 17, i.e., Auto ABC PrintMdl-M on PC_ABE, is selected and highlighted.

A Preferences button 220 can be clicked for performing detailed settings for the printer selected in the printer selection portion 219 or the corresponding printer driver.

In a number-of-copy specifying portion 221, the number of copies can be specified in a range of 1 to 100.

A Print button 222 can be clicked for starting a printing operation in accordance with the selected settings, and the Print dialog is then closed.

A Cancel button 223 can be clicked for closing the Print dialog without starting the printing operation.

Figure 23:
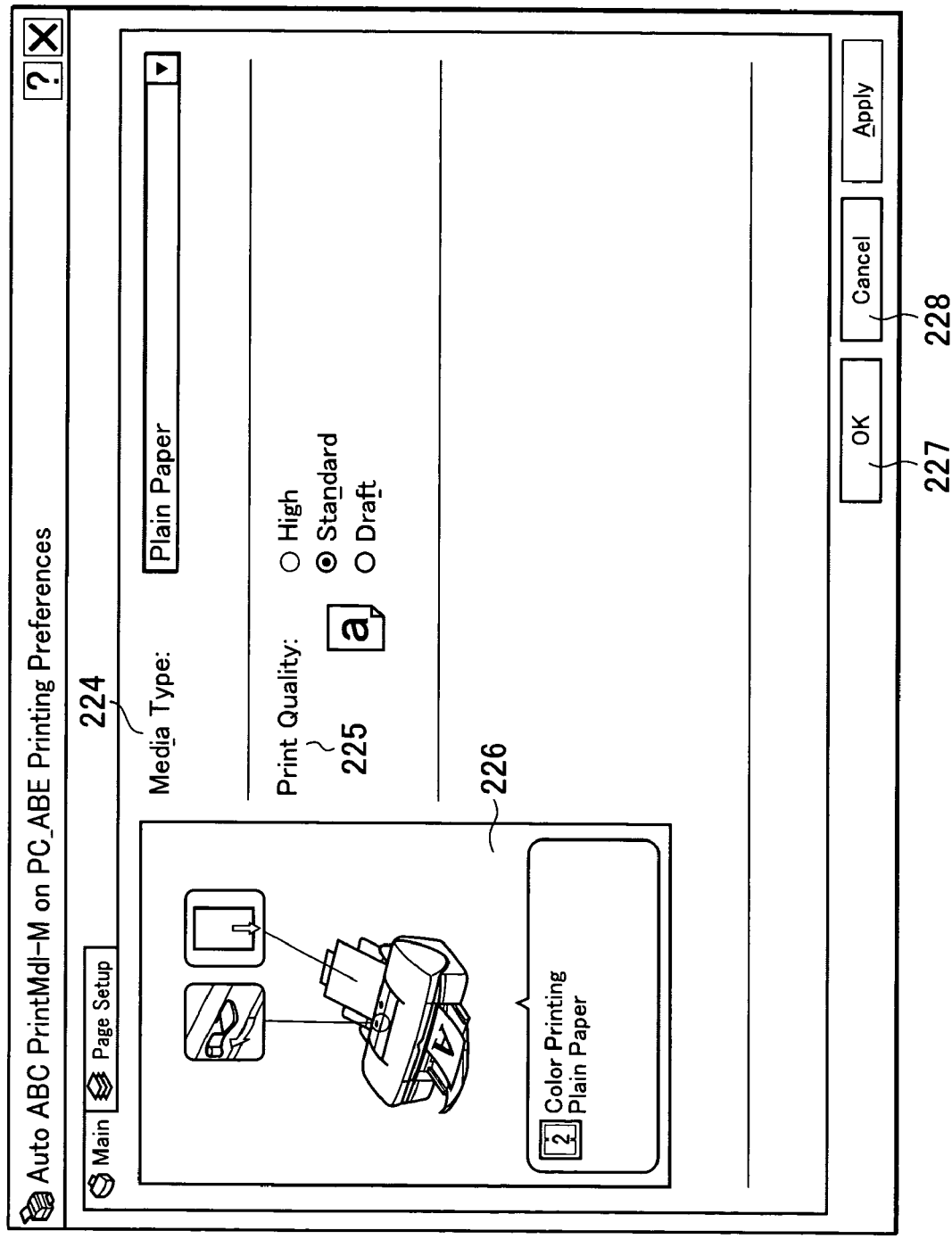
FIG. 23 illustrates the Main sheet of a Preferences dialog displayed on the display unit of a client PC when clicking a Preferences button shown in FIG. 22.

FIG. 23 illustrates the Main sheet of a Preference dialog displayed on the display unit of the client PC 851 when clicking the Preferences button 220 shown in FIG. 22.

When the Preferences button 220 is clicked while the printer Auto ABC PrintMdl-M on PC_ABE is selected in the Print dialog shown in FIG. 22, the Main sheet of the Preferences dialog is displayed.

In FIG. 23, in a paper-type selection portion (Media Type:) 224, the paper type can be selected from Plain Paper, Photo Paper, and OHP Sheet.

In a print-quality selection portion (Print Quality:) 225, the print quality can be selected from High, Standard, and Draft.

In an operating guide portion 226, operating guide information for assisting the user operation is indicated.

An OK button 227 can be clicked for updating and storing the print settings based on the print setting information. After the OK button 227 is clicked, the Preferences dialog closes.

A Cancel button 228 can be clicked for closing the Preferences dialog without updating the print settings based on the print setting information.

Figure 24:
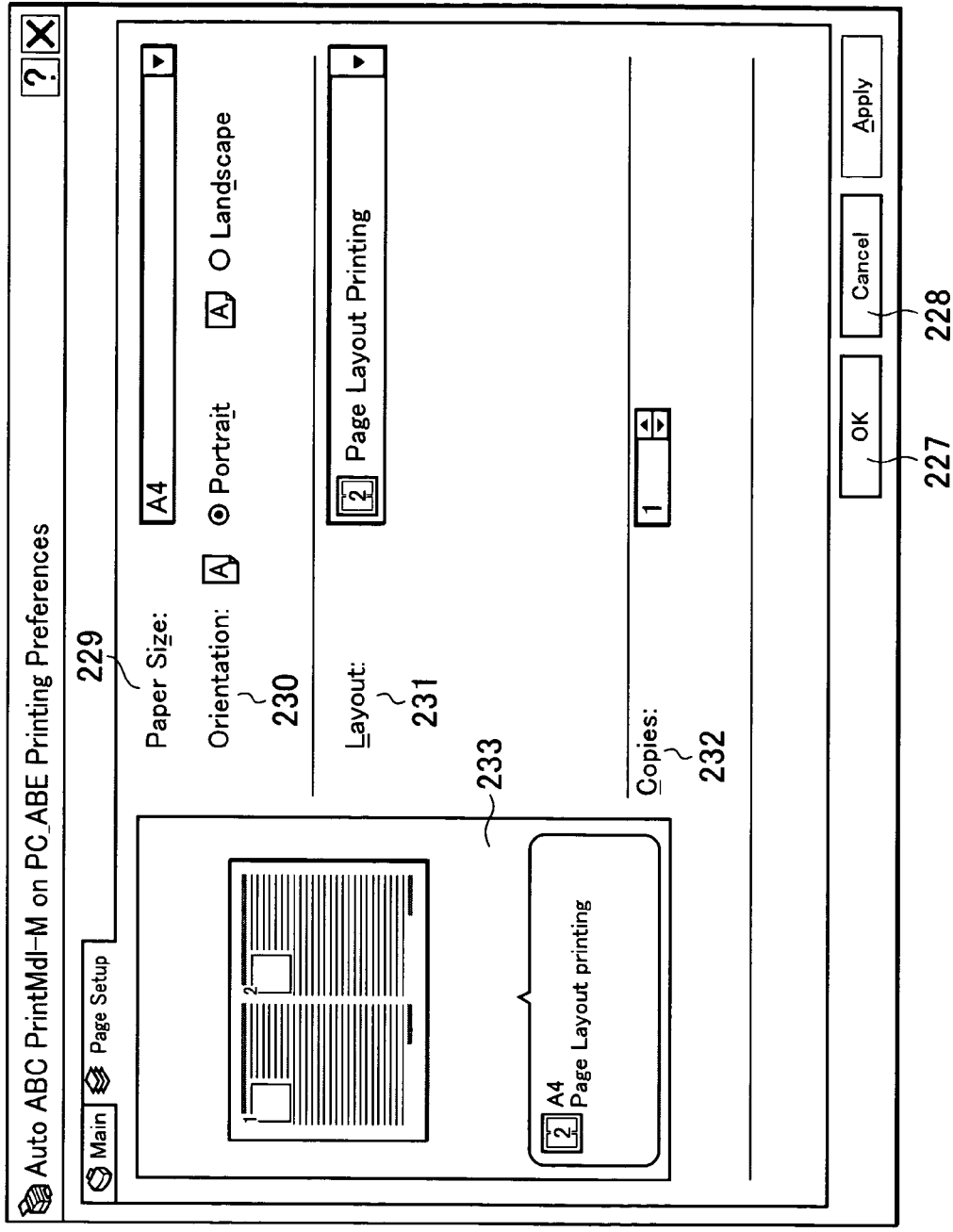
FIG. 24 illustrates the Page Setup sheet of the Preferences dialog.

FIG. 24 illustrates a Page Setup sheet of the Preferences dialog. When the Page Setup tab is selected while the Main sheet of the Preferences dialog shown in FIG. 23 is being indicated, the Page Setup sheet is displayed.

In FIG. 24, in a paper-size selection portion (Paper Size:) 229, the paper size can be selected from A4, A5, B5, and Letter.

In a print-orientation selection portion (Orientation:) 230, the print orientation can be selected from Portrait and Landscape.

In a print-layout selection portion (Layout:) 231, the print layout can be selected from 1 Page Layout Printing, 2 Page Layout Printing, and 4 Page Layout Printing.

In a number-of-copy specifying portion (Copies:) 232, the number of copies can be specified in a range of 1 to 100.

In an operating guide portion 233, operating guide information for assisting the user operation can be displayed.

Figure 25:
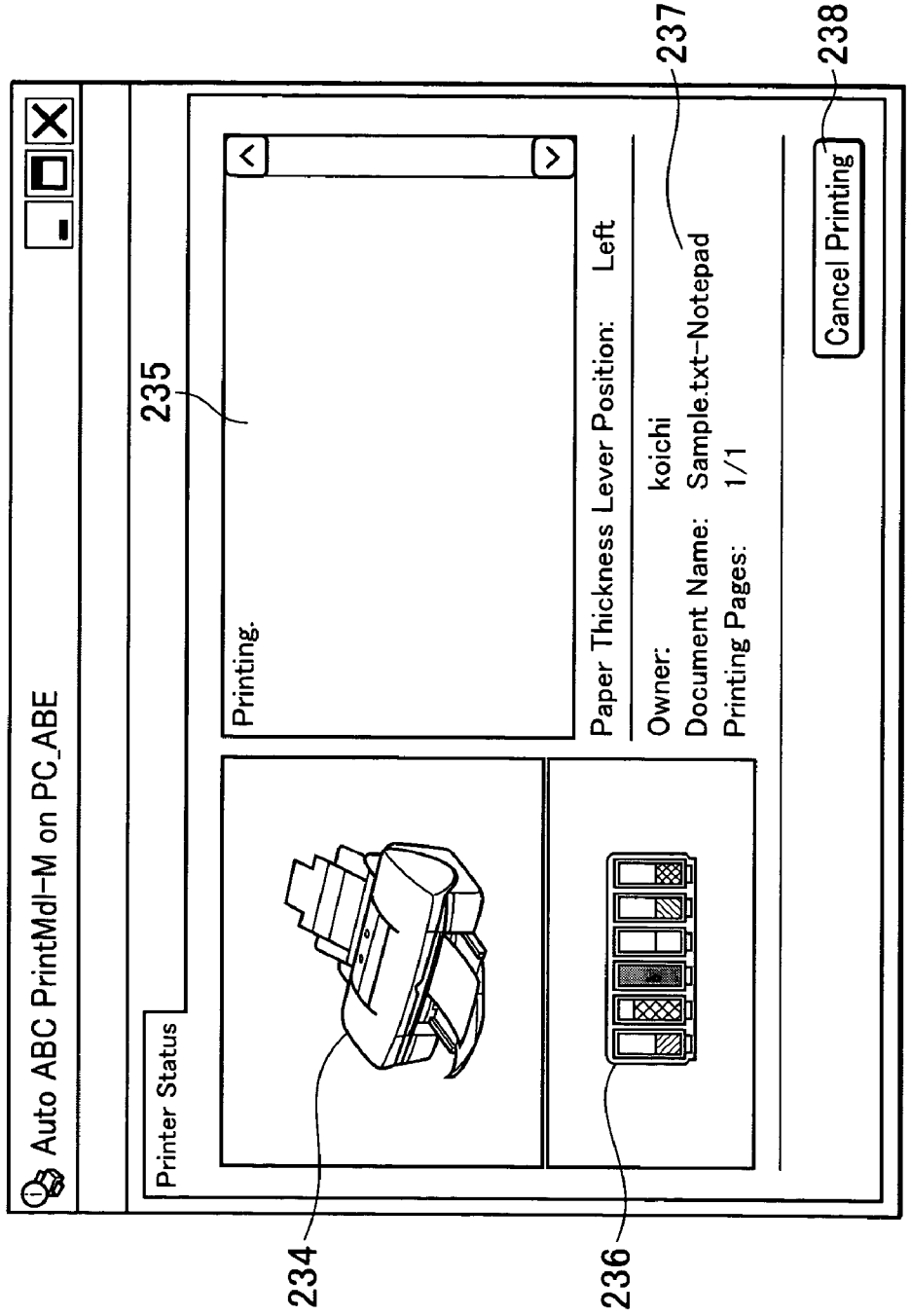
FIG. 25 illustrates a status monitor dialog displayed on the display unit of a client PC.

FIG. 25 illustrates a status monitor dialog displayed on the display unit of the client PC 851. When the status monitor 39 is started while the printing operation is in progress, this dialog is displayed.

In FIG. 25, in a printer-status display portion 234, the printer status is indicated as an image.

In a message display portion 235, messages concerning, for example, the printer status or the user operation, can be indicated.

A remaining-ink display portion 236, the remaining amount of ink in an ink cartridge attached to the printer is indicated.

In a print-job-information display portion 237, the owner name (Owner:), the document name (Document Name:), and the page number (Printing Pages:) of a print job in progress are indicated.

A print cancel (Cancel Printing) button 238 can be clicked for canceling a print job in progress.

Figure 26:
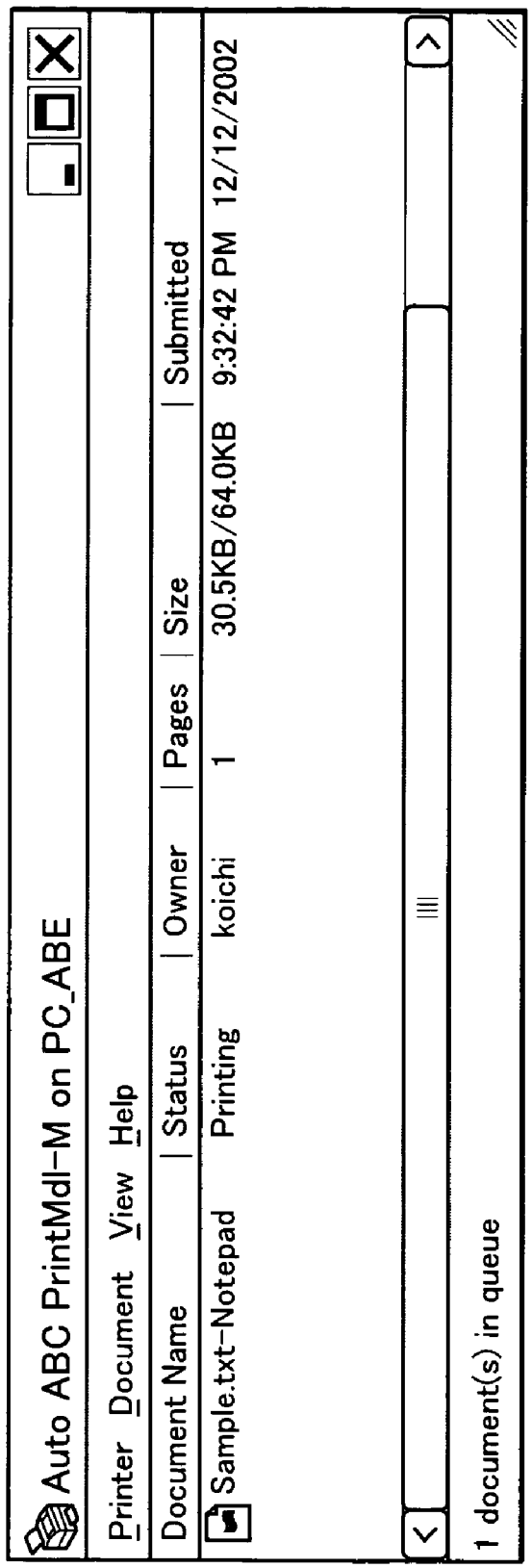
FIG. 26 illustrates a printer queue folder.

FIG. 26 is a printer queue folder, which is included in Windows XP as a standard application.

FIG. 26 shows that detailed information concerning print jobs in a queue is indicated in this folder. The user can cancel, pause, or re-print print jobs from a menu.

Figure 27:
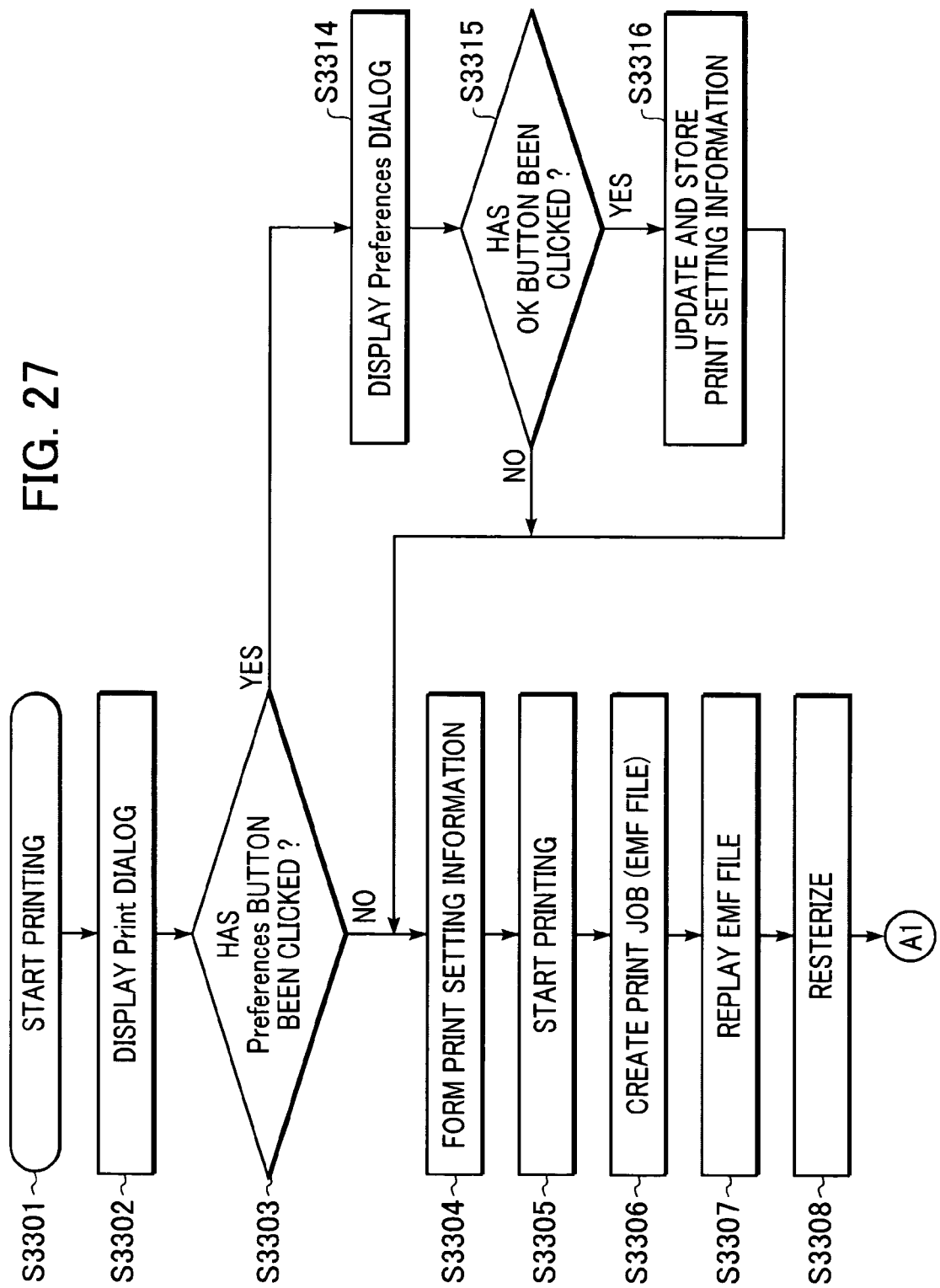
FIGS. 27 and 28 are a flowchart illustrating a basic printing process from when print commands are given from an application of a client PC to when a printing operation is performed in a printer in the third part of the network print system shown in FIG. 6.
Figure 28:
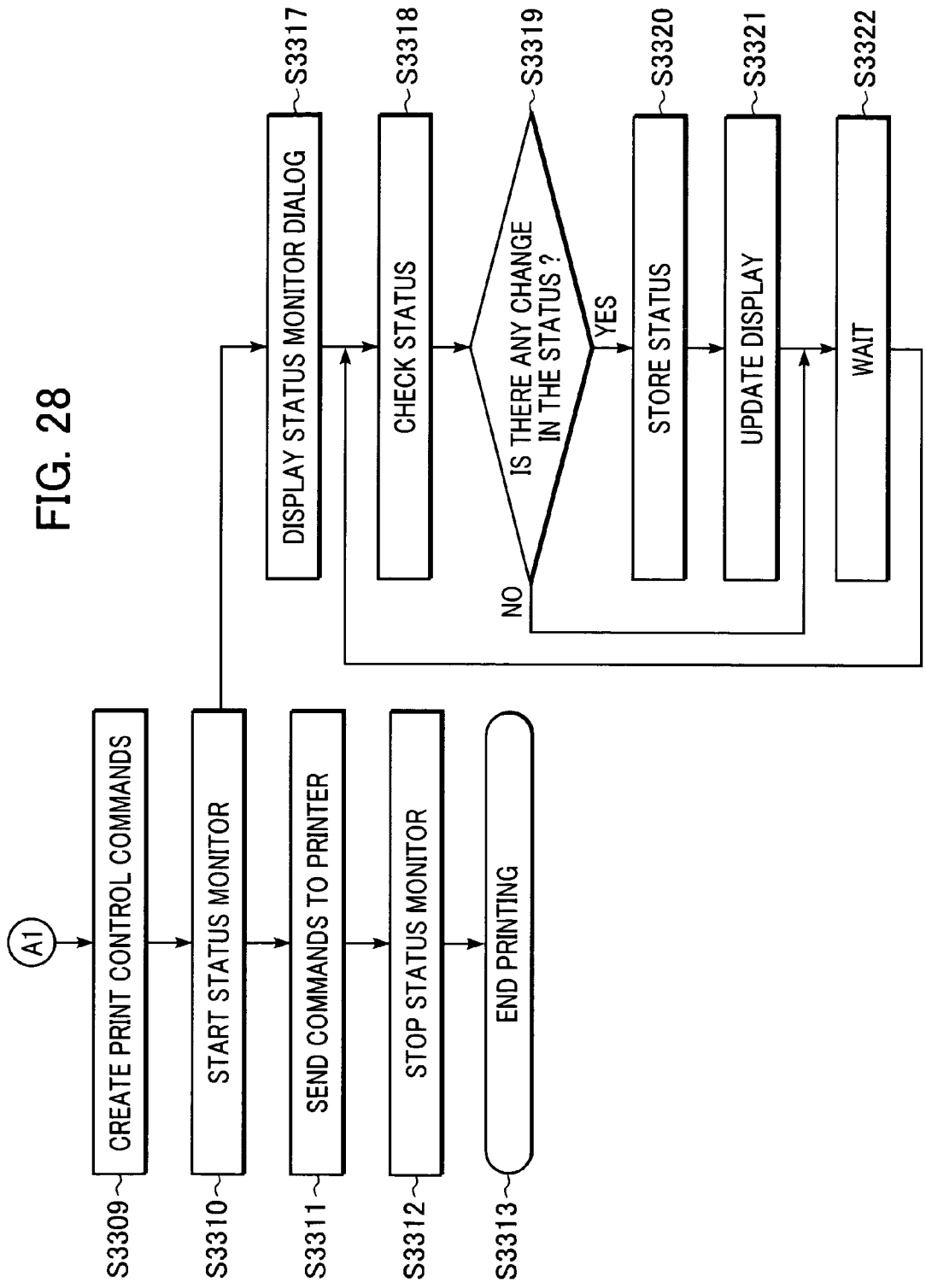

FIGS. 27 and 28 are a flowchart illustrating a basic printing process from when print commands are given from the application of the client PC 851 to when a printing operation is performed in the printer 854 in the third part of the network print system shown in FIG. 6.

A printing operation is started in step S3301 by selecting the print menu 217 shown in FIG. 21, and then, the Print dialog shown in FIG. 22 is displayed in step S3302. It is then determined in step S3303 whether the Preferences button 220 in the Print dialog has been clicked. If the outcome of step S3303 is YES, the Preferences dialog shown in FIG. 23 is displayed in step S3314. It is then determined in step S3315 whether the OK button 227 has been clicked after selecting required items in the Preferences dialog. If the result of step S3315 is YES, the print settings are updated and stored based on the print setting information, and the Preferences dialog is closed in step S3316. The process then proceeds to step S3304.

If the Cancel button 228 is clicked (i.e., the result of step S3315 is NO) while the Preferences dialog is being displayed in step S3314, the Preferences dialog is closed without updating the print setting information, and the process proceeds to step S3304. If it is found in step S3303 that the Preferences button 220 in the Print dialog has not been clicked, the process also proceeds to step S3304.

In step S3304, the application queries as to the function of the printer driver so as to form print setting information concerning, for example, the DEVMODE structure. In step S3305, the printing operation is started by clicking the Print button 222 shown in FIG. 22. Then, in step S3306, a rendering command is sent to the GDI 31 from the application 30, and the above-described print setting information and this rendering command are queued as an Enhanced Metafile Format (EMF) file, thereby forming a print job. This print job is displayed in the printer queue folder shown in FIG. 26.

Subsequently, in step S3307, the EMF file of the print job is replayed in the print processor 33 so that, for example, the print layout is changed, and then, a new rendering command is created and sent to the GDI 31. In step S3308, the new rendering command is sent to the graphics driver 34 from the GDI 31, and the graphics driver 34 requests the GDI 31 (OS) to rasterize the rendering command in a print image memory, thereby forming a print image. In step S3309, the graphics driver 34 forms print control commands based on the rasterized print image.

Then, the status monitor 39 is started in step S3310, and the print control commands are sent to the printer 854 in step S3311. After sending all the print control commands to the printer 854, the operation of the status monitor 39 is stopped by closing the status monitor dialog shown in FIG. 25 in step S3312. Then, in step S3313, the printing operation is completed.

In the printer 854, the printing operation is performed based on the print control commands sent from the status monitor 39 in step S3311.

When the status monitor 39 is started in step S3310, the status monitor dialog shown in FIG. 25 is displayed in step S3317. In step S3318, the status of the printer 854 is checked while the status monitor 39 is being operated. It is then determined in step S3319 whether there is a change in the status of the printer 854. If the outcome of step S3319 is YES, the status of the printer 854 is stored in step S3320, and the display of the status monitor dialog shown in FIG. 25 is updated in step S3321. Then, after lapse of a predetermined period (for example, five seconds) in step S3322, the process returns to step S3318.

If it is determined in step S3319 that there is no change in the status of the printer 854, the process proceeds to step S3322.

While the status monitor 39 is being operated, the above-described processing is repeated, and the latest status of the printer 854 is displayed in real time in the status monitor dialog shown in FIG. 25.

In FIGS. 27 and 28, the printing processing has been described in the context of network printing performed in the common printer 854 shared by the client PC 851 via the proxy server 853. In local printing performed by the printer 854 which is connected to the proxy server 853 via a USB interface, the processing content is similar to that described above.

A description is now given of a printing operation performed in the printer 854 by the client PC 857 installed with Mac OS in the third part of the print network system. It is now assumed that the driver for the printer 854 shared via the proxy server 853 has been installed in the client PC 857 and the printer 854 is selected by the client PC 857.

Figure 29:
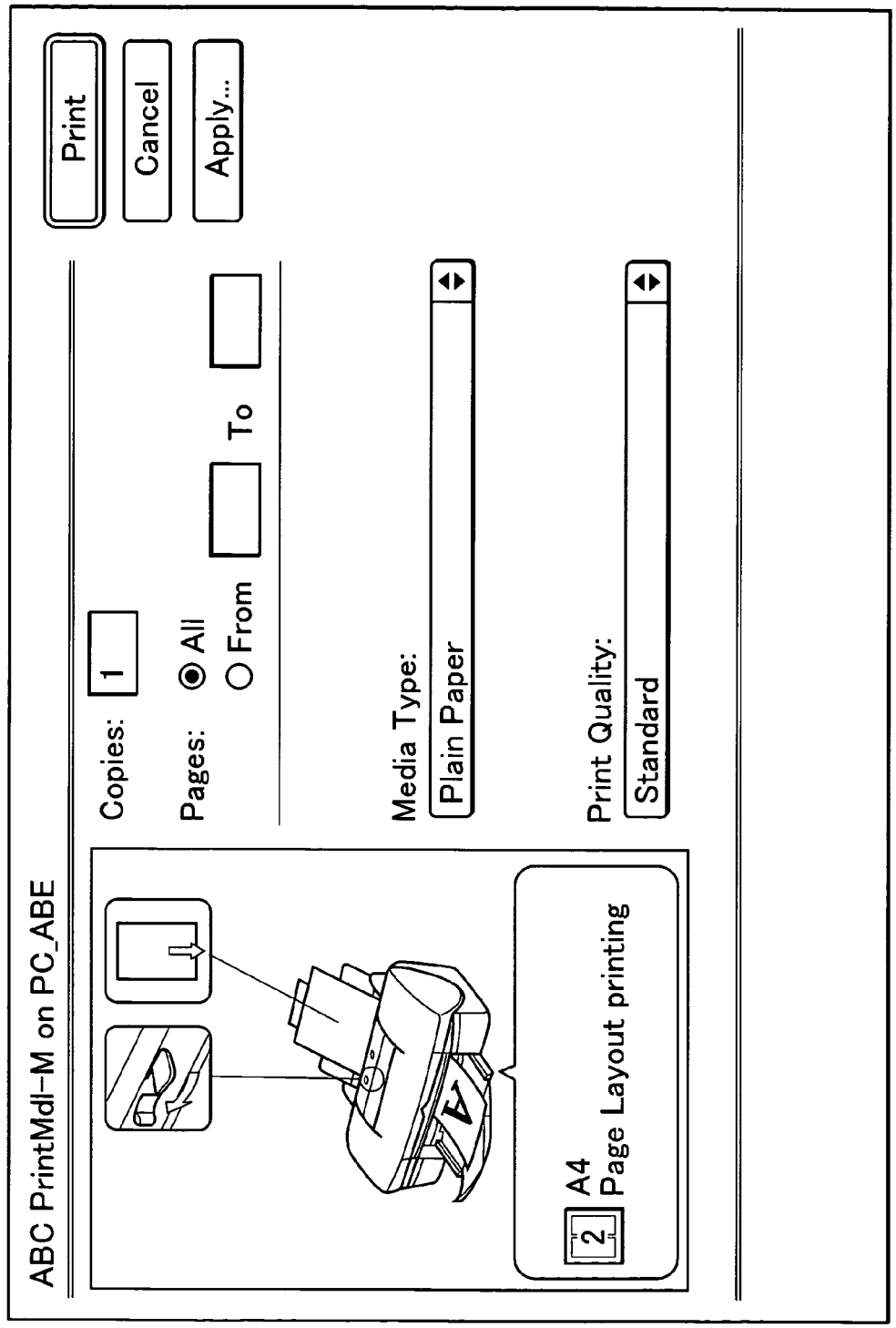
FIG. 29 illustrates a Print dialog when selecting "Print . . . " from a File menu of IE 5 of a client PC in the third part shown in FIG. 6.

FIG. 29 illustrates a Print dialog displayed when Print . . . is selected from a File menu of IE5 of the client PC 857 in the third part shown in FIG. 6.

Figure 30:
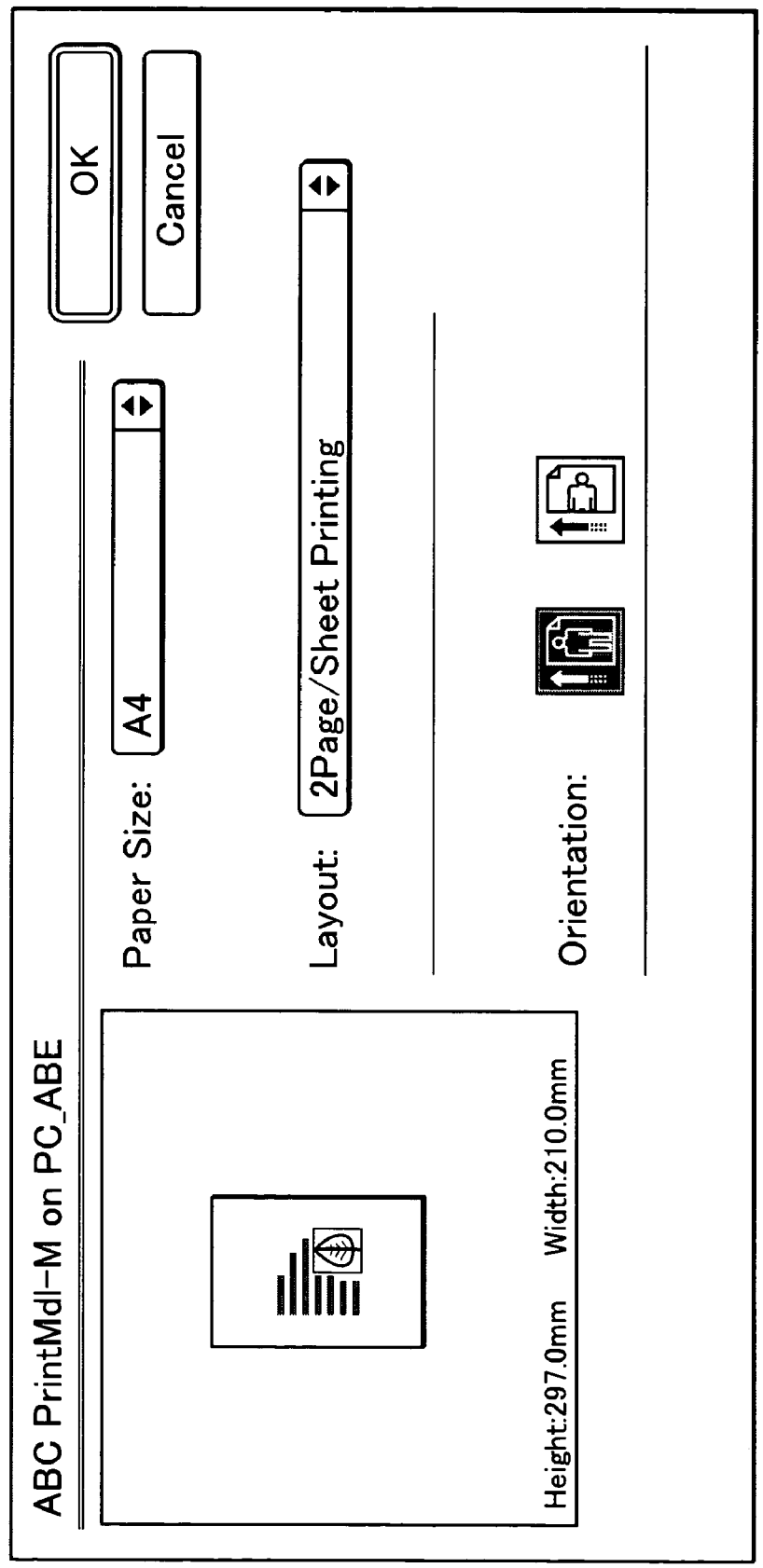
FIG. 30 illustrates a Page Setup dialog displayed when selecting "Page Setup . . . " from the File menu of IE 5 of a client PC in the third part shown in FIG. 6.

FIG. 30 illustrates a Page Setup dialog displayed when Page Setup . . . is selected from the File menu of IE5 of the client PC 857 in the third part shown in FIG. 6.

Figure 31:
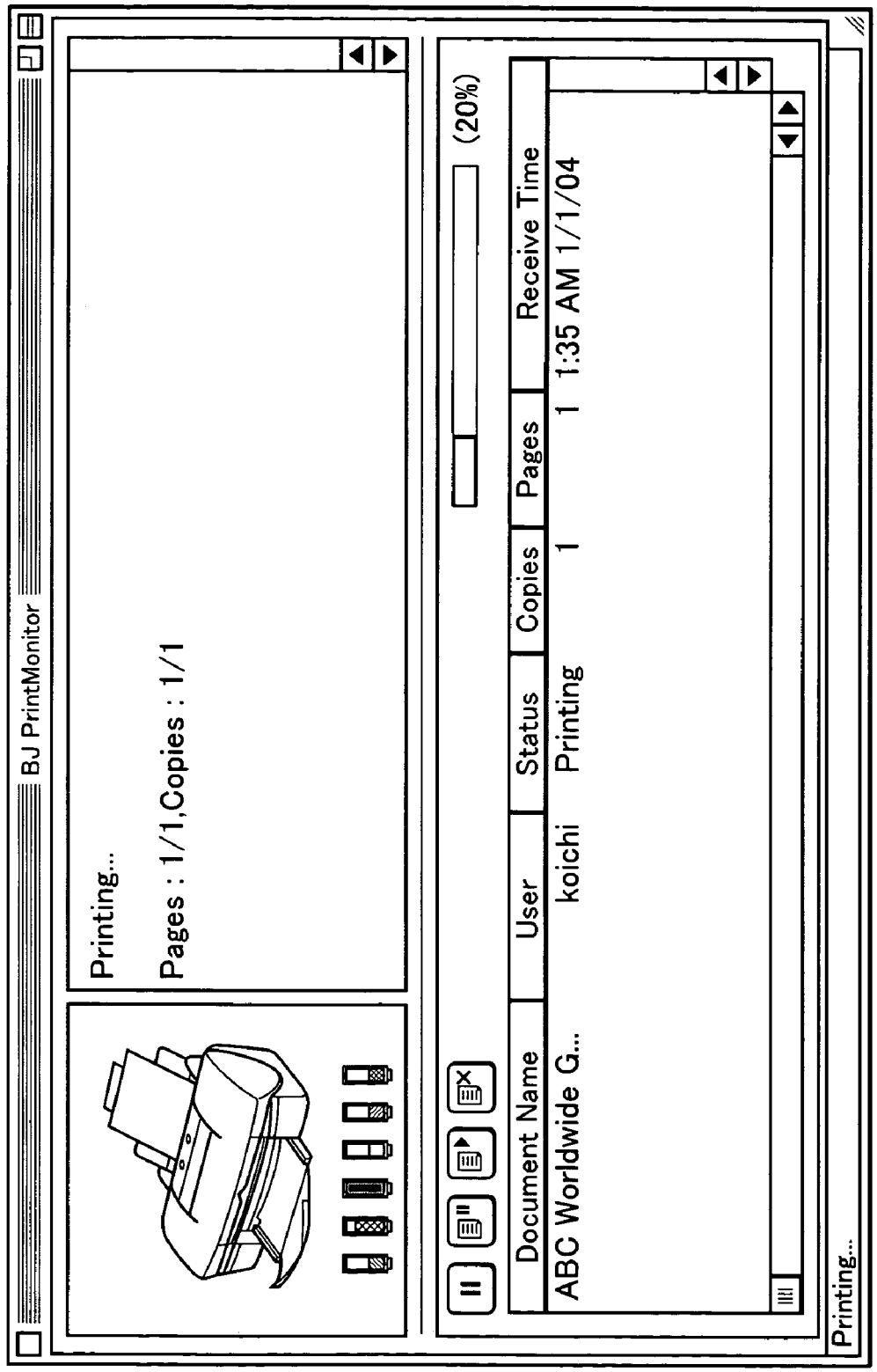
FIG. 31 illustrates a status monitor dialog displayed while a printing operation is in progress after clicking a Print button shown in FIG. 29 in the third part shown in FIG. 6.

FIG. 31 illustrates a status monitor dialog displayed when the printing operation is in progress after clicking the Print button shown in FIG. 29 in the third part shown in FIG. 6.

By comparing FIGS. 29 and 30 with FIGS. 22, 23, and 24, the print settings and buttons 221 through 233 shown in FIGS. 22, 23, and 24 are different from those shown in FIGS. 29 and 30 in terms of the display layout and operability. By comparing FIG. 31 with FIGS. 25 and 26, the status display portions 234 through 237 shown in FIGS. 25 and 26 are different from those shown in FIG. 31 in terms of the display layout and operability. These differences are due to the difference of the OS, i.e., Windows XP installed in the client PC 851 and Mac OS installed in the client PC 857. This makes it necessary to develop different printer driver UIs for the two types of OSs, thereby requiring a large number of steps for developing the UIs. Additionally, the user operability in the printing operation becomes different depending on the OS, thereby making the user uncomfortable.

In order to solve the above problem unique to the related art, in the present invention, additions are made to the XML Device Description of a UPnP device supported by the printer 855 shown in FIG. 1. Such additions are as follows.

FIGS. 32 and 33 illustrate details of the XML Device Description of a UPnP device supported by the printer 855 in the present invention. In the present invention, additions are made to the content of the XML Device Description of the UPnP device discussed with reference to FIG. 11, and thus, only the added parts are described below.

The numbers at the left side of FIGS. 32 and 33 are line numbers. In FIGS. 32 and 33, the second line through the 39th line show a root element, and the seventh line through the 38th line show a device element. The content in the first through the 15th lines is the same as that shown in FIG. 11, and an explanation thereof is thus omitted.

The 16th line through the 35th line show a serviceList element. The first service indicated in the 17th through the 25th lines is the same service as that in the same lines of FIG. 11, and an explanation thereof is thus omitted.

The 26th line through the 34th line show a service element, i.e., the second service of the UPnP device supported by the printer 855.

The 27th line shows a serviceType element indicating that the printer 855 supports the Printer Extensional Service V1.0 (PrintEx:1) uniquely determined by the manufacturer (vendor). The content of the Printer Extensional Service V1.0 and the Service Description are described below with reference to FIGS. 34 and 35.

The 28th line shows a serviceId element indicating the ID of this service.

The 29th line shows a SCPDURL element indicating the Service Control Protocol Definition URL (SCPDURL).

The 30th and 31st lines show a controlURL element indicating the URL used for allowing the device to control the Printer Extensional Service V1.0.

The 32nd and 33rd lines show an eventSubURL element indicating the URL for an event of this service.

The 36th and 37th lines show a presentationURL element indicating the URL of the presentation page for making the device available. This element is the same as that indicated in the 27th and 28th lines of FIG. 11.

FIGS. 34 and 35 illustrate details of the XML Service Description of the UPnP device supported by the printer 855 in the present invention.

The numbers at the left side of FIGS. 34 and 35 are line numbers. The content shown in FIGS. 34 and 35 indicates SCPD of the Printer Extensional Service V1.0 shown in FIGS. 32 and 33, i.e., the service and content of the Service Description. A part of this service is disclosed in Universal Plug and Play Device Architecture V1.0 standardized by the UPnP Forum, and thus, only elements related to the present invention are discussed below by taking the first part of the print network system shown in FIG. 1 by way of example.

In FIGS. 34 and 35, the second line through the 55th line show an SCPD element indicating that the printer 855 is compliant with the services standardized by the UPnP Forum.

The seventh line through the 43rd line show an actionList element. The Printer Extensional Service V1.0 includes two actions consisting of a CreatePrinter action and a DeletePrinter action.

The eighth line through the 32nd line show a first action element indicating the CreatePrinter action. The CreatePrinter action is an action used for installing the driver of the printer 855 into the client PC 851 or 857.

The ninth line shows a name element indicating that the name of this action is CreatePrinter.

The 10th line through the 31st line show an argumentList element. The CreatePrinter action has four variables consisting of a first variable, i.e., a PrinterName variable, a second variable, i.e., a PrinterPath variable, a third variable, i.e., a PrintSettingURL variable, and a fourth variable, i.e., a StatusMonitorURL variable.

The 11th line through the 15th line show a first argument element indicating the PrinterName variable.

The 12th line shows a name element indicating that the name of this variable is PrinterName.

The 13th line shows a direction element indicating the input/output direction of this variable. This element indicates that the PrinterName variable is a variable input from a control point (client PC 851 or 857) to the device (printer 855).

The 14th line is a relatedStateVariable element in which the value (character string) of this variable is designated. For example, when the device is the printer 855 in the first part of the print network system shown in FIG. 1, the value (character string) "ABC PrintMdl-K 000888" representing the name of the printer 855 whose driver should be installed into the client PC 851 or 857 is designated from the client PC 851 as the variable value.

The 16th line through the 20th line show a second argument element indicating a PrinterPath variable.

The 17th line shows a name element indicating that the name of this variable is PrinterPath.

The 18th line shows a direction element indicating the input/output direction of the variable. This element indicates that the PrinterPath variable is a variable output from the device (printer 855) to the control point (client PC 851 or 857).

The 19th line is a relatedStateVariable element in which the value (character string) of this variable is designated. For example, when the device is the printer 855 in the first part of the print network system shown in FIG. 1, the value (character string), i.e., the IP address "192.168.0.100" representing the network path of the printer 855 is designated and returned from the printer 855 as the variable value.

The 21st line through the 25th line show a third argument element indicating the PrinterSettingURL variable.

The 22nd line shows a name element indicating that the name of this variable is PrinterSettingURL.

The 23rd line shows a direction element indicating the input/output direction of this variable. This element indicates that the PrinterSettingURL variable is a variable output from the device (printer 855) to the control point (client PC 851 or 857).

The 24th line shows a relatedStateVariable element in which the value (character string) of this variable is designated. For example, if the device is the printer 855 in the first part of the print network system shown in FIG. 1, the value (character string) "http://192.168.0.100/PrintUIPresentation.asp?uuid=Printer:P rintMdl-K000888" representing the URL of the presentation page of the print setting UI of the printer 855 is designated and returned from the printer 855 as the value of this variable.

The 26th line through the 30th line show a fourth argument element indicating the StatusMonitorURL variable.

The 27th line shows a name element indicating that the name of this variable is StatusMonitorURL.

The 28th line shows a direction element indicating the input/output direction of this variable. This element indicates that the PrinterSettingURL variable is a variable output from the device (printer 855) to the control point (client PC 851 or 857).

The 29th line shows a relatedStateVariable element in which the value (character string) of this element is designated. For example, if the device is the printer 855 in the first part of the print network system shown in FIG. 1, the value (character string) "http://192.168.0.100/StatusPresentation.asp?uuid=Printer:Pr intMdl-K000888" representing the URL of the presentation page of the status monitor UI of the printer 855 is designated and returned from the printer 855 as the value of this variable.

The 33rd line through the 42nd line show a second action element indicating the DeletePrinter action. The DeletePrinter action is an action used for deleting (uninstalling) the driver of the printer 855 from the client PC 851 or 857.

The 34th line shows a name element indicating that the name of this action is DeletePrinter.

The 35th line through the 41st line show an argumentList element. The DeletePrinter action has a PrinterPath variable.

The 36th line through the 40th line show an argument element indicating the PrinterPath variable.

The 37th line shows a name element indicating that the name of this variable is PrinterPath.

The 38th line shows a direction element indicating the input/output direction of this variable. This element indicates that the PrinterPath variable is a variable input from the control point (client PC 851 or 857) to the device (printer 855).

The 39th line shows a relatedStateVariable element in which the value (character string) of this element is designated. For example, if the device is the printer 855 in the first part of the print network system shown in FIG. 1, the value (character string) "192.168.0.100" (IP address) representing the network path of the printer 855 is designated and returned from the client PC 851 as the value of this variable.

The 44th line through the 54th line show a serviceStateTable element.

The 45th line through the 53rd line show a stateVariable element in which the PrinterState value indicating the operating state of the device (printer 855) is designated. The 45th line shows that this state value is sent in real time from the device (printer 855) to the control point (client PC 851 or 857) as an event.

The 46th line shows a name element indicating that the name of this PrinterState value is PrinterState.

The 47th line is a dataType element indicating that the data type of this PrinterState value is string (character string).

The 48th line shows a defaultValue element indicating that the initial value of this PrinterState value is enable.

The 49th line through the 52nd line show an allowedValueList element in which a value that can be designated as the state value is indicated.

The 50th line shows a first allowedValue element in which "enable" indicating that the device can be operated is defined.

The 51st line shows a second allowedvalue element in which "unable" indicating that the device cannot be operated is defined.

As described above, when the printer 855 is found on the network 856 by the client PC 851 or 857 (hereinafter a description is given of the client PC 851 as an example), the name of the printer whose driver is installed into the client PC 851 is designated from the client PC 851 by utilizing the CreatePrinter action of the Printer Extensional Service V1.0. Then, by using these items of information, the network path, the URL of the presentation path of the print setting UI, and the URL of the presentation path of the status monitor UI are returned from the printer 855, and the driver is installed into the client PC 851. The above items of information are also utilized when performing a printing operation. The driver of the printer 855 can be reliably deleted (uninstalled) from the client PC 851 by utilizing the DeletePrinter action.

When installing or deleting the driver of the printer 855, the following modification is effective for the user by utilizing the event of the PrinterState value. When the printer 855 is not operable, the driver of the printer 855 is not installed, or is deleted if it is already installed.

The XML Service Description has been discussed above in the context of the first part of the print network system shown in FIG. 1. It can also be utilized in the second part shown in FIG. 5 or the third part shown in FIG. 6. In this case, instead of the printer 855 in the first part, the proxy server 853 performs the UPnP control so that the printer 852 or 854 can be operated as a pseudo-UPnP-compatible printer. Even in a local connection environment, as in the third part of the print network system shown in FIG. 6 consisting of the proxy server 853 and the printer 854 connected to each other via a USB interface, if the printer 854 has a UPnP-compatible printer function similar to that of the printer 855 of the first part, the XML Service Description can be utilized.

Figure 36:
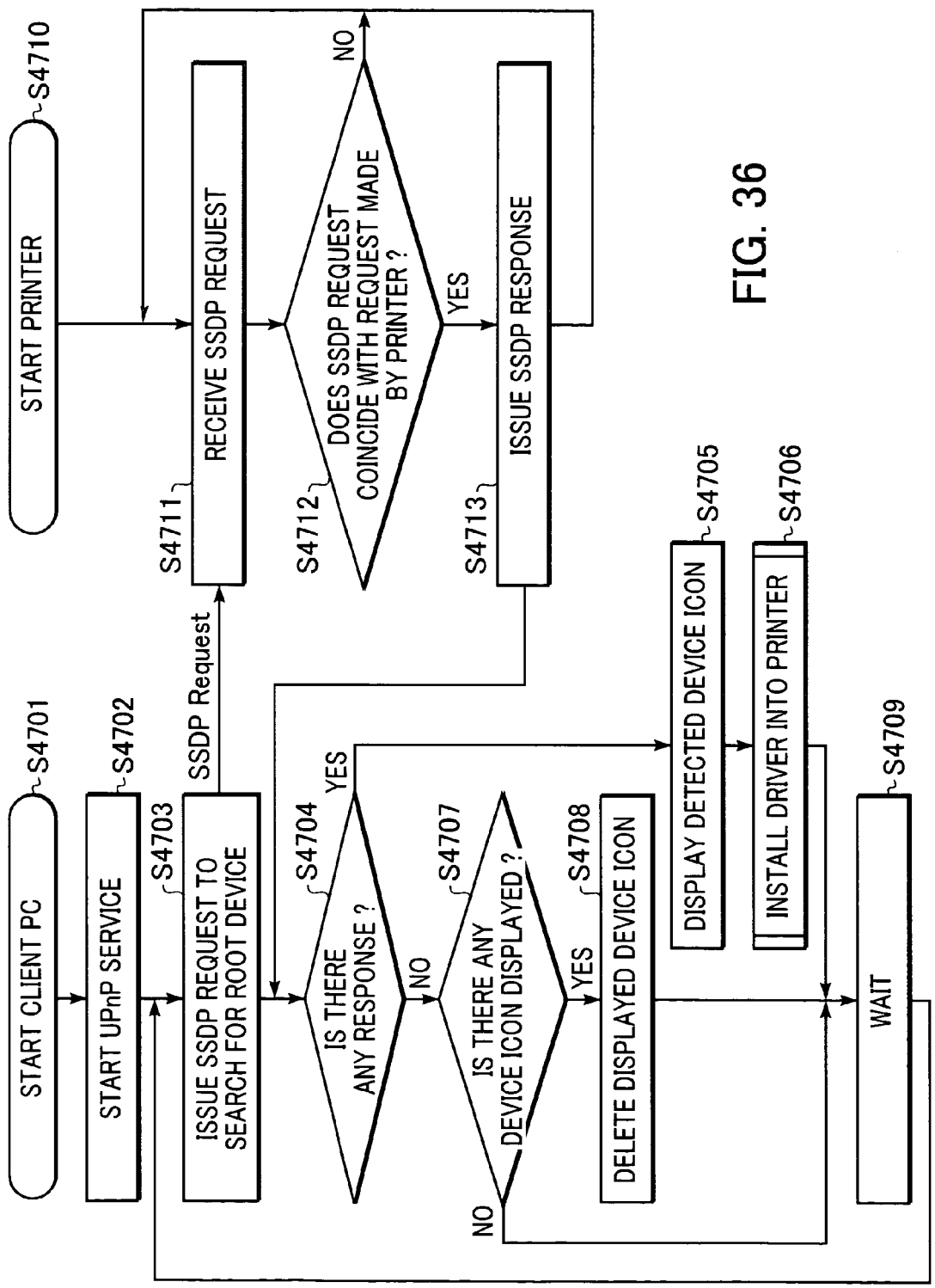
FIG. 36 is a flowchart illustrating a UPnP-compatible-device detecting process executed by a client PC in the first part of the print network system shown in FIG. 1.

FIG. 36 is a flowchart illustrating a UPnP-compatible device detecting process executed by the client PC 851 in the first part of the print network system shown in FIG. 1. This flowchart includes a SSDP response issuing process performed by the printer 855.

In FIG. 36, when the client PC 851 with Windows XP is started in step S4701, UPnP services are started in step S4702. Then, in step S4703, the client PC 851 issues an SSDP request to search for a UPnP root device.

It is then determined in step S4704 whether there is an SSDP response from a device (printer 855) that has received this SSDP request. If the outcome of step S4704 is YES, the client PC 851 displays the icon of the detected device (printer 855) in the My Network Places folder in step S4705, and then installs the driver of the printer in step S4706 according to the installing process, which is described below shown in FIG. 37. After the lapse of a predetermined period (for example, one minute) in step S4709, the process returns to step S4703.

If it is determined in step S4704 that there is no SSDP response from the device (printer 855), the client PC 851 determines in step S4707 whether an icon of the device (printer 855) that has not responded to the SSDP request is displayed in the My Network Places folder. If the result of step S4704 is YES, the icon is deleted in step S4708, and the process proceeds to step S4709. If it is determined in step S4707 that there is no icon of the device that has not responded, the process proceeds to step S4709.

When the printer 855 is started in step S4710, in step S4711, the printer 855 receives the SSDP request issued in step S4703. Then, the printer 855 determines in step S4712 whether the SSDP request coincides with the request (SSDP request to search for the UPnP root device) supported by the printer 855. If the result of step S4712 is YES, the printer 855 issues an SSDP response to the client PC 851 in step S4713, and returns to step S4711 to wait for an SSDP request. If the outcome of step S4712 is NO, the process returns to step S4711.

As described above, when there is a UPnP-compatible device (printer 855) in the print network system, the icon of the device (printer 855) ABC PrintMdl-K 000888 shown in FIG. 8 is displayed in the My Network Places folder of the display unit of the client PC 851, thereby allowing the client PC 851 to control the device. Then, the driver-less printing operation can be performed in the printer 855 on the file selected by the client PC 851 by using the presentation page shown in FIG. 12 according to the printing process shown in FIG. 14.

After installing the driver of the printer 855 in step S4706, the icon representing the printer 855, i.e., ABC PrintMdl-K 000888, shown in FIG. 17 is added and displayed in the Printers and Faxes folder of the client PC 851. Then, the client PC 851 can perform a printing operation by using the printer 855 based on print commands sent from a corresponding application (for example, Notepad shown in FIG. 21). The printing operation based on this application is described below with reference to FIGS. 42 through 44.

Figure 37:
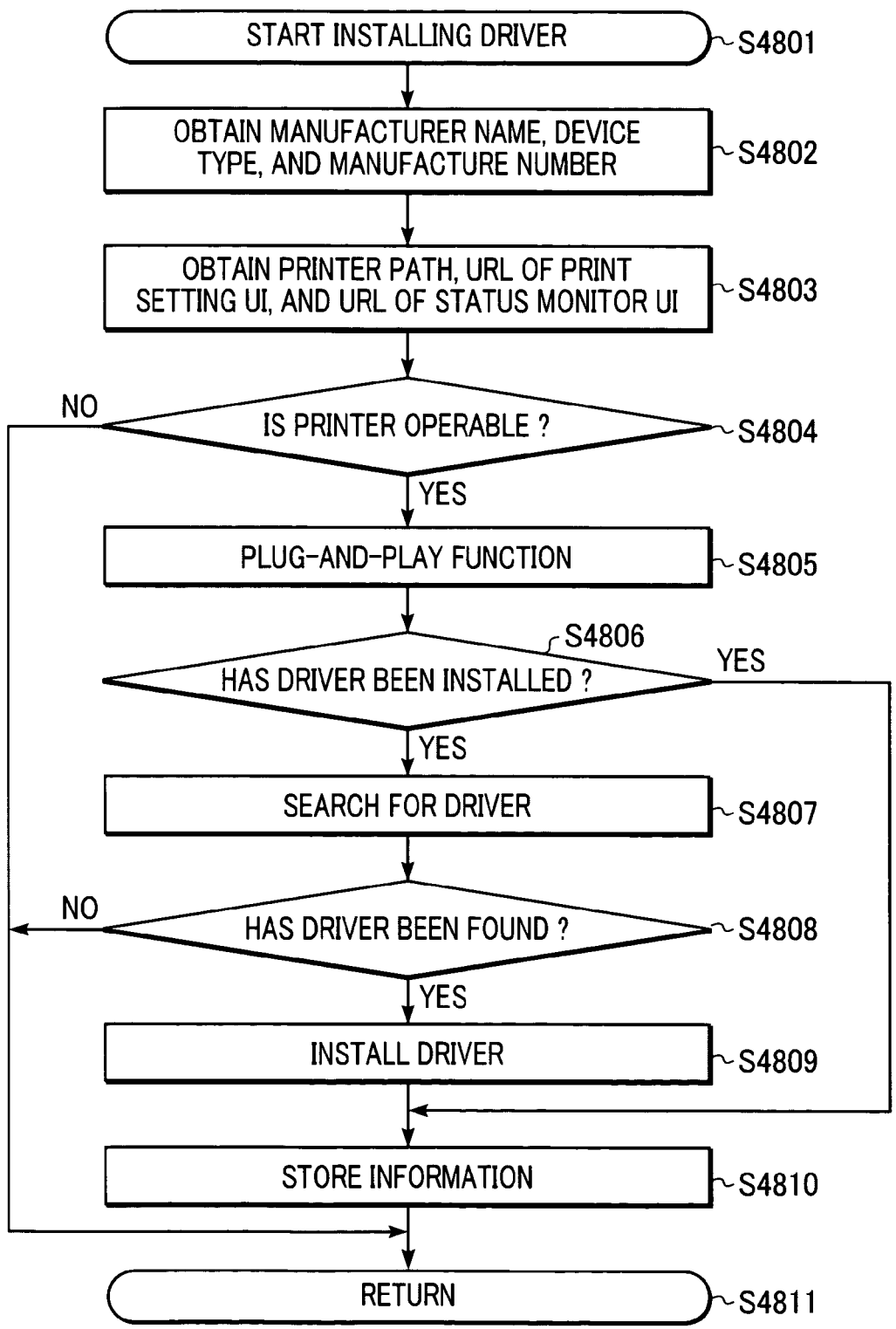
FIG. 37 is a flowchart illustrating an installing process for a printer driver in step S4706 of FIG. 36.

FIG. 37 is a flowchart illustrating the installing process in step S4706 of FIG. 36. The installing process is described below in the context of the first part of the print network system shown in FIG. 1.

In FIG. 37, when the installing operation of the driver of the printer 855 is started in step S4801, the manufacturer name, the device type, and the manufacture number of the printer 855 are obtained in step S4802 based on the descriptions in the 10th, 13th, and 14th lines shown in FIG. 32 obtained through UPnP communication. In step S4803, the network path, the URL of the presentation page of the print setting UI, and the URL of the presentation page of the status monitor UI of the printer 855 are also obtained based on the descriptions in the 19th, 24th, and 29th lines shown in FIG. 34 obtained through UPnP communication.

It is then determined in step S4804 whether the printer 855 is operable based on the PrinterState value in the 45th line through the 53rd line shown in FIG. 35 through UPnP communication. If the outcome of step S4804 is YES, the client PC 851 checks in step S4805 whether the driver for this printer 855 has been installed into the client PC 851 by the plug-and-play function of Windows XP. It is then determined in step S4806 whether the driver has been installed. If the outcome of step S4806 is NO, the client PC 851 searches for the driver for the printer 855 in another medium, for example, the HDD 1202 of the client PC 851 or a CD-ROM, in step S4807. It is then determined in step S4808 whether the driver has been found. If the driver has been found, the driver for the printer 855 is installed into the client PC 851 in step S4809. Then, in step S4810, information, for example, the network path, the URL of the presentation page of the print setting UI, and the URL of the presentation page of the status monitor UI, obtained in step S4803 is stored in the client PC 851 in association with the driver for the printer 855 in the client PC 851. The installing operation for the driver of the printer 855 is then completed in step S4811.

When installing the driver for the printer 855 in step S4809, ABC PrintMdl-K 000888 is automatically designated as the name of the printer 855 based on the manufacturer name, the device type, and the manufacture number obtained in step S4802. In this manner, the device name is displayed in the form of the manufacturer name, the device type, and the manufacture number. Accordingly, even if there is a plurality of printers of the same type with different manufacture numbers on the network, the user can distinguish the individual printers from the device names without erroneously accessing unintended devices.

Accordingly, when the driver of the printer 855 is installed (added) into the client PC 851 based on the information obtained through UPnP communication, the icon representing the printer 855, i.e., ABC PrintMdl-K 000888, shown in FIG. 17, is added and displayed in the Printers and Faxes folder of the client PC 851.

If it is determined in step S4804 that the printer 855 is not operable, the process proceeds to step S4811.

If it is determined in step S4806 that the driver for the printer 855 has been installed in the client PC 851, the process proceeds to step S4810.

If it is determined in step S4808 that the driver for the printer 855 is not installed in another medium, for example, the HDD 1202 of the client PC 851 or a CD-ROM, the process proceeds to step S4811.

Figure 38:
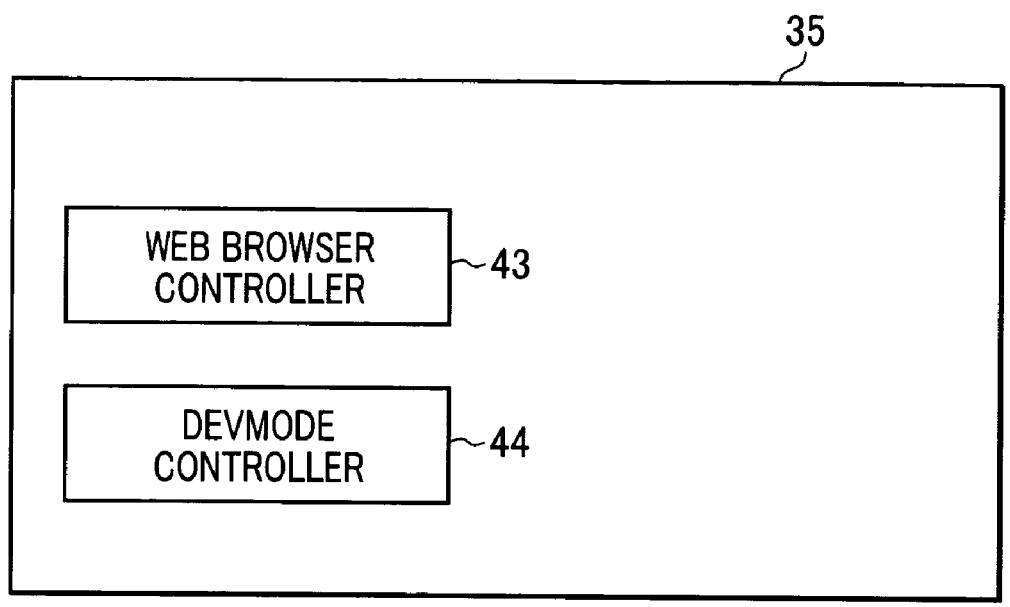
FIG. 38 is a block diagram illustrating the internal configuration of a UI module in the present invention.

FIG. 38 is a block diagram illustrating the internal configuration of the UI module 35 in the present invention.

In FIG. 38, a web browser controller 43 controls the web browser of the client PC 851 or 857 or the proxy server 853 in which the printer driver 50 is installed.

A DEVMODE controller 44 controls a DEVMODE structure used between the OS, the application 30, and the printer driver 50 when performing a printing operation, and, if necessary, reflects a control result in the presentation page of the print setting UI in cooperation with the web browser controller 43. The DEVMODE controller 44 also has a function of storing details of the presentation page of the print setting UI obtained from the web browser controller 43 in the client PC 851 or 857 or the proxy server 853 as settings for each user, thereby making it possible to reflect the favorite print settings for each user in the presentation page of the print setting UI as the initial settings.

Figure 39:
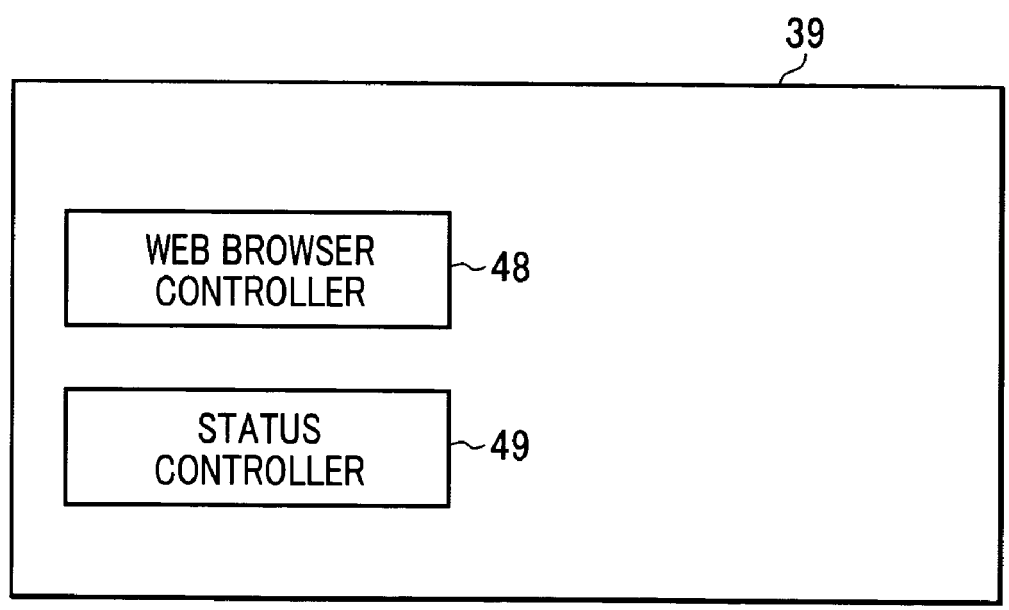
FIG. 39 is a block diagram illustrating the internal configuration of a status monitor in the present invention.

FIG. 39 is a block diagram illustrating the internal configuration of the status monitor 39 in the present invention.

In FIG. 39, a web browser controller 48 controls the web browser of the client PC 851 or 857 or the proxy server 853 in which the printer driver 50 is installed.

A status controller 49 controls the acquisition of the status from the printer (printer 855, 854, or 852) and, if necessary, reflects a control result in the presentation page of the status monitor UI in cooperation with the web browser controller 48.

The status controller 49 is operated when handling the printer 852 or 854 via the proxy server 853 as a pseudo-UPnP-compatible printer in the second or third part of the print network system shown in FIG. 5 or 6, respectively. When the printer is a UPnP-compatible printer, as in the printer 855 in the first part of the print network system shown in FIG. 1, the status controller 49 is not operated.

Figure 40:
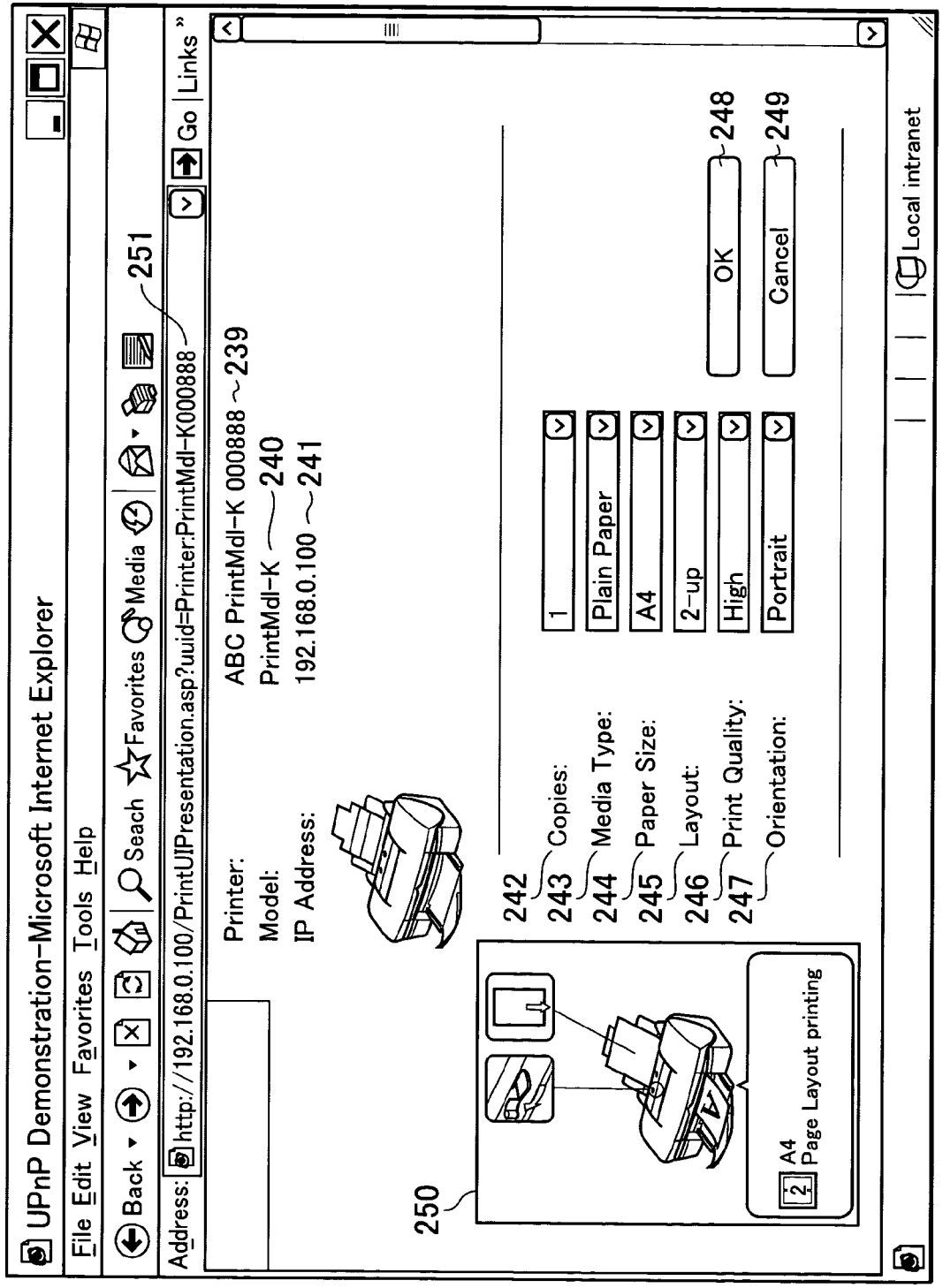
FIG. 40 illustrates a presentation page of a print setting UI published by a printer and displayed on the display unit of a client PC.

FIG. 40 illustrates a presentation page of the print setting UI published by the printer 855 on a network and displayed on the display unit of the client PC 851.

When the Preferences button 220 of the Print dialog shown in FIG. 22 is clicked, the client PC 851 obtains the URL of the presentation page of the print setting UI stored in the client PC 851, and starts the web browser (IE6) by using the URL as the argument. Then, the presentation page of the print setting UI, such as that shown in FIG. 40, is displayed on the display unit of the client PC 851. This presentation page of the print setting UI is formed of the ASP and is displayed by the dynamically created HTML data.

In FIG. 40, in an address display portion 251, the URL of this presentation page of the print setting UI is indicated.

In a printer-name display portion (Printer:) 239, the name of this printer 855 is automatically displayed, as shown in FIG. 17, when the driver of the printer 855 is installed into the client PC 851.

In a device-type display portion (Model:) 240, the device type of the printer 855 is displayed.

In a printer-path display portion (IP Address:) 241, the network path of the printer 855 is indicated.

In a number-of-copy specifying portion (Copies:) 242, the number of copies to be printed can be designated in a range of 0 to 100.

In a paper-type selection portion (Media Type:) 243, the paper type can be selected from Plain Paper, Photo Paper, and OHP Sheet.

In a paper-size selection portion (Paper Size:) 244, the paper size can be selected from A4, A5, B5, and Letter.

In a print-layout selection portion (Layout:) 245, the print layout can be selected from 1-up, 2-up, and 4-up.

In a print-quality selection portion (Print Quality:) 246, the print quality can be selected from High, Standard, and Draft.

In a print-orientation selection portion (Orientation:) 247, the print orientation can be selected from Portrait and Landscape.

An OK button 248 can be clicked for updating and storing print settings based on the print setting information, and then, the web browser is finished to close the presentation page of the print setting UI.

A Cancel button 249 can be clicked for finishing the web browser to close the presentation page of the print setting UI without updating the print settings based on the print setting information.

In an operating guide portion 250, operating guide information for assisting the user is displayed.

Figure 41:
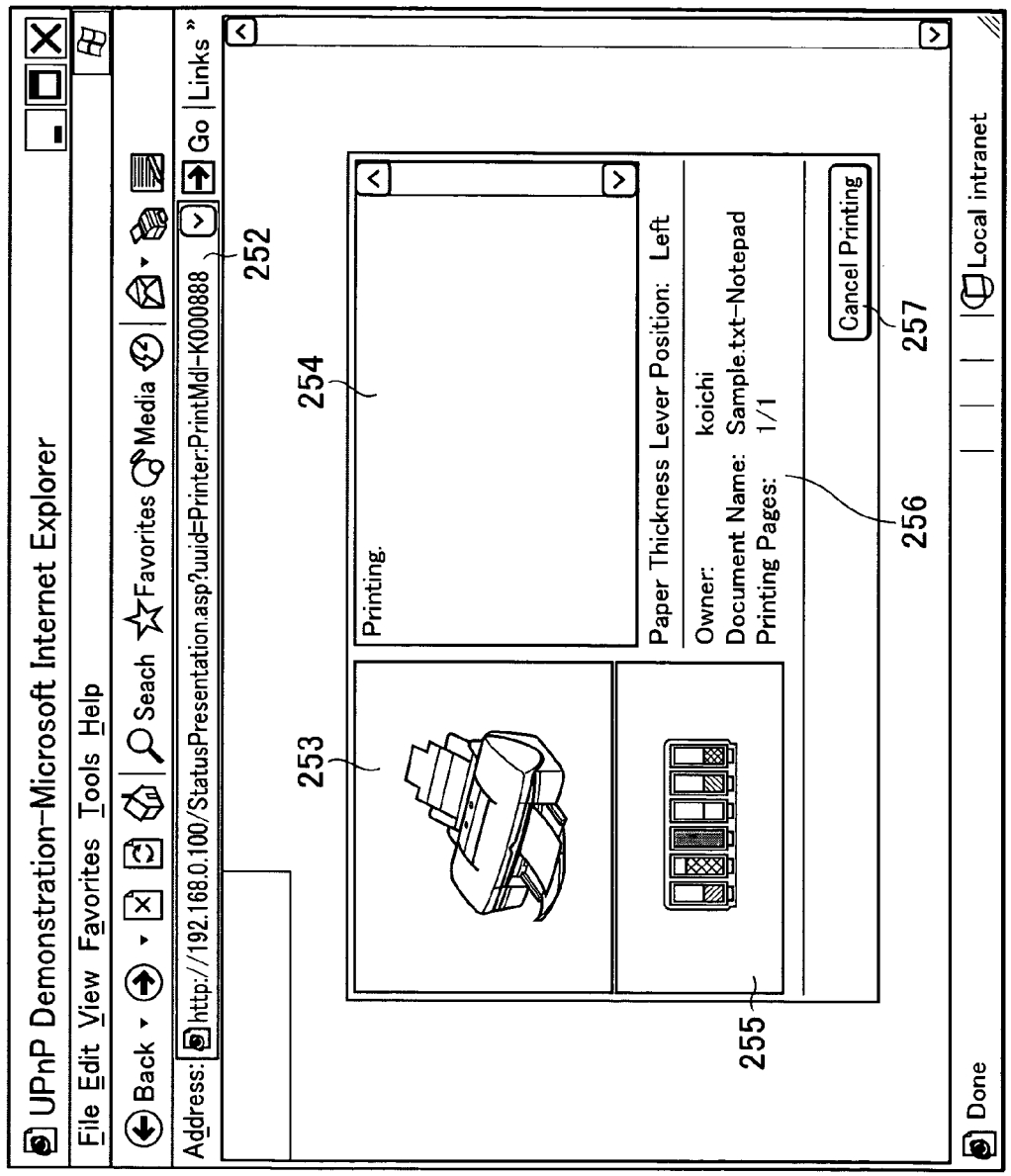
FIG. 41 illustrates a presentation page of a status monitor UI published by a printer and displayed on the display unit of a client PC.

FIG. 41 illustrates a presentation page of the status monitor UI published by the printer 855 on the network and displayed on the display unit of the client PC 851.

When the status monitor 39 is started during the printing operation, the client PC 851 obtains the URL of the presentation page of the status monitor UI stored in the client PC 851, and starts the web browser (IE6) by using the URL as the argument. Then, a presentation page of the status monitor UI, such as that shown in FIG. 41, is displayed. This presentation page of the status monitor UI is formed of ASP and is displayed based on the dynamically created HTML data, thereby making it possible to reflect and display the status of the printer 855 in real time. The content of the presentation page is automatically updated at regular intervals (for example, every five seconds) by using JavaScript. Accordingly, by using this function in combination with the above-described ASP function, the display content can be updated in real time about every five seconds.

In FIG. 41, in an address display portion 252, the URL of the presentation page of the status monitor UI is indicated.

In a printer-status display portion 253, the status of the printer 855 is displayed as an image.

In a message display portion 254, a message about the status of the printer 855 or the user operation can be displayed.

A remaining-ink display portion 255, the remaining amount of ink in the ink cartridge attached to the printer 855 is indicated.

In a print-job information display portion 256, the owner name (Owner:), the document name (Document Name:), and the page number (Printing Pages:) of a print job in progress are indicated.

A print cancel (Cancel Printing) button 257 can be clicked for canceling a print job in progress.

Figure 42:
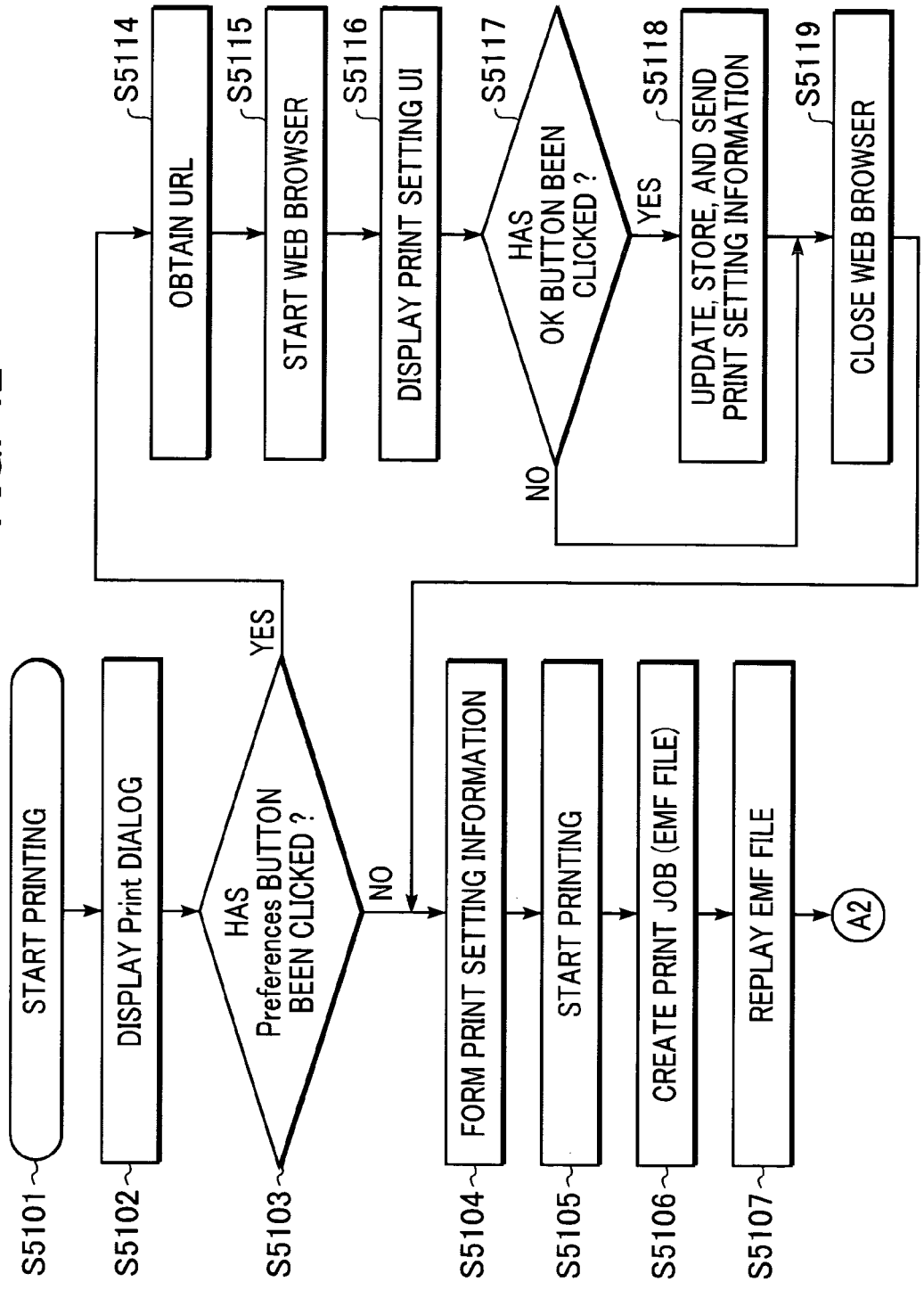

FIGS. 42 and 43 are a flowchart illustrating a printing process from when print commands are given from the application of the client PC 851 to when a printing operation is performed in the printer 855 in the first part of the network print system shown in FIG. 1.

Steps S5101 through S5111 of FIGS. 42 and 43 are the same as steps S3301 through S3311, respectively, of FIGS. 27 and 28, and an explanation thereof is thus omitted.

When it is determined in step S5103 that the Preferences button 220 (FIG. 22) has been clicked, the client PC 851 obtains the URL of the presentation page of the print setting UI stored in the client PC 851 in step S5114. Then, the client PC 851 starts the web browser (IE6) by using the URL as the argument in step S5115, and the presentation page of the print setting UI shown in FIG. 40 is displayed in step S5116. It is then determined in step S5117 whether the OK button 248 has been clicked. If the outcome of step S5117 is YES, the print settings based on the print setting information are updated, and the updated print setting information is sent to the printer 855 in step S5118. Then, after the web browser (IE6) is finished to close the presentation page of the print setting UI in step S5119, the process proceeds to step S5104.

If the result of step S5117 is NO, and more specifically, if the Cancel button 249 has been clicked after displaying the presentation page of the print setting UI shown in FIG. 40, the process proceeds to step S5119.

The print setting information sent to the printer 855 in step S5118 is stored in the printer 855 in association with the information concerning the client PC 851. The information concerning the client PC 851 and the print setting information are used as initial information when this presentation page is accessed from the client PC 851 for the next time. Accordingly, when the user accesses the presentation page for the next time, the user's favorite print settings are initially displayed on the presentation page, thereby improving the user operability.

When the status monitor 39 is started in step S5110, the client PC 851 obtains the URL of the presentation page of the status monitor UI stored in the client PC 851 in step S5120, and starts the web browser (IE6) by using the URL as the argument in step S5121. Then, in step S5122, the presentation page of the status monitor UI shown in FIG. 41 is displayed. While the status monitor 39 is being operated, the printer 855 checks the status of the printer 855 in step S5123. It is then determined in step S5124 whether there is a change in the status of the printer 855. If the result of step S5124 is YES, the status is stored in step S5125, and the display content of the presentation page of the status monitor UI published by the printer 855 is updated in step S5126. After waiting for a predetermined period (for example, five seconds) in step S5127, the process returns to step S5123.

If it is determined in step S5124 that there is no change in the status of the printer 855, the process proceeds to step S5127.

While the status monitor 39 is being operated, the above-described processing is repeated, and the latest status of the printer 855 is displayed in real time in the presentation page of the status monitor UI shown in FIG. 41.

In step S5111, the client PC 851 sends print control commands to the printer 855. After sending all the print commands to the printer 855, the web browser is finished to close the presentation page of the status monitor UI, and then, the operation of the status monitor 39 is stopped in step S5112. The printing operation is then completed in step S5113.

In the printer 855, the printing operation is performed based on the print control commands sent in step S5111.

The printing operation performed in the printer 855 on the network 856 according to print commands sent from the client PC 851 has been described above with reference to FIGS. 42 and 43. Not only in the first part shown in FIG. 1, but also in the second part shown in FIG. 5 or the third part shown in FIG. 6, instead of the printer 855, the proxy server 853 can perform UPnP control so that the printer 852 or 854 can be handled as a pseudo-UPnP-compatible printer, thereby performing a printing operation similar to the above-described printing operation. Even in a local connection environment, as in the third part of the print network system shown in FIG. 6 including the proxy server 853 and the printer 854 connected to each other via a USB interface, if the printer 854 has a UPnP-compatible printer function similar to that of the printer 855 of the first part, a printing operation similar to the above-described printing operation can be performed.

A description is given below, with reference to the flowchart of FIG. 44, of a process executed by the client PC 851 in accordance with another embodiment of the present invention when the printer has been selected in the printer selection portion 219 of the Print dialog shown in FIG. 22 and when the Preferences button 220 has been clicked.

Some client PCs have a function of discovering UPnP-compatible devices and a function of searching for SNMP-compatible devices. The process shown in FIG. 44 is effective particularly when a plurality of printers, for example, UPnP-compatible printers and SNMP-compatible printers, are controlled by a single integrated printer driver. To deal with such a situation, printer attribute information indicating whether a printer on the network is compatible with UPnP, or is compatible with only existing network management protocols, for example, SNMP, without being compatible with UPnP, is prestored in, for example, the HDD of the client PC. Alternatively, the client PC determines whether the printer is a UPnP-compatible printer or a printer compatible with only existing network management protocols by determining whether the URL of the presentation page of the print setting UI stored in the client PC can be obtained in step S5114 of FIG. 42.

Figure 44:
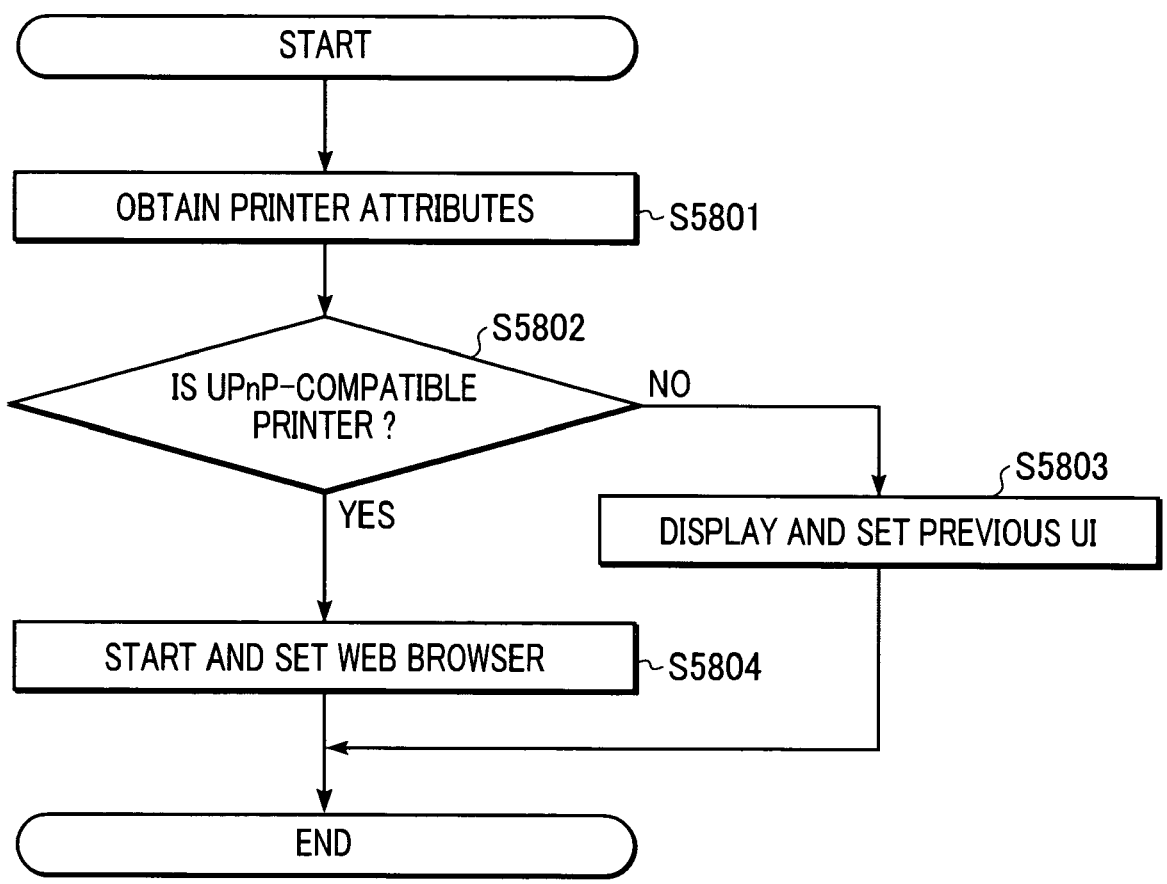
FIG. 44 is a flowchart illustrating a process executed by a client PC when selecting a printer in a printer selection portion of the Print dialog shown in FIG. 22 and clicking the Preferences button according to another embodiment of the present invention.

The process shown in FIG. 44 is started when the printer is selected in the printer selection portion 219 of the Print dialog shown in FIG. 22 and when the Preferences button 220 is clicked.

In step S5801, the client PC 851 obtains attribute information of the printer selected in the printer selection portion 219 from the HDD of the client PC 851. As stated above, if the type of printer is determined in step S5114 of FIG. 42, step S5114 is performed instead of step S5801.

Then, in step S5802, the client PC 851 determines whether the printer selected in the printer selection portion 219 is a UPnP-compatible printer by referring to the printer attribute information or by determining whether the URL of the presentation page of the print setting UI stored in the client PC 851 can be obtained. If the printer selected in the printer selection portion 219 is a UPnP-compatible printer, the process proceeds to step S5804. If the printer is not a UPnP-compatible printer, the process proceeds to step S5803.

In step S5803, steps S3314 through S3316 shown in FIG. 27 are performed.

In step S5804, steps S5114 through S5119 shown in FIG. 42 are performed.

After steps S5803 and S5804, the process is completed. Then, the process via step S5804 may proceed to step S5104 of FIG. 42, and the process via step S5803 may proceed to step S3304 of FIG. 27.

According to this embodiment, the client PC 851 determines whether or not the printer 855 is a UPnP-compatible printer in response to the click of the Preferences button 220 shown in FIG. 22. Accordingly, the user does not have to be aware of whether or not the printer 855 is a UPnP-compatible printer, thereby improving the user operability. Since there is no need to be aware of the type of OS, the efficiency in designing UIs using the UPnP presentation information can be enhanced.

Figure 45:
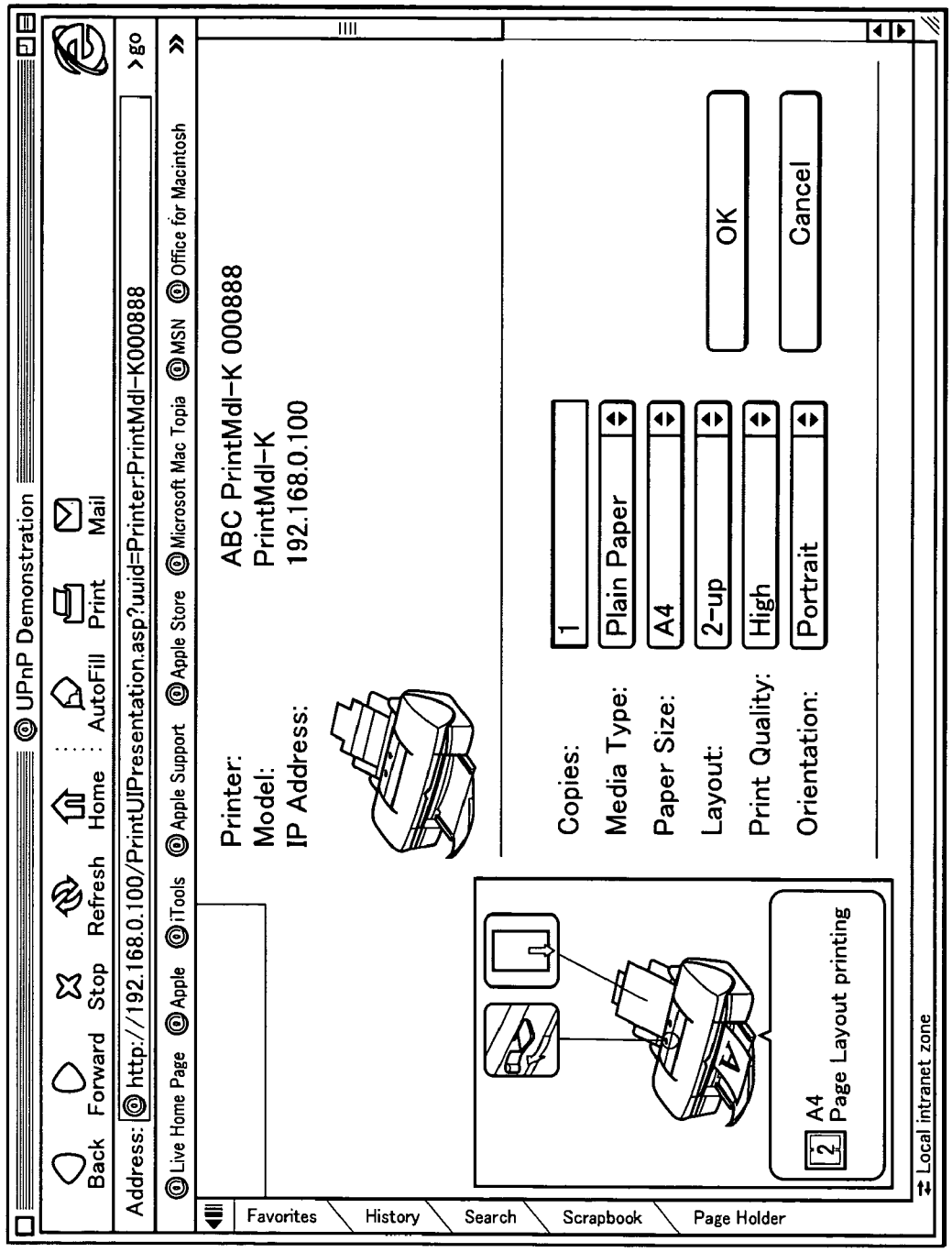
FIG. 45 illustrates a presentation page of a print setting UI published by a printer and displayed on the display unit of a client PC.

FIG. 45 illustrates a presentation page of the print setting UI published by the printer 855 on the network 856 and displayed on the display unit of the client PC 857.

The presentation page of the print setting UI shown in FIG. 45 is displayed on the client PC 857 by using the OS (Mac OS) and the web browser (IE5) different from the counterparts of the client PC 851 based on the URL of the presentation page of the print setting UI obtained from the printer 855 through UPnP communication and stored in the client PC 857. Comparing the presentation page shown in FIG. 45 with that shown in FIG. 40, the parts represented by 239 through 251 in FIG. 40 are similar to the counterparts of FIG. 45, though they are slightly different. Accordingly, an explanation of the individual parts in FIG. 45 is omitted here.

By preparing a single presentation page of the print setting UI in the printer 855, printing can be performed by different client PCs by operating similar print setting UIs. Accordingly, the number of steps for developing the print setting UI can be reduced, and the user can give print commands without having to feel uncomfortable when using different client PCs, thereby improving the user operability.

Figure 46:
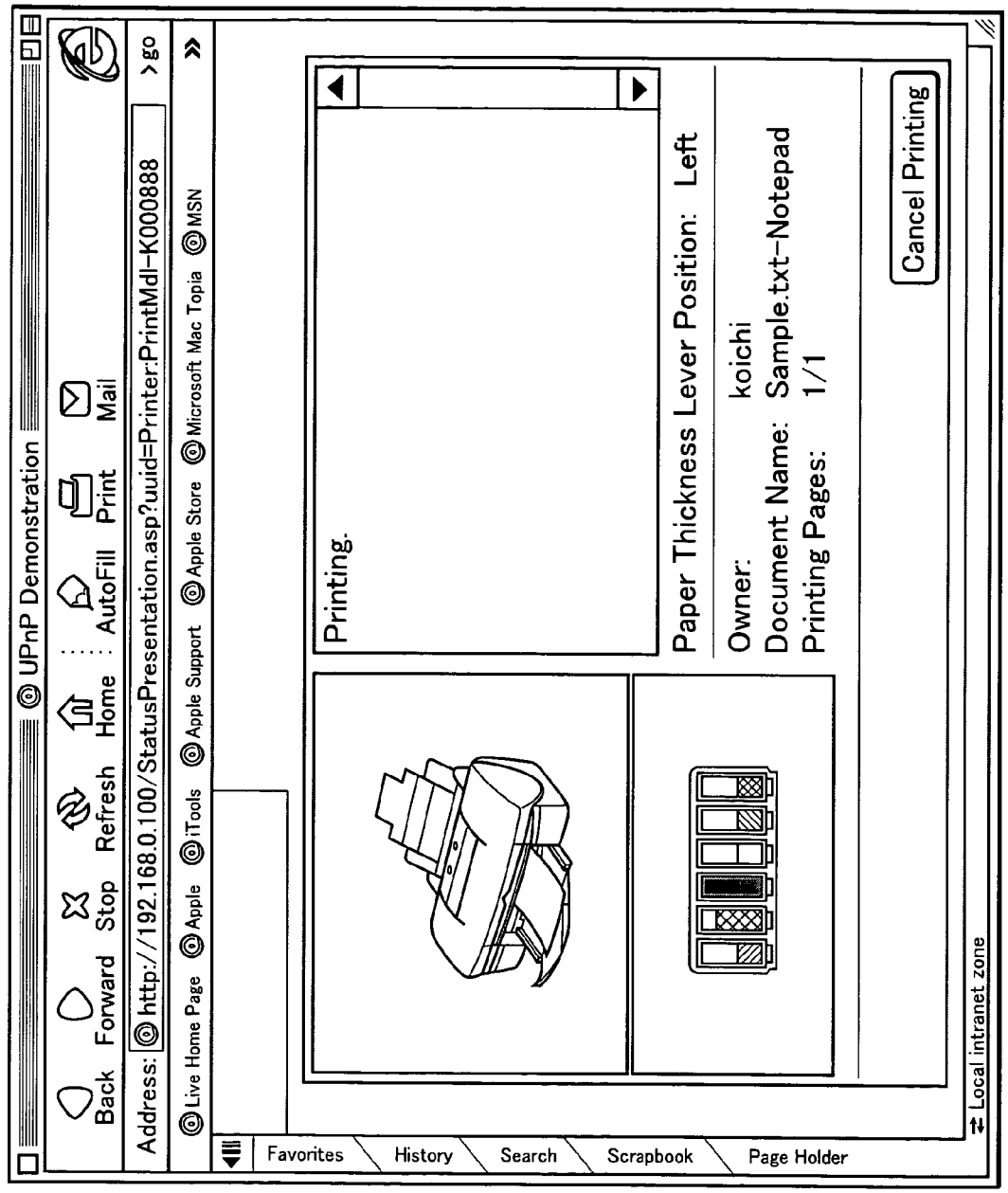
FIG. 46 illustrates a presentation page of a status monitor UI published by a printer and displayed on the display unit of a client PC.

FIG. 46 illustrates a presentation page of the status monitor UI published by the printer 855 on the network 856 and displayed on the display unit of the client PC 857.

The presentation page of the status monitor UI shown in FIG. 46 is displayed on the client PC 857 by using the OS (Mac OS) and the web browser (IE5) different from the counterparts of the client PC 851 based on the URL of the presentation page of the status monitor UI obtained from the printer 855 through UPnP communication and stored in the client PC 857. Comparing the presentation page shown in FIG. 46 with that shown in FIG. 41, the parts represented by 252 through 257 in FIG. 41 are similar to the counterparts of FIG. 46, though they are slightly different. Accordingly, an explanation of the individual parts in FIG. 46 is omitted here.

By preparing a single presentation page of the status monitor UI in the printer 855, similar status monitor UIs can be provided for different client PCs. Accordingly, the number of steps for developing the status monitor UI can be reduced, and the user can give print commands without having to feel uncomfortable when using different client PCs, thereby improving the user operability.

Figure 51:
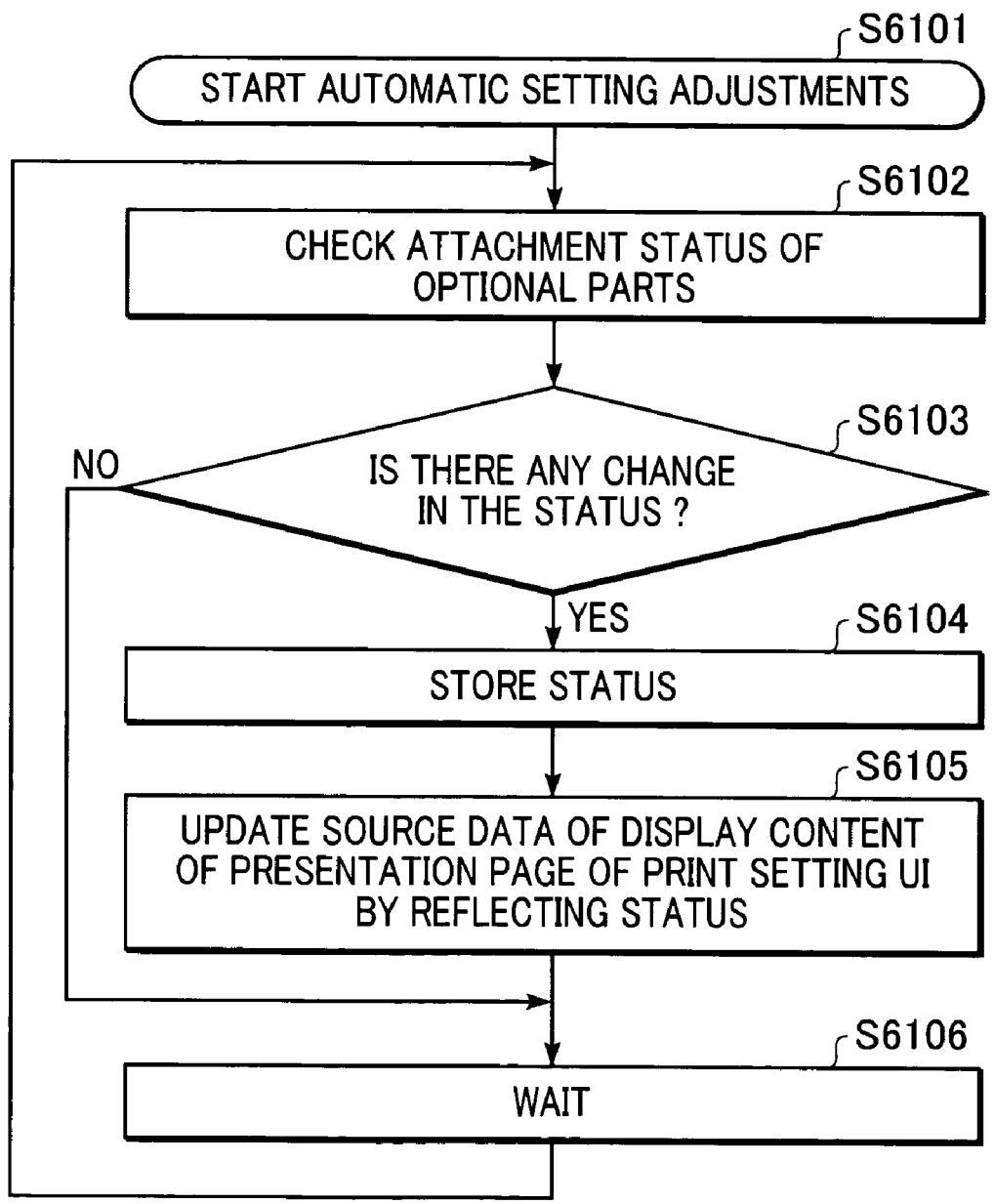
FIG. 51 is a flowchart illustrating an automatic setting adjustment process performed in the proxy server.

FIG. 51 is a flowchart illustrating an automatic setting adjustment operation in the proxy server 853. It is now assumed that the automatic double-sided print unit 859 shown in FIG. 6 is attached to the printer 854. In FIG. 51, when the UPnP device controller 818 of the proxy server 853 is operated, automatic setting adjustments are started in step S6101. Then, in step S6102, the UPnP device controller 818 controls the USB protocol stack 819 to check the attachment status of optional parts of the printer 854. It is then determined in step S6103 whether there is any change in the status of the optional parts. If the outcome of step S6103 is YES, the status is stored in step S6104, and the display content of the presentation page (FIG. 40, 45, or 49) of the print setting UI is updated by reflecting the status of the optional parts in step S6105. After waiting for a predetermined period (for example, five seconds) in step S6106, the process returns to step S6102. If it is determined in step S6103 that there is no change in the status of the optional parts, the process proceeds to step S6106. While the UPnP device controller 818 is being operated, such automatic setting adjustments are repeated. Then, the latest status of the optional parts attached to the printer 854 is stored in the source data of the display content of the presentation page of the print setting UI, and is reflected in real time in the presentation page displayed on the client PC, such as that shown in FIG. 40, 45, or 49. For example, the status of the automatic double-sided print unit 859 attached to the printer 854 is checked in step S6102. If it is found in step S6103 that the attachment status of printer 854 is changed, information indicating that the automatic double-sided print unit 859 is attached to the printer 854 is stored in step S6104, and this information is reflected in the source data of the display content of the presentation page of the print setting UI in step S6105. In the client PC, an automatic double-sided print selection portion 258, which is described below with reference to FIG. 49, of the presentation page of the print setting UI, is displayed.

It is now assumed that the automatic double-sided print unit 859 is detached from the printer 854. Then, according to the automatic setting adjustment process shown in FIG. 51, information indicating that the automatic double-sided print unit 859 is not attached to the printer 854 is stored in step S6104, and this information is reflected in the source data of the display content of the presentation page of the print setting UI in step S6105. Then, a presentation page of the print setting UI without the automatic double-sided print selection portion 258, such as that shown in FIG. 40 or 45, is displayed on the client PC.

Figure 52:
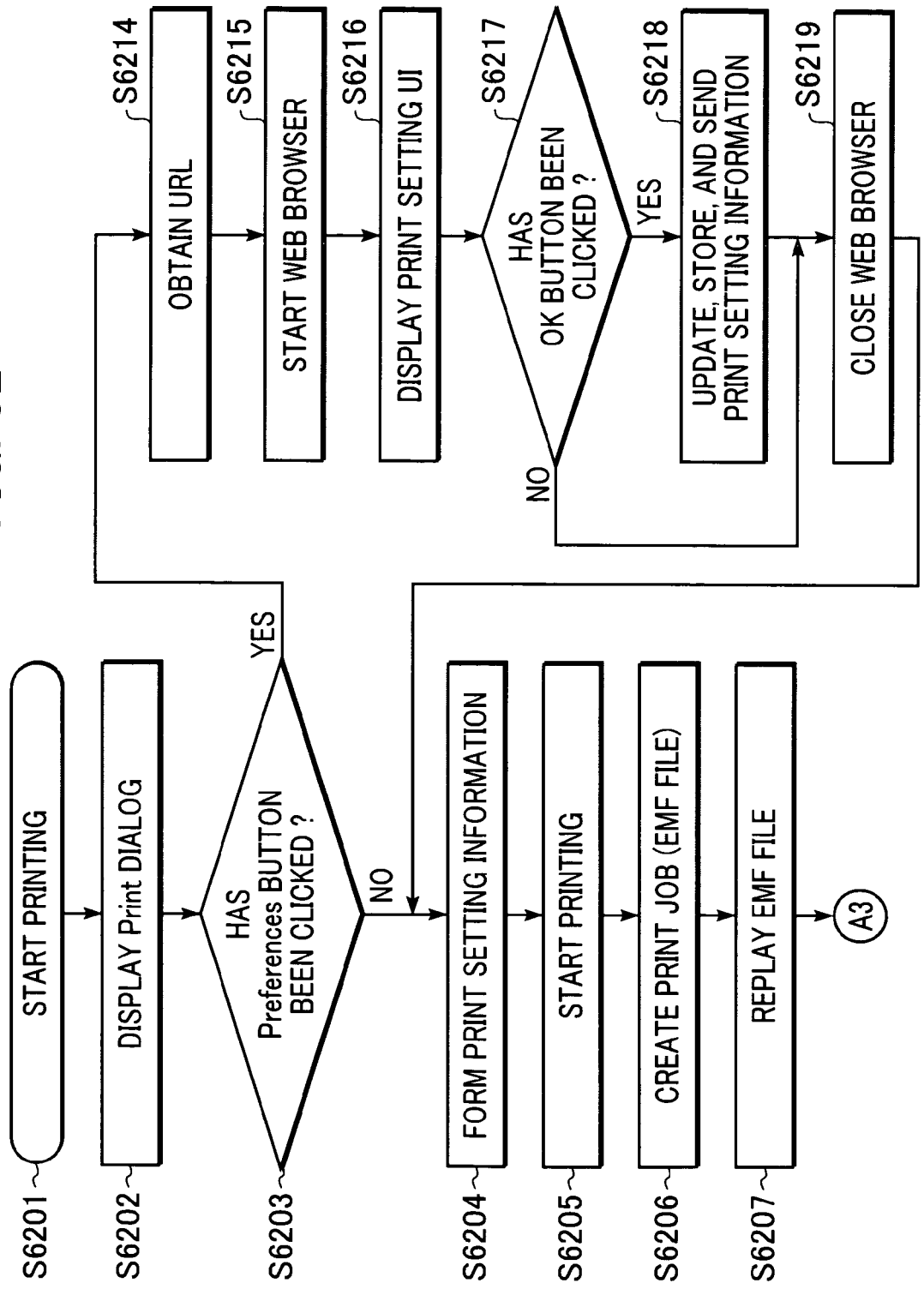
FIGS. 52 and 53 are a flowchart illustrating a basic printing process from when print commands are given from an application of a client PC to when a printing operation is performed in a printer via the proxy server in the third part of the network print system shown in FIG. 6.
Figure 53:
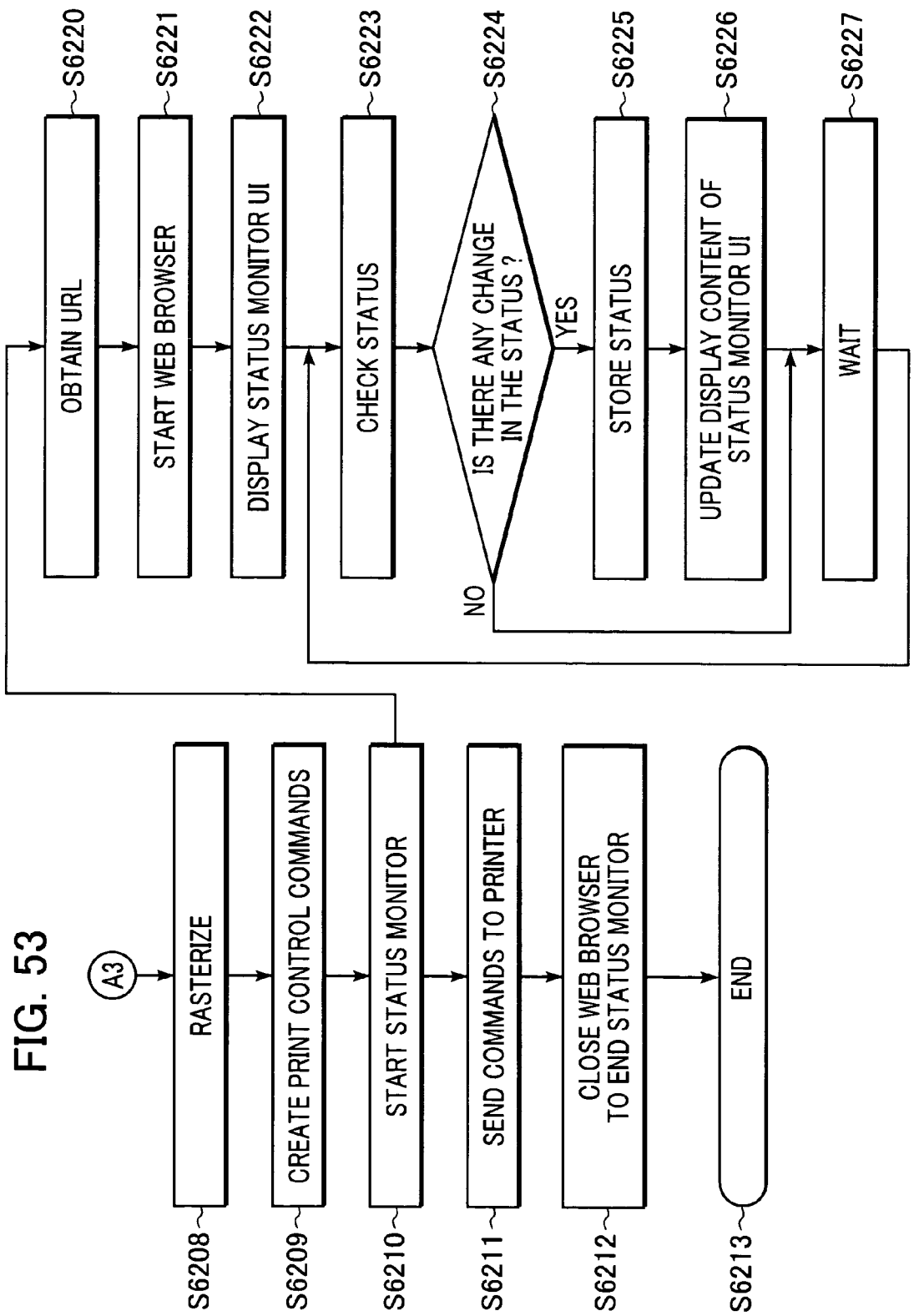

FIGS. 52 and 53 are a flowchart illustrating a printing process from when print commands are given from the application of the client PC 851 to when a printing operation is performed in the printer 854 via the proxy server 853 in the third part of the network print system shown in FIG. 6. Steps S6201 through S6227 of FIGS. 52 and 53 are the same as steps S5101 through S5127 of FIGS. 42 and 43, and an explanation thereof is thus omitted.

Figure 49:
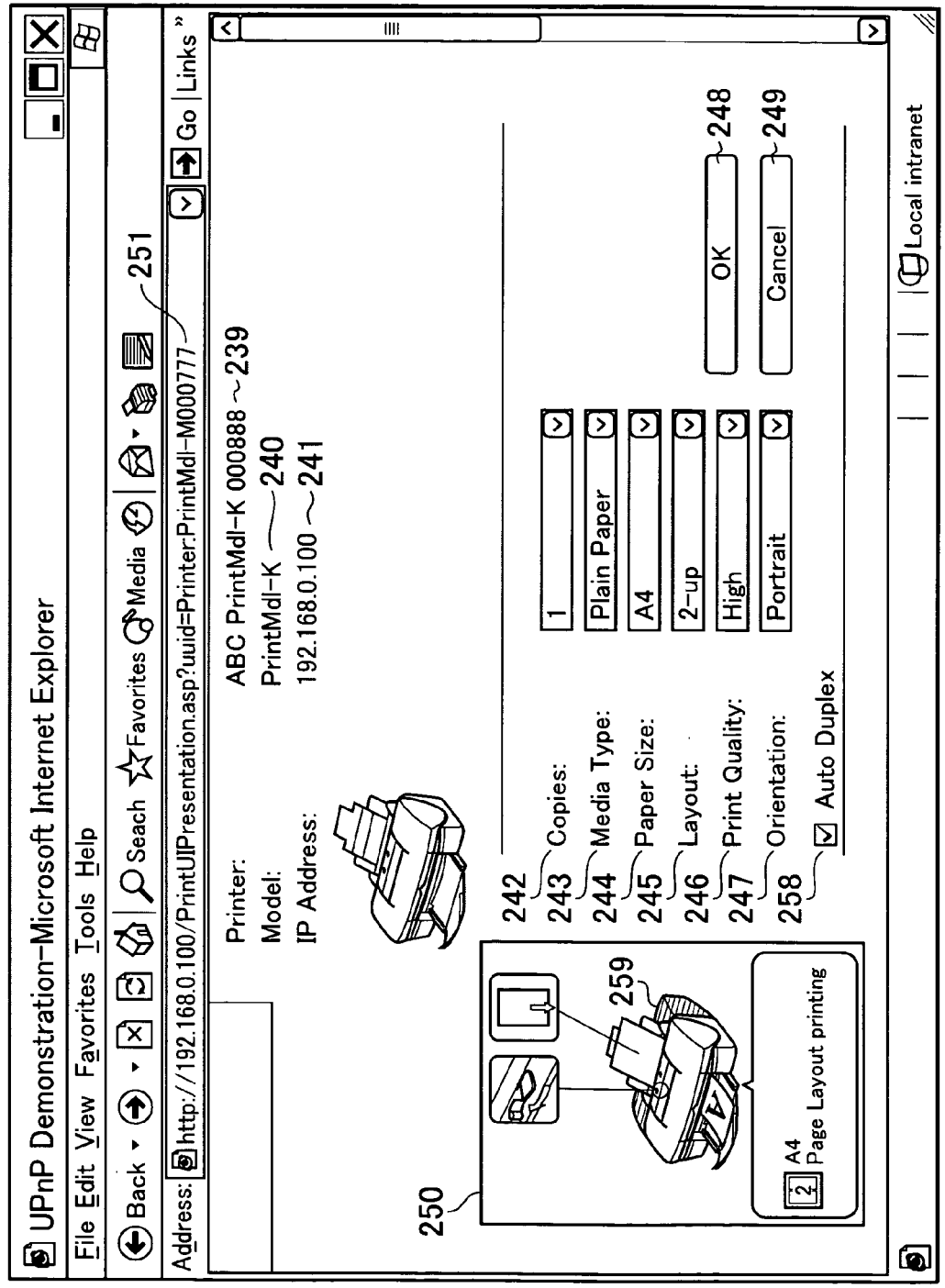
FIG. 49 illustrates a presentation page of a print setting UI published by a proxy server and displayed on the display unit of a client PC when an automatic double-sided print unit is attached to a printer.

It is now assumed that the automatic double-sided print unit 859 is attached to the printer 854 in FIG. 6. Since the information indicating that the automatic double-sided print unit 859 is attached is reflected in the source data of the display content of the presentation page of the print setting UI in step S6105 of FIG. 51, the presentation page of the print setting UI shown in FIG. 49 is displayed in step S6216 of FIG. 52. It is then determined in step S6217 whether the OK button 248 has been clicked. If the outcome of step S6217 is YES, print settings including information indicating that the automatic double-sided print function is turned ON are updated and stored based on the print setting information, and this print setting information is sent to the proxy server 853 in step S6218. After finishing the web browser (IE6) to close the presentation page of the print setting UI in step S6219, the process proceeds to step S6204. In step S6204, the application queries as to the function of the printer driver, and then, forms the print setting information concerning, for example, the DEVMODE structure. The DEVMODE structure includes information that the automatic double-sided print function is turned ON.

Figure 50:
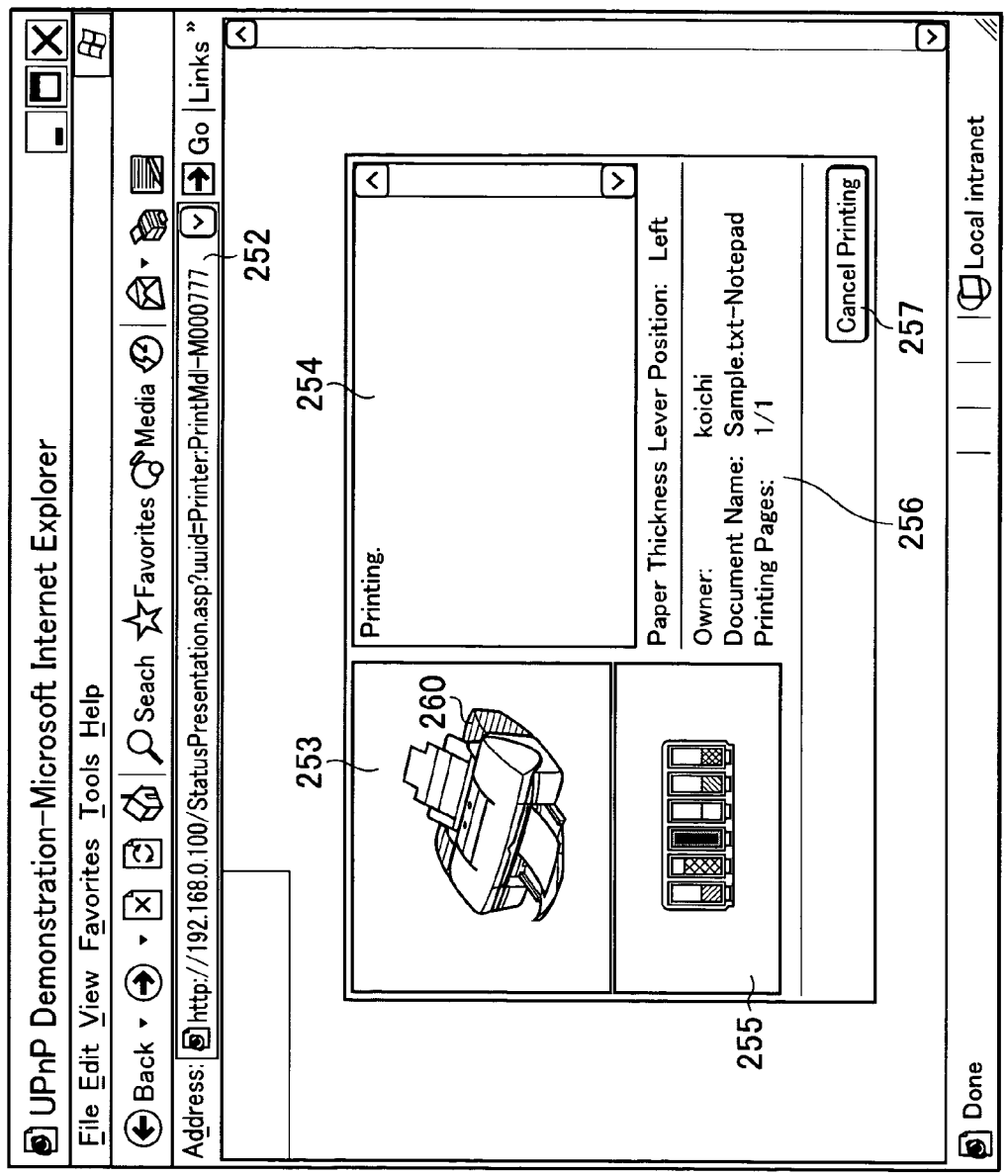
FIG. 50 illustrates a presentation page of a status monitor UI published by a proxy server and displayed on the display unit of a client PC when the automatic double-sided print unit is attached to a printer.

In step S6222, the presentation page of the status monitor UI shown in FIG. 50 is displayed, and while the status monitor 39 is being operated, the proxy server 853 checks the status of the printer 854 in step S6223. It is then determined in step S6224 whether there is a change in the status of the printer 854. If the outcome of step S6224 is YES, the status is stored in step S6225, and the source data of the display content of the presentation page of the status monitor UI published by the proxy server 853 is updated in step S6226. Then, after waiting for a predetermined period (for example, five seconds) in step S6227, the process returns to step S6223. If it is determined in step S6224 that there is no change in the status of the printer 854, the process proceeds to step S6227. While the status monitor 39 is being operated, the above-described processing is repeated, and the latest status of the printer 854 is displayed in real time in the presentation page of the status monitor UI in the client PC 851 shown in FIG. 50. Information that the automatic double-sided print unit 859 is attached to the printer 854 is stored as part of the status in step S6225, and is reflected in the source data of the display content of the presentation page of the status monitor UI in step S6226.

It is now assumed that the automatic double-sided print unit 859 is detached from the printer 854 in FIG. 6. Since the information that the automatic double-sided print unit 859 is not attached to the printer 854 is reflected in the source data of the display content of the presentation page of the print setting UI in step S6105 of FIG. 51, the presentation page of the print setting UI shown in FIG. 40 is displayed in step S6216 of FIG. 52. It is then determined in step S6217 whether the OK button 248 has been clicked. If the result of step S6217 is YES, the print settings including the information that the automatic double-sided print function is turned OFF are updated and stored based on the print setting information, and this print setting information is sent to the proxy server 853 in step S6218. Then, after the web browser (IE6) is finished to close the presentation page of the print setting UI in step S6219, the process proceeds to step S6204. In step S6204, the application queries as to the function of the printer driver, and forms print setting information concerning, for example, the DEVMODE structure. In this case, the DEVMODE structure includes information that the automatic double-sided print function is turned OFF. The information that the automatic double-sided print unit 859 is not attached to the printer 854 is stored as part of the status in step S6225, and is reflected in the source data of the display content of the presentation page of the status monitor UI in step S6226.

As discussed above, since the attachment status of the automatic double-sided print unit 859 to the printer 854 is reflected in real time in the presentation page of the print setting UI or the status monitor UI, the optimal printing method in accordance with the printer status can be selected. It is thus possible to provide a print network system exhibiting superior operability. In each client PC, the user can perform the operation by referring to the presentation page of the print setting UI which precisely reflects the status of the optional parts attached to the printer. Accordingly, the user can be prevented from inadvertently making errors during the printing operation.

FIG. 49 illustrates a presentation page of the print setting UI published by the proxy server 853 on the network 856 and displayed on the display unit of the client PC 851 when the automatic double-sided print unit 859 is attached to the printer 854. In FIG. 49, the individual parts indicated by 239 through 251 are the same as those shown in FIG. 40, and an explanation thereof is thus omitted. The automatic double-sided print selection portion (Auto Duplex) 258 is displayed when the automatic double-sided print unit 859 is attached to the printer 854. In FIG. 49, the automatic double-sided print selection portion 258 is checked, indicating that the automatic double-sided print function is turned ON. In an automatic double-sided print unit display portion 259, a visual image of the printer 859 to which the automatic double-sided print unit 859 is attached is displayed.

FIG. 50 illustrates a presentation page of the status monitor UI published by the proxy server 853 on the network 856 and displayed on the display unit of the client PC 851 when the automatic double-sided print unit 859 is attached to the printer 854. In FIG. 50, the individual parts indicated by 252 through 257 are the same as those shown in FIG. 41, and an explanation thereof is thus omitted. In an automatic double-sided print unit display portion 260, a visual image of the printer 854 to which the automatic double-sided print unit 859 is attached is displayed.

Figure 47:
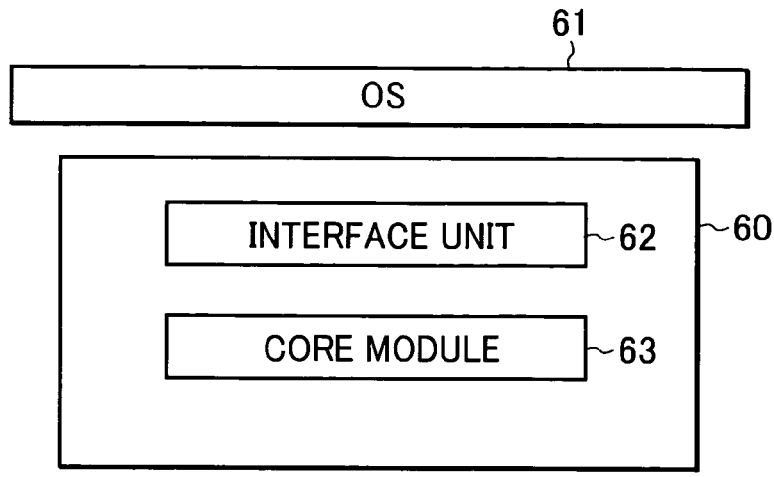
FIG. 47 is a block diagram illustrating the configuration of a UPnP device controller of the printer in the first part of the print network system shown in FIG. 1.

FIG. 47 is a block diagram illustrating the UPnP device controller 60 of the printer 855 in the first part of the print network system shown in FIG. 1.

In FIG. 47, an OS 61, which is Linux, controls the printer 855.

A core module 63 controls a UPnP function, and also controls a web server function.

An interface unit 62, which controls an interface with the OS 61, performs processing according to the OS 61 (Linux-dependent processing). The processing in the core module 63 is described in a structured language, which is independent of OS, for example, C or C++.

FIG. 47 illustrates the UPnP device controller 60 of the printer 855. The UPnP device controller 818 of the proxy server 853 shown in FIG. 5 is also configured similarly to the UPnP device controller 60. In the proxy server 853, however, the OS 61 is Windows XP, and the interface unit 62 performs processing dependent on the OS 61.

In the print network system including the first part shown in FIG. 1, the second part shown in FIG. 5, and the third part shown in FIG. 6, the single core module 63 independent of the OS is developed, and the interface unit 62 dependent of the OS is developed according to the type of OS. For example, for the printer 855, the interface unit 62 is developed for Linux, and for the proxy server 853, the interface unit 62 is developed for Windows XP. Accordingly, the number of steps for developing the interface units 62 and the core module 63 is significantly reduced, thereby achieving a cost reduction.

Figure 48:
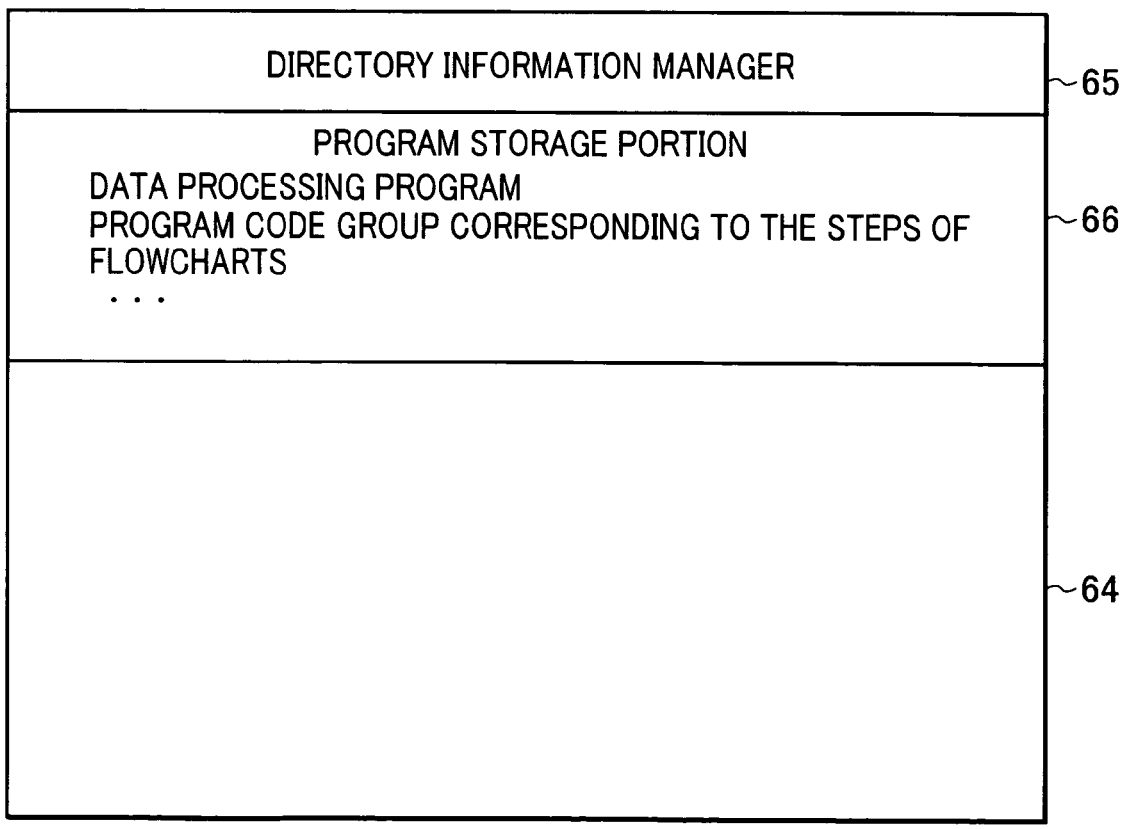
FIG. 48 illustrates a memory map of a storage medium which stores various data processing programs readable by the print network system of the present invention.

FIG. 48 illustrates a memory map of a storage medium which stores various data processing programs readable by a print network system including an information processing apparatus and a peripheral device of the present invention. The configuration of such data processing programs is described below.

Although it is not shown, the storage medium stores information for managing a program code group to be stored in this storage medium, for example, version information and the creators, and information dependent on the OS of a device that reads the programs, for example, icons for identifying and displaying the programs.

A storage medium 64 is formed of, for example, a hard disk, in FIG. 48.

A directory information manager 65 manages data dependent on various programs.

A program storage portion 66 may store a program for installing various programs into the information processing apparatus and a program for decompressing programs to be installed.

The functions implemented by executing the processes shown in the flowcharts of FIGS. 7, 14, 15, 16, 27, 28, 36, 37, 42, 43, 51, 52, and 53 may be implemented by an information processing apparatus by using a program installed through an external source. In this case, a program code group may be supplied to the information processing apparatus or a peripheral device from a storage medium, for example, a CD-ROM, a flash memory, or a flexible disk, or from an external storage medium via a network.

As described above, a storage medium storing software program codes implementing the functions of the foregoing embodiments may be supplied to a system or an apparatus, and a computer (or a CPU or an MPU) of the system or the apparatus may read and execute the program codes stored in the storage medium. In this modification, objects of the present invention can be achieved.

In this case, the program codes themselves read from the storage medium implement novel functions of the present invention, and the storage medium storing such program codes constitutes the present invention.

The storage medium for supplying the program codes to a system or an apparatus includes, for example, a flexible disk, a hard disk, an optical disc, a magneto-optical disk, CD-ROM, CD-R, magnetic tape, a non-volatile memory card, ROM, or electrically erasable read only memory (EEPROM). As stated above, the functions of the above-described embodiments can be implemented by reading and executing the program codes by a computer. Additionally, the functions of the above-described embodiments can be implemented by partially or wholly executing the processes by an OS running on a computer based on instructions of the program codes.

The present invention has been described through illustration of the preferred embodiments. The present invention can be summarized as follows. The print network system of the present invention includes an information processing apparatus (for example, the client PC 851 shown in FIG. 1) and a peripheral device (printer 855 shown in FIG. 1). The peripheral device has a function of making setting information (presentation page of the print setting UI shown in FIG. 40) for controlling the peripheral device available for the information processing apparatus. The information processing apparatus then controls the peripheral device by utilizing the setting information published by the peripheral device.

It is thus possible to provide a print network system including a peripheral device control UI which eliminates the need for the user to manually install driver software (printer driver) into the information processing apparatus, to collect or set information for controlling peripheral devices on a network (network 856), or to re-design or re-develop a UI in accordance with an OS installed in the information processing apparatus, and which exhibits excellent operability by maintaining the same design and operability of the UI for all OSs. It is also possible to provide a print network system in which print commands can be given from a corresponding application when the peripheral device is a printer.

The print network system of the present invention includes an information processing apparatus (for example, the client PC 851 shown in FIG. 1) and a peripheral device (printer 855 shown in FIG. 1). The peripheral device has a function of making a plurality of items of setting information (the presentation page of the print setting UI shown in FIG. 40 and the presentation page shown in FIG. 12) for controlling the peripheral device available for the information processing apparatus in a plurality of formats. The information processing apparatus then controls the peripheral device by utilizing a plurality of items of setting information published by the peripheral device.

It is thus possible to provide a print network system having a function of giving commands by using a corresponding application and a function of performing a driver-less printing operation.

The print network system of the present invention includes an information processing apparatus (for example, the client PC 851 shown in FIG. 1) and a peripheral device (printer 855 shown in FIG. 1). The peripheral device has a function of making setting information (presentation page of the print setting UI shown in FIG. 40) for controlling the peripheral device available and status information (presentation page of the status monitor UI shown in FIG. 41) representing the status of the peripheral device available for the information processing apparatus. The information processing apparatus then controls the peripheral device by utilizing the setting information or status information published by the peripheral device.

It is thus possible to provide a print network system that exhibits excellent operability by reflecting the latest status in the status information in real time and displaying the status information on the information processing apparatus.

The print network system of the present invention includes a first information processing apparatus (client PC 851 shown in FIG. 5 or 6), a peripheral device (printer 852 shown in FIG. 5 or printer 854 shown in FIG. 6), and a second information processing apparatus (proxy server 853 shown in FIG. 5 or 6) for controlling the peripheral device. The second information processing apparatus has a function of making setting information (presentation page of the print setting UI shown in FIG. 40) for controlling the peripheral device available for the first information processing apparatus. The first information processing apparatus then controls the peripheral device by utilizing the setting information published by the second information processing apparatus.

It is thus possible to provide a print network system including a peripheral device control UI which, even in general peripheral devices without a UPnP function, eliminates the need for the user to manually install driver software (printer driver) into the first information processing apparatus, to collect or set information for controlling peripheral devices on a network (network 856) or locally connected peripheral devices, or to re-design or re-develop a UI in accordance with an OS installed in the first information processing apparatus, and which exhibits excellent operability by maintaining the same design and operability of the UI for all OSs. It is also possible to provide a print network system in which print commands can be given by using a corresponding application when the peripheral device is a printer.

In the foregoing embodiments, the setting information (the presentation page shown in FIG. 12 and the presentation page of the print setting UI shown in FIG. 40) for controlling the peripheral device (printer 855, 852, or 854) by the first information processing apparatus (for example, client PC 851) and the status information (presentation page of the status monitor UI shown in FIG. 41) representing the status of the peripheral device are stored within the peripheral device (printer 855) or the second information processing apparatus (proxy server 853), and the first information processing apparatus can obtain the setting information or the status information by specifying the URL representing the location of the setting information or the status information. Alternatively, the setting information or the status information may be stored within the web server 858 shown in FIG. 1, in which case, the first information processing apparatus can obtain the setting information or the status information by specifying the URL representing the location of the setting information or the status information in the web server 858.

With this arrangement, the design of the UI for the setting information or the status information can be changed when necessary merely by replacing the setting information or the status information stored within the web server 858, thereby facilitating the maintenance.

The setting information (presentation page of the print setting UI shown in FIG. 40) for controlling the peripheral device (printer 855, 852, or 854) by the first information processing apparatus (for example, client PC 851) is stored, in association with the information concerning the first information processing apparatus, in the setting information storage location corresponding to the specified URL in the peripheral device (printer 855) or the second information processing apparatus (proxy server 853). When using the setting information, the first information processing apparatus utilizes the setting information stored in the setting information storage location as the initial information.

With this arrangement, the favorite setting information frequently used by the user is displayed on the first information processing apparatus as the initial setting information, thereby improving the user operability.

The present invention provides a first control method for controlling a peripheral device (printer 855) by using software (printer driver) for controlling the peripheral device running on an information processing apparatus (for example, client PC 851), and a second control method for controlling a peripheral device without using the above-described software. That is, the first control method corresponds to a printing operation based on a corresponding application by using a printer driver, and the second control method corresponds to a driver-less printing operation. The peripheral device publishes the first setting information (presentation page of the print setting UI shown in FIG. 40) used in the first control method in a first form (the 24th line in the description shown in FIG. 34), and also publishes the second setting information (presentation page shown in FIG. 12) used in the second control method in a second form (the 36th and 37th lines of the description shown in FIG. 33). Then, the information processing apparatus controls the peripheral device by utilizing the first setting information or the second setting information.

With this configuration, it is possible to provide a print network system having a function of giving print commands by using a corresponding application and a function of performing driver-less printing.

The first setting information (presentation page of the print setting UI shown in FIG. 40) is stored in a location specified with a first address (the 24th line of the description shown in FIG. 34), and also, the second setting information (presentation page shown in FIG. 12) is stored in a location specified with a second address (the 36th and 37th lines of the description shown in FIG. 33). When installing software (printer driver) into the information processing apparatus (for example, client PC 851), position information (the 19th line of the description shown in FIG. 19) concerning the peripheral device (printer 855), the first address, and the second address are stored in the information processing apparatus, and the information processing apparatus controls the peripheral device by utilizing the position information, the first address, and the second address.

With this configuration, it is possible to provide a print network system including a peripheral device control UI which eliminates the need for the user to manually install driver software (printer driver) into the information processing apparatus, to collect or set information for controlling peripheral devices on a network (network 856), or to re-design or re-develop a UI in accordance with an OS installed in the information processing apparatus, and which exhibits excellent operability by maintaining the same design and operability of the UI for all OSs. It is also possible to provide a print network system in which print commands can be given from a corresponding application when the peripheral device is a printer.

The information processing apparatus (for example, client PC 851) is provided with a web browser (for example, IE6), and controls a peripheral device (printer 855) via this web browser. It is thus easy to control peripheral devices by an information processing apparatus.

The function of making the status information (presentation page of the status monitor UI shown in FIG. 41) available for the information processing apparatus (for example, client PC 851) includes a function of automatically updating the status information (automatically updating the content of the presentation page at predetermined intervals by using JavaScript).

With this arrangement, it is possible to provide a print network system that exhibits excellent operability by reflecting the latest status of a peripheral device (printer 855) in the status information in real time and displaying the status information on the information processing apparatus.

The information processing apparatus (client PC 851) has a function of displaying the icon (ABC PrintMdl-K 000888 shown in FIG. 17) of a peripheral device (printer 855) by using the manufacturer name, the device type, and the manufacture number of the peripheral device.

Accordingly, even if there are a plurality of peripheral devices of the same type with different manufacture numbers on a network (network 856), the user can distinguish the individual devices from the device names without erroneously accessing unintended devices.

In the foregoing embodiments, the above-described functions are implemented by using UPnP. However, they may be implemented by using, for example, protocols having functions similar to the above-described functions. When implementing the above-described functions, standardized rules may be applied, thereby making it possible to establish a more general system.

The peripheral device (printer 855) is provided with an operating system (Linux) for controlling the peripheral device. Then, the processing in the peripheral device is distributed for an interface processor (interface unit 62) for controlling interface with this operating system and a processor (core module 63) independent of the operating system.

With this arrangement, the number of development steps can be considerably reduced, thereby achieving a cost reduction.

In the foregoing embodiments, a printer is used as an example of the peripheral device. Alternatively, copying machines, facsimile machines, scanners, digital cameras, and a device including a composite function of such elements may be used.

Although in the foregoing embodiments a protocol developed by SSDP is used for searching for peripheral devices, another protocol that can implement a similar system may be used.

In the above-described embodiments the notation of the HTTP entity is indicated in SOAP. However, it may be implemented by a unique schema.

Although in the foregoing embodiments Windows XP, Mac OS, or Linux is used as the OS, another OS may be used.

Although in the foregoing embodiments Ethernet is used for the network 856, another form of network may be used.

Although in the foregoing embodiments a USB interface is used for connecting the proxy server 853 and the printer 854, another type of interface may be used.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus transmitting print data to an image forming apparatus and causing the image forming apparatus to print the print data, the information processing apparatus comprising:
    a control unit configured to control installing a printer driver of the image forming apparatus;
    an acquisition unit configured to acquire, from the image forming apparatus, information about a page for setting specific print setting related to the image forming apparatus in accordance with the installation of the printer driver by the control unit, the information including an URL of the page for setting specific print settings;
    a storing unit configured to store the information about a page acquired by the acquisition unit in association with the installed printer driver;
    an activation unit configured to activate an application that provides a print dialog for selecting a print output target and instruction for displaying a print setting screen;
    a display unit configured to, when the image forming apparatus corresponding to the printer driver installed by the control unit is selected as the print output target and a user instructs displaying a print setting screen via the print dialog of the application, activate a web browser and display a page for setting specific print setting information on a user interface of the activated web browser by using the information about the page acquired by the acquisition unit;

an input unit configured to input, as information of a data structure that can be identified by the installed printer driver, print setting information set via the displayed page to the installed printer driver stored in association with the information about the page by the storing unit;

a print data generating unit configured to instruct the installed printer driver to generate the print data by using the print setting information input by the input unit; and a transmit unit configured to transmit the print data generated by the installed printer driver instructed by the print data generating unit, to the image forming apparatus, wherein the page for setting the specific print setting information is different from a setting screen provided by a printer driver.

2. A method of controlling an information processing apparatus transmitting print data to an image forming apparatus and causing the image forming apparatus to print the print data, the method comprising:

controlling installing a printer driver of the image forming apparatus;

acquiring, from the image forming apparatus, information about a page for setting specific print setting related to the image forming apparatus in accordance with the installation of the printer driver in the controlling step, the information including an URL of the page for setting specific print settings;

storing the information about a page acquired in the acquiring in association with the installed printer driver;

activating an application that provides a print dialog for selecting a print output target and instruction for displaying a print setting screen;

when the image forming apparatus corresponding to the installed printer driver is selected as the print output target and a user instructs displaying a print setting screen via the print dialog of the application, activating a web browser and displaying a page for setting print setting information on a user interface of the activated web browser by using the information about the page acquired in the acquiring step;

inputting, as information of a data structure that can be identified by the installed printer driver, print setting information set via the displayed page to the installed printer driver stored in association with the information about the page in the storing step;

instructing the installed printer driver to generate the print data by using the print setting information inputted in the inputting step; and transmitting the print data generated by the installed printer driver instructed in the instructing step, to the image forming apparatus, wherein the page for setting the specific print setting information is different from a setting screen provided by a printer driver.

3. The apparatus according to claim 1, further comprising a determination unit configured to determine whether or not the image forming apparatus can provide information about a page for setting print setting information, as a function of the image forming apparatus, wherein, when the determination unit determines that the image forming apparatus can provide the information about a page, the display unit displays the page for setting print setting information on the user interface of the web browser by using the information about the page acquired by the acquisition unit, and wherein, when the determination unit determines that the image forming apparatus cannot provide the information about a page, the print setting information set via an user interface of the printer driver is input to the printer driver, without the acquisition of the information about a page by the acquisition unit.

4. The apparatus according to claim 3, wherein the determination unit determines based on whether the acquisition unit can acquire the information about a page.

* * * * *